(12) United States Patent
Harrison et al.

(10) Patent No.: US 12,221,671 B2
(45) Date of Patent: *Feb. 11, 2025

(54) TREATED GEOTHERMAL BRINE COMPOSITIONS WITH REDUCED CONCENTRATIONS OF SILICA, IRON AND MANGANESE

(71) Applicant: TERRALITHIUM LLC, Houston, TX (US)

(72) Inventors: Stephen Harrison, Benicia, CA (US); John Burba, III, Parker, CO (US)

(73) Assignee: TERRALITHIUM LLC, Houston, TX (US)

( * ) Notice: Subject to any disclaimer, the term of this patent is extended or adjusted under 35 U.S.C. 154(b) by 187 days.

This patent is subject to a terminal disclaimer.

(21) Appl. No.: 16/880,266

(22) Filed: May 21, 2020

(65) Prior Publication Data

US 2020/0392601 A1 Dec. 17, 2020

Related U.S. Application Data

(63) Continuation of application No. 14/198,492, filed on Mar. 5, 2014, now Pat. No. 10,683,563, which is a continuation-in-part of application No. 14/062,781, filed on Oct. 24, 2013, now abandoned, and a continuation-in-part of application No. 13/943,395, filed on Jul. 16, 2013, now Pat. No. 9,238,851, and a continuation-in-part of application No. 13/827,616, filed on Mar. 14, 2013, now Pat. No. 9,249,478, and (Continued)

(51) Int. Cl.
| | |
|---|---|
| C22B 3/20 | (2006.01) |
| C02F 9/00 | (2023.01) |
| C09K 8/00 | (2006.01) |
| C22B 3/00 | (2006.01) |
| C22B 7/00 | (2006.01) |
| C22B 19/20 | (2006.01) |
| C22B 26/10 | (2006.01) |
| C22B 26/12 | (2006.01) |
| C02F 1/26 | (2023.01) |
| C02F 1/28 | (2023.01) |
| C02F 1/42 | (2023.01) |
| C02F 1/52 | (2023.01) |
| C02F 1/56 | (2023.01) |
| C02F 1/66 | (2023.01) |
| C02F 1/74 | (2023.01) |
| C02F 5/00 | (2023.01) |
| C02F 101/10 | (2006.01) |
| C02F 101/20 | (2006.01) |
| C02F 103/06 | (2006.01) |
| C02F 103/08 | (2006.01) |
| C02F 103/10 | (2006.01) |

(52) U.S. Cl.
CPC ............ *C22B 3/20* (2013.01); *C02F 9/00* (2013.01); *C09K 8/00* (2013.01); *C22B 7/006* (2013.01); *C22B 13/04* (2013.01); *C22B 19/20* (2013.01); *C22B 26/10* (2013.01); *C22B 26/12* (2013.01); *C02F 1/26* (2013.01); *C02F 1/281* (2013.01); *C02F 1/42* (2013.01); *C02F 2001/5218* (2013.01); *C02F 1/5245* (2013.01); *C02F 1/56* (2013.01); *C02F 1/66* (2013.01); *C02F 1/74* (2013.01); *C02F 5/00* (2013.01); *C02F 2101/10* (2013.01); *C02F 2101/203* (2013.01); *C02F 2103/06* (2013.01); *C02F 2103/08* (2013.01); *C02F 2103/10* (2013.01); *C02F 2209/02* (2013.01); *C02F 2209/06* (2013.01); *Y02P 10/20* (2015.11)

(58) Field of Classification Search
CPC .......... C22B 3/70; C22B 7/006; C22B 13/04; C22B 19/20; C22B 26/10; C22B 26/12; C02F 9/00; C02F 1/56; C02F 1/281; C02F 1/42; C02F 1/5245; C02F 1/66; C02F 1/74; C02F 2101/10; C02F 2101/203; C02F 2103/10; C02F 2209/02; C02F 2209/06; C09K 8/00; Y02P 10/20
See application file for complete search history.

(56) References Cited

U.S. PATENT DOCUMENTS

| | | |
|---|---|---|
| 1,932,413 A | 10/1933 | Laury |
| 2,145,816 A | 1/1939 | Stoops |

(Continued)

FOREIGN PATENT DOCUMENTS

| | | |
|---|---|---|
| BE | 861527 | 6/1978 |
| CN | 1558793 | 12/2004 |

(Continued)

OTHER PUBLICATIONS

The Ground Water Project, Groundwater in our water cycle, (Year: 2020).*

(Continued)

*Primary Examiner* — Silvana C Runyan
(74) *Attorney, Agent, or Firm* — Kilpatrick Townsend & Stockton LLP

(57) ABSTRACT

This invention relates to treated geothermal brine compositions containing reduced concentrations of iron, silica, and manganese compared to the untreated brines. Exemplary compositions contain a concentration of manganese less than 10 mg/kg, a concentration of silica ranging from less than 10 mg/kg, and a concentration of iron less than 10 mg/kg, and the treated geothermal brine is derived from a Salton Sea geothermal reservoir.

17 Claims, 56 Drawing Sheets

Related U.S. Application Data a continuation-in-part of application No. 13/622,642, filed on Sep. 19, 2012, now Pat. No. 9,534,276, and a continuation-in-part of application No. 13/539,106, filed on Jun. 29, 2012, now Pat. No. 8,518,232, said application No. 13/943,395 is a continuation of application No. 13/539,106, filed on Jun. 29, 2012, now Pat. No. 8,518,232, said application No. 13/622,642 is a continuation-in-part of application No. 13/539,106, filed on Jun. 29, 2012, now Pat. No. 8,518,232, said application No. 14/198,492 is a continuation-in-part of application No. 12/880,924, filed on Sep. 13, 2010, now Pat. No. 8,454,816, said application No. 13/827,616 is a continuation-in-part of application No. 12/880,924, filed on Sep. 13, 2010, now Pat. No. 8,454,816, said application No. 14/062,781 is a continuation of application No. 12/822,580, filed on Jun. 24, 2010, now Pat. No. 8,597,521, said application No. 14/198,492 is a continuation-in-part of application No. 12/822,580, filed on Jun. 24, 2010, now Pat. No. 8,597,521, and a continuation-in-part of application No. 12/823,000, filed on Jun. 24, 2010, now Pat. No. 9,051,827.

(60) Provisional application No. 61/873,212, filed on Sep. 3, 2013, provisional application No. 61/536,334, filed on Sep. 19, 2011, provisional application No. 61/502,736, filed on Jun. 29, 2011, provisional application No. 61/241,479, filed on Sep. 11, 2009, provisional application No. 61/239,275, filed on Sep. 2, 2009, provisional application No. 61/220,000, filed on Jun. 24, 2009.

(56) References Cited

U.S. PATENT DOCUMENTS

| | | | |
|---|---|---|---|
| 2,964,381 | A | 12/1960 | Goodenough |
| 3,306,700 | A | 2/1967 | Neipert et al. |
| 3,321,268 | A | 5/1967 | Copson et al. |
| 3,523,751 | A | 8/1970 | Burkert et al. |
| 4,016,075 | A | 4/1977 | Wilkins |
| 4,036,713 | A | 7/1977 | Brown |
| 4,043,386 | A | 8/1977 | Franz et al. |
| 4,116,856 | A | 9/1978 | Lee et al. |
| 4,116,858 | A | 9/1978 | Lee et al. |
| 4,127,989 | A | 12/1978 | Mickelson |
| 4,142,950 | A | 3/1979 | Creamer et al. |
| 4,159,311 | A | 6/1979 | Lee et al. |
| 4,209,369 | A | 6/1980 | Seko et al. |
| 4,221,767 | A | 9/1980 | Lee et al. |
| 4,244,190 | A | 1/1981 | Lieffers |
| 4,251,338 | A | 2/1981 | Retallack |
| 4,276,180 | A | 6/1981 | Matson |
| 4,291,001 | A | 9/1981 | Repsher et al. |
| 4,347,327 | A | 8/1982 | Lee et al. |
| 4,348,295 | A | 9/1982 | Burba, III |
| 4,348,296 | A | 9/1982 | Bauman et al. |
| 4,348,297 | A | 9/1982 | Bauman et al. |
| 4,376,100 | A | 3/1983 | Lee et al. |
| 4,381,349 | A | 4/1983 | Lee et al. |
| 4,405,463 | A | 9/1983 | Jost et al. |
| 4,405,595 | A | 9/1983 | Yang et al. |
| 4,428,200 | A | 1/1984 | McCabe et al. |
| 4,429,535 | A | 2/1984 | Featherstone |
| 4,430,311 | A | 2/1984 | Lee et al. |
| 4,461,714 | A | 7/1984 | Burba, III |
| 4,472,362 | A | 9/1984 | Burba, III |
| 4,477,367 | A | 10/1984 | Burba, III |
| 4,492,083 | A | 1/1985 | McCabe et al. |
| 4,513,818 | A | 4/1985 | Michels |
| 4,522,728 | A | 6/1985 | Gallup et al. |
| 4,540,509 | A | 9/1985 | Burba, III |
| 4,602,820 | A | 7/1986 | Hard |
| 4,615,808 | A | 10/1986 | Gallup et al. |
| 4,710,361 | A | 12/1987 | Ostrea |
| 4,710,367 | A | 12/1987 | Wong et al. |
| 4,727,167 | A | 2/1988 | Burba, III et al. |
| 4,728,438 | A | 3/1988 | Featherstone et al. |
| 4,745,977 | A | 5/1988 | Love et al. |
| 4,762,656 | A | 8/1988 | Ballard et al. |
| 4,763,479 | A | 8/1988 | Hoyer et al. |
| 4,765,913 | A | 8/1988 | Featherstone |
| 4,776,961 | A | 10/1988 | Gritters et al. |
| 5,015,541 | A | 5/1991 | Evans |
| 5,135,652 | A | 8/1992 | Boateng |
| 5,145,656 | A | 9/1992 | Gallup et al. |
| 5,200,165 | A | 4/1993 | Harper et al. |
| 5,219,550 | A * | 6/1993 | Brown ............... C01D 15/08 423/209 |
| 5,229,003 | A | 7/1993 | Duyvesteyn |
| 5,236,491 | A * | 8/1993 | Duyvesteyn ............. C22B 3/42 423/276 |
| 5,244,491 | A | 9/1993 | Brown et al. |
| 5,246,593 | A | 9/1993 | Gallup |
| 5,246,684 | A | 9/1993 | Brown et al. |
| 5,254,225 | A | 10/1993 | Gallup |
| 5,358,700 | A | 10/1994 | Brown et al. |
| 5,389,349 | A | 2/1995 | Bauman et al. |
| 5,427,691 | A | 6/1995 | Kuyucak et al. |
| 5,441,712 | A | 8/1995 | Duyvesteyn et al. |
| 5,594,923 | A | 1/1997 | Inoue et al. |
| 5,599,516 | A | 2/1997 | Bauman et al. |
| 5,656,172 | A | 8/1997 | Kitz et al. |
| 5,656,175 | A | 8/1997 | Bossier |
| 5,711,019 | A | 1/1998 | Tomczuk et al. |
| 5,728,302 | A | 3/1998 | Connor et al. |
| 5,833,844 | A | 11/1998 | Leavitt |
| 5,904,653 | A | 5/1999 | Hatfield et al. |
| 5,919,287 | A | 7/1999 | Moreau |
| 5,932,644 | A | 8/1999 | Fujii |
| 5,935,541 | A | 8/1999 | Bonnet et al. |
| 5,939,043 | A | 8/1999 | Yahagi |
| 5,951,843 | A | 9/1999 | Itoh et al. |
| 5,993,759 | A | 11/1999 | Wilkomirsky |
| 5,997,836 | A | 12/1999 | Sato et al. |
| 6,017,500 | A | 1/2000 | Mehta |
| 6,048,507 | A | 4/2000 | Amouzegar et al. |
| 6,080,696 | A | 6/2000 | Duke et al. |
| 6,103,422 | A | 8/2000 | Kanai |
| 6,139,498 | A | 10/2000 | Katsman et al. |
| 6,170,037 | B1 | 1/2001 | Blumenau |
| 6,207,126 | B1 | 3/2001 | Boryta et al. |
| 6,219,311 | B1 | 4/2001 | Mitsuno |
| 6,280,693 | B1 | 8/2001 | Bauman et al. |
| 6,458,184 | B2 * | 10/2002 | Featherstone ............. C22B 3/42 423/100 |
| 6,517,701 | B1 | 2/2003 | Geisler |
| 6,537,796 | B1 * | 3/2003 | Premuzic ................ C01B 33/18 423/28 |
| 6,555,078 | B1 | 4/2003 | Mehta |
| 6,682,644 | B2 | 1/2004 | Featherstone et al. |
| 6,761,865 | B1 | 7/2004 | Gallup et al. |
| 6,770,187 | B1 | 8/2004 | Putter et al. |
| 7,026,072 | B2 | 4/2006 | Barker et al. |
| 7,060,238 | B2 | 6/2006 | Saidi et al. |
| 7,330,914 | B2 | 2/2008 | Inogai |
| 7,390,466 | B2 | 6/2008 | Boryta et al. |
| 7,504,036 | B2 | 3/2009 | Gottlieb et al. |
| 7,678,470 | B2 | 3/2010 | Yoon et al. |
| 7,708,972 | B2 | 5/2010 | Coustry et al. |
| 7,824,766 | B2 | 11/2010 | Eplee et al. |
| 8,197,707 | B2 | 6/2012 | Lefenfeld et al. |
| 8,287,829 | B2 | 10/2012 | Harrison et al. |
| 8,309,043 | B2 | 11/2012 | Alurralde et al. |
| 8,435,468 | B2 | 5/2013 | Harrison et al. |
| 8,454,816 | B1 | 6/2013 | Harrison et al. |
| 8,518,232 | B1 | 8/2013 | Harrison et al. |
| 8,574,519 | B2 | 11/2013 | Harrison et al. |
| 8,597,521 | B1 | 12/2013 | Harrison |
| 9,051,827 | B1 | 6/2015 | Harrison |

(56) References Cited

U.S. PATENT DOCUMENTS

| | | | |
|---|---|---|---|
| 9,057,117 B2 | 6/2015 | Harrison et al. | |
| 9,238,851 B1 | 1/2016 | Harrison et al. | |
| 9,249,478 B2 | 2/2016 | Harrison et al. | |
| 9,532,276 B1 | 12/2016 | Malhotra et al. | |
| 9,534,276 B1 | 1/2017 | Harrison et al. | |
| 9,644,126 B2 | 5/2017 | Harrison et al. | |
| 9,644,866 B2 | 5/2017 | Harrison et al. | |
| 9,650,555 B2 | 5/2017 | Harrison et al. | |
| 10,190,030 B2 | 1/2019 | Harrison et al. | |
| 10,683,563 B2 | 6/2020 | Harrison et al. | |
| 2001/0000597 A1 | 5/2001 | Featherstone | |
| 2001/0011645 A1 | 8/2001 | Silva et al. | |
| 2001/0028871 A1 | 10/2001 | Harrison et al. | |
| 2002/0018929 A1 | 2/2002 | Dai et al. | |
| 2003/0026749 A1 | 2/2003 | Burrows et al. | |
| 2003/0226761 A1 | 12/2003 | Featherstone et al. | |
| 2003/0228251 A1 | 12/2003 | Boryta et al. | |
| 2004/0005267 A1 | 1/2004 | Boryta et al. | |
| 2004/0018135 A1 | 1/2004 | Adamson et al. | |
| 2004/0097755 A1 | 5/2004 | Abbott et al. | |
| 2004/0149590 A1 | 8/2004 | Featherstone et al. | |
| 2004/0264338 A1 | 12/2004 | Chou | |
| 2005/0011753 A1 | 1/2005 | Jackson et al. | |
| 2005/0162990 A1 | 7/2005 | Murata | |
| 2005/0265909 A1 | 12/2005 | Kajiya et al. | |
| 2006/0093911 A1 | 5/2006 | Chiga et al. | |
| 2006/0115396 A1 | 6/2006 | Boryta et al. | |
| 2006/0115407 A1 | 6/2006 | Boryta et al. | |
| 2006/0115410 A1 | 6/2006 | Boryta et al. | |
| 2007/0023359 A1* | 2/2007 | Grott | B01J 49/57 210/685 |
| 2007/0114134 A1 | 5/2007 | Legg et al. | |
| 2007/0148077 A1 | 6/2007 | Boryta et al. | |
| 2007/0160516 A1 | 7/2007 | Boryta et al. | |
| 2008/0068963 A1 | 3/2008 | Shikata | |
| 2008/0221440 A1 | 9/2008 | Iddan et al. | |
| 2008/0233042 A1 | 9/2008 | Boryta et al. | |
| 2008/0249395 A1 | 10/2008 | Shachar et al. | |
| 2008/0300589 A1 | 12/2008 | Paul et al. | |
| 2009/0014336 A1 | 1/2009 | Olah et al. | |
| 2009/0107230 A1 | 4/2009 | Okcay et al. | |
| 2009/0214414 A1 | 8/2009 | Boryta et al. | |
| 2009/0264777 A1 | 10/2009 | Markowitz et al. | |
| 2009/0275827 A1 | 11/2009 | Aiken et al. | |
| 2010/0000597 A1 | 1/2010 | Cousins | |
| 2010/0099991 A1 | 4/2010 | Snyder | |
| 2010/0165672 A1 | 7/2010 | Li et al. | |
| 2010/0172554 A1 | 7/2010 | Kassab et al. | |
| 2010/0301267 A1 | 12/2010 | Mao et al. | |
| 2010/0312095 A1 | 12/2010 | Jenkins et al. | |
| 2010/0312096 A1 | 12/2010 | Guttman et al. | |
| 2010/0327223 A1 | 12/2010 | Zaghib et al. | |
| 2011/0044882 A1 | 2/2011 | Buckley et al. | |
| 2011/0123427 A1 | 5/2011 | Boryta et al. | |
| 2011/0200508 A1 | 8/2011 | Harrison et al. | |
| 2012/0235084 A1 | 9/2012 | Lefenfeld et al. | |
| 2014/0239224 A1* | 8/2014 | Burba | C01D 15/00 252/193 |

FOREIGN PATENT DOCUMENTS

| | | |
|---|---|---|
| CN | 1558871 | 12/2004 |
| DE | 19631794 | 8/1997 |
| DE | 19809420 | 9/1999 |
| EP | 0103035 | 3/1984 |
| EP | 0117316 | 9/1984 |
| EP | 0094983 | 12/1989 |
| EP | 1900688 | 3/2008 |
| GB | 895690 | 5/1962 |
| GB | 2190668 | 11/1987 |
| JP | 0529963 | 1/1977 |
| JP | 5531437 | 3/1980 |
| JP | 2004225144 | 8/2004 |
| JP | 3691027 | 6/2005 |
| JP | 2006318815 | 11/2006 |
| JP | 2009046390 | 3/2009 |
| JP | 2009057278 | 3/2009 |
| WO | 9419280 | 9/1994 |
| WO | 9929624 | 6/1999 |
| WO | 0078675 | 12/2000 |
| WO | 03037794 | 5/2003 |
| WO | 03041857 | 5/2003 |
| WO | 2006094968 | 9/2006 |
| WO | 2009131628 | 10/2009 |

OTHER PUBLICATIONS

EPA United States Environmental Protection Agency, Session 6 Iron Manganese Control in Groundwater Systems, Oct. 15, 2020. (Year: 2020).*

Abe et al., Synthetic Inorganic Ion-Exchange Materials, XXXIV. Selective Separation of Lithium from Seawater by Tin(IV) Antimonate Cation Exchanger, Hydrometallurgy, vol. 12, No. 1, Feb. 1984, pp. 83-93.

Bloomquist, Economic Benefits of Mineral Extraction from Geothermal Brines, Proceedings of the Sohn International Sympoium, vol. 6, Aug. 27-31, 2006, 6 pages.

Bouguerra et al., Equilibrium and Kinetic Studies of Adsorption of Silica onto Activated Alumina, Desalination, vol. 206, Nos. 1-3, Feb. 5, 2007, pp. 141-146.

Bourcier et al., Co-Production of Silica from Geothermal Fluids, California Energy Commission Project PIR-00-003, UCRL-TR-216881, Nov. 7, 2005, pp. 1-96.

Bourcier et al., Recovery of Minerals and Metals from Geothermal Fluids, SME Meeting, Sep. 8, 2005, 19 pages.

Christopher et al., The Recovery and Separation of Mineral Values from Geothermal Brines, Hazen Research, Inc., Jun. 12, 1975, 43 pages.

Cole et al., Zinc Solvent Extraction in the Process Industries, Mineral Processing and Extractive Metallurgy Review vol. 24, No. 2, Apr. 2003, pp. 91-137.

Dreisinger et al., New Developments in the Boleo Copper-Cobalt-Zinc-Manganese Project, SME Annual Meeting and Exhibit, Available online at: http://bajamining.com/_resources/Reports/alta_paper_2006_boleo_final.pdf, 2012, 14 pages.

Fujii, Dependence of Adoptive Capability for Lithium Ions in Molten Salt on Surface Properties of Activated Alumina, Journal of the Ceramic Society of Japan, vol. 102, No. 12, 1994, pp. 1097-1101.

Gallup et al., Heavy Metal Sulfide Scaling in a Production Well at the Salton Sea Geothermal Field, Geothermal Resources Council Transactions, vol. 14, Aug. 1990, pp. 1583-1590.

Gallup et al., Laboratory Investigation of Silica Removal from Geothermal Brines to Control Silica Scaling and Produce Usable Silicates, Applied Geochemistry, vol. 18, No. 10, Oct. 2003, pp. 1597-1612.

Gotfryd et al., Recovery of Zinc(II) from Acidic Sulfate Solutions, Simulation of Counter-Current Extraction Stripping Process, Physicochemical Problems of Mineral Processing, vol. 38, No. 1, 2004, pp. 113-120.

Hamzaoui et al., Lithium Recovery from Highly Concentrated Solutions: Response Surface Methodology (RSM) Process Parameters Optimizations, Hydrometallurgy, vol. 90, No. 1, Jan. 2008, pp. 1-7.

Hawash et al., Methodology for Selective Adsorption of Lithium Ions onto polymeric Aluminum (III) Hydroxide, Journal of American Science, vol. 6, No. 11, 2010, pp. 301-309.

Kawai et al., Solvent Extraction of Zinc(II) and Manganese(II) with 5,10, 15,20-Tetraphenyl-21H,23H-Porphine (TPP) through the Metal Exchange Reaction of Lead(II)-TPP, Solvent Extraction Research and Development, vol. 7, Jan. 2000, pp. 36-43.

Ku et al., The Adsorption of Fluoride Ion from Aqueous Solution by Activated Alumina, Water, Air, and Soil Pollution, vol. 133, Nos. 1-4, Jan. 2002, pp. 349-360.

Lee et al., Solvent Extraction of Zinc from Strong Hydrochloric Acid Solution with Alamine 336, Bulletin of the Korean Chemical Society, vol. 30, No. 7, Jul. 20, 2009, pp. 1526-1530.

(56) References Cited

OTHER PUBLICATIONS

Maimoni, A Cementation Process for Minerals Recovery from Salton Sea Geothermal Brines, Lawrence Livermore Laboratory, Jan. 26, 1982, 26 pages.

Manceau et al., Nanometer-Sized, Divalent-Mn, Hydrous Silicate Domains in Geothermal Brine Precipitates, American Mineralogist, vol. 90, Feb. 28, 2005, pp. 371-381.

Menzheres et al., Solid State Interaction of Aluminium Hydroxide with Lithium Salts, Journal of Materials Synthesis and Processing, vol. 7, No. 4, Jul. 1999, pp. 239-244.

Nan et al., Recovery of Metal Values from Spent Lithium Ion Batteries with Chemical Deposition and Solvent Extraction, Journal of Power Sources, vol. 152, Dec. 1, 2005, pp. 278-284.

Pascua et al., Uptake of Dissolved Arsenic During the Retrieval of Silica from Spent Geothermal Brine, Geothermics, vol. 36, No. 3, Jun. 2007, pp. 230-242.

Potapov et al., Experiments on Silica Precipitation from Hydrothermal Solution and Utilization of Precipitated Materials, Thirtieth Workshop on Geothermal Reservoir Engineering, Available Online at: https://pangea.stanford.edu/ERE/pdf/IGAstandard/SGW/2005/potapov.pdf, Jan. 31-Feb. 2, 2005, 9 pages.

Potapov, Silica Precipitation from Hydrothermal Solution, Journal of Mining Science, vol. 40, No. 1, Jan. 2004, pp. 101-112.

Prokuyev et al., Mutual Influence of Zinc (II) and Cadmium (II) in Case of Extraction from Lithium Chloride Solutions with Tributyl Phosphate, Zhurnal Neorganicheskoi Khimii, vol. 25, No. 12, 1980, 11 pages.

Pyman, The Point of Zero Charge of Amorphous Coprecipitates of Silica with Hydrous Aluminium or Ferric Hydroxide, Clay Minerals, vol. 14, No. 1, Mar. 1979, pp. 87-92.

Ryabtsev et al., Preparation of High-Purity Lithium Hydroxide Monohydrate from Technical-Grade Lithium Carbonate by Membrane Electrolysis, Russian Journal of Applied Chemistry, vol. 77, No. 7, Jul. 2004, pp. 1108-1116.

Ryabtsev et al., Sorption of Lithium from Brine onto Granular LiCl•2Al(OH)3•mH2O Sorbent under Dynamic Conditions, Russian Journal of Applied Chemistry, vol. 75, No. 7, Jul. 2002, pp. 1069-1074.

Samoilov, Extracting Lithium from Waste Solutions of Chemico-Metallurgical Lithium Carbonate Production, Theoretical Foundations of Chemical Engineering, vol. 42, No. 5, Oct. 2008, pp. 714-717.

Schultze et al., Operation of a Mineral Recovery Unit on Brine from the Salton Sea Known Geothermal Resource Area, Bureau of Mines Report of Investigations 8680, vol. 505, 1982, 18 pages.

Schultze, Techniques for Recovering Metal Values from Postflash Geothermal Brines, Geothermal Resources Council Transactions, vol. 8, Aug. 1984, pp. 159-162.

Sheikholeslami et al., Silica and Metals Removal by Pretreatment to Prevent Fouling of Reverse Osmosis Membranes, Desalination, vol. 143, No. 3, Jun. 10, 2002, pp. 255-267.

Song et al., Temperature-Dependent Properties of FePO4 Cathode Materials, Materials Research Bulletin, vol. 37, No. 7, Jun. 2002, pp. 1249-1257.

Umetani et al., Solvent Extractions of Lithium and Sodium with 4-Benzoyl or 4-Perfluoracyl-5-Pyrazolone and Topo, Talanta, vol. 34, No. 9, Sep. 1987, pp. 779-782.

Wilcox et al., Selective Lithium Ion Extraction with Chromogenic Monoaza Crown Ethers, Analytica Chimica Acta, vol. 245, 1991, pp. 235-242.

Yang et al., Optimization of Operation Conditions for Extracting Lithium Ions from Calcium Chloride Type Oilfield Brine, International Journal of Minerals, Metallurgy, and Materials, vol. 19, No. 4, Apr. 2012, pp. 290-294.

Yokoyama et al., A Study of the Alumina-Silica Gel Adsorbent for the Removal of Silicic Acid from Geothermal Water: Increase in Adsorption Capacity of the Adsorbent due to Formation of Amorphous Aluminosilicate by Adsorption of Silicic Acid, Journal of Colloid and Interface Science, vol. 252, No. 1, Aug. 1, 2002, pp. 1-5.

Iron (III) hydroxide CAS registry information, 2019, 1 page.

Iron (III) Oxyhydroxide CAS registry information, 2019, 2 pages.

Berthoud, C.E., "Magmamax No. 1 geothermal brine bulk solids precipitation pilot plant: engineering design," U.S. Bureau of Mines, Geothermal Minerals Group, Reno Metallurgy Research Center; Hazen Research, Inc., 1978.

Volume I in the Videoconference Deposition of Darrell L. Gallup, Ph.D. dated May 18, 2020, 193 pages.

Volume II in the Videoconference Deposition of Darrell L. Gallup, Ph.D. dated May 19, 2020, 159 pages.

* cited by examiner

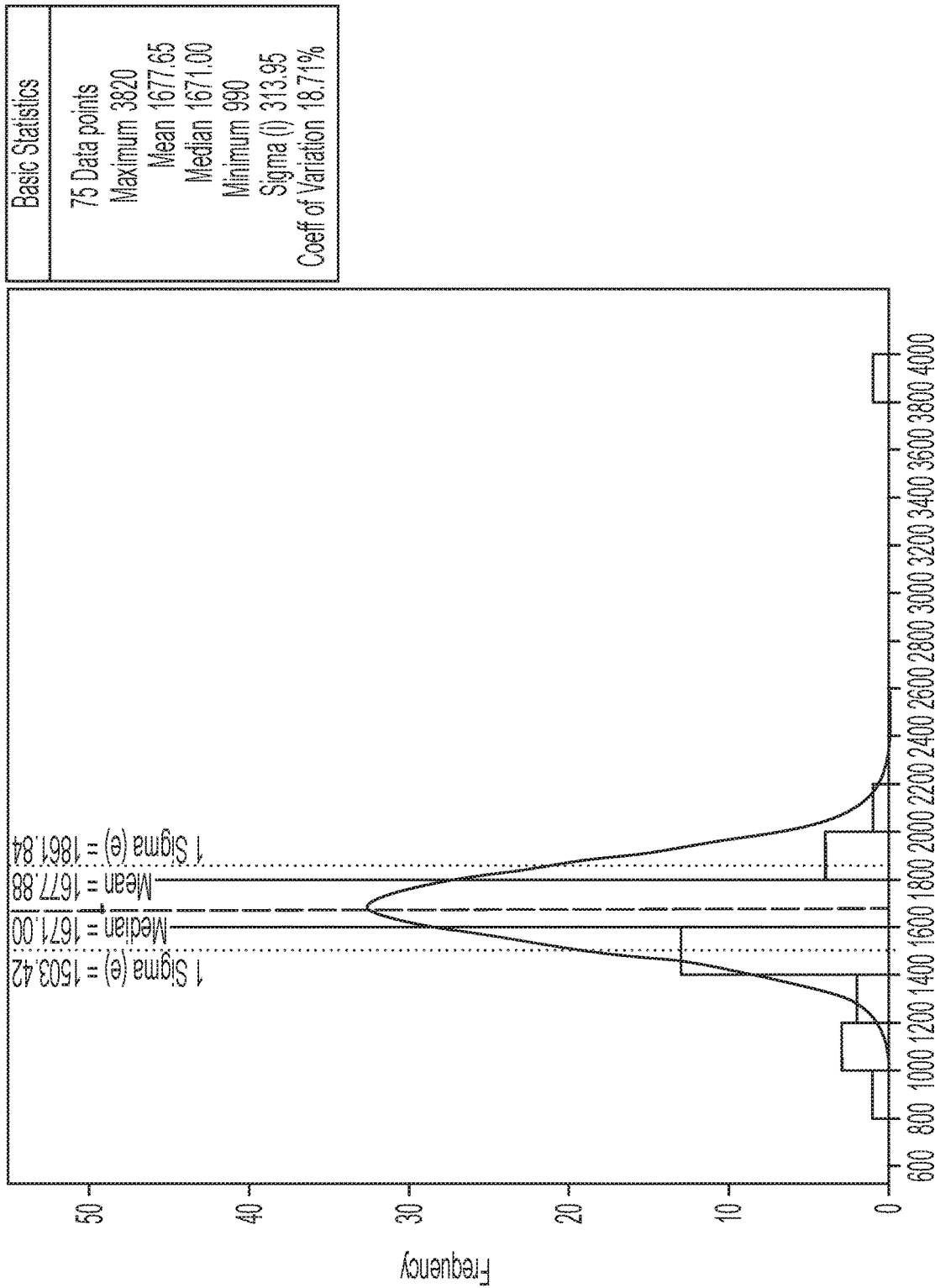

TREATED GEOTHERMAL BRINE COMPOSITIONS WITH REDUCED CONCENTRATIONS OF SILICA, IRON AND MANGANESE

RELATED APPLICATIONS

This application is a Continuation of U.S. patent application Ser. No. 14/198,492, filed on Mar. 5, 2014, which claims priority to U.S. Provisional Patent Application Ser. No. 61/873,212, filed on Sep. 3, 2013; claims priority to and is a Continuation-in-Part of U.S. patent application Ser. No. 14/062,781, filed on Oct. 24, 2013, which is a Continuation Application of U.S. patent application Ser. No. 12/822,580, filed on Jun. 24, 2010, which claims priority to U.S. Provisional Patent Application Ser. No. 61/220,000, filed on Jun. 24, 2009: also claims priority to and is a Continuation-in-Part of U.S. patent application Ser. No. 12/823,000, filed on Jun. 24, 2010, which claims priority to U.S. Provisional Patent Application Ser. No. 61/239,275, filed on Sep. 2, 2009; claims priority to and is a Continuation-in-Part of U.S. Non-Provisional patent application Ser. No. 13/827,616, filed on Mar. 14, 2013, which is a Continuation-in-Part of U.S. patent application Ser. No. 13/539,106, filed on Jun. 29, 2012, which claims priority to U.S. Provisional Patent Application Ser. No. 61/502,736, filed Jun. 29, 2011, and is also a Continuation-in-Part. of U.S. patent application Ser. No. 12/880,924, filed on Sep. 13, 2010, which claims priority to U.S. Provisional Patent Application No. 61/241,479, filed Sep. 9, 2009, claims priority to and is a Continuation-in-Part of U.S. Non-Provisional patent application Ser. No. 13/622,642, filed on Sep. 19, 2012, which is a Continuation-in-Part of U.S. patent application Ser. No. 13/529,106, filed on Jun. 29, 2012, which claims priority to U.S. Provisional Application No. 61/502,736, filed on Jun. 29, 2011, and further claims priority to U.S. Provisional Patent Application No. 61/536,334, filed on Sep. 19, 2011; claims priority to and is a Continuation-in-Part of U.S. Non-Provisional patent application Ser. No. 13/943,395, filed on Jul. 16, 2013, which is a Continuation of U.S. patent application Ser. No. 13/529,106, filed on Jun. 29, 2012, which claims priority to U.S. Provisional Application Ser. No. 61/502,736, filed on Jun. 29, 2011, all of which are incorporated herein by reference in their entireties.

TECHNICAL FIELD OF THE INVENTION

This invention generally relates to treated brine compositions with reduced concentrations of silica, iron, and manganese. This invention generally relates to compositions for preventing scale buildup in geothermal power plants and compositions employed to improve injectivity of geothermal and other brines. This invention generally relates to treated brine compositions with reduced concentrations of silica, iron, and/or manganese that can also be used for recovery of other metals, including lithium, zinc, rubidium, cesium, and potassium.

BACKGROUND

A number of brine sources exist naturally. For instance, brine sources include brine deposits like the Salar de Atacama in Chile, Silver Peak Nev., Salar de Uyuni in Bolivia, or the Salar de Hombre Muerte in Argentina. Other common brine sources are geothermal, oilfield, Smackover, and relict hydrothermal brines. These brines, however, have not previously been commercially exploited very well.

Geothermal brines are of particular interest for a variety of reasons. First, geothermal brines provide a source of power due to the fact that hot geothermal pools are stored at high pressure underground, which when released to atmospheric pressure, can provide a flash-steam. The flash-steam can be used, for example, to run a power plant. Additionally, geothermal brines contain useful elements, which can be recovered and utilized for secondary processes. In some geothermal waters and brines, binary processes can be used to heat a second fluid to provide steam for the generation of electricity without the flashing of the geothermal brine.

One problem associated with geothermal brines when utilized for the production of electricity results from scaling and deposition of solids. Silica and other solids that are dissolved within the geothermal brine precipitate out during all stages of brine processing, particularly during the cooling of a geothermal brine, and may eventually result in fouling of the injection wells or processing equipment.

It is known that geothermal brines can include various metal ions, particularly alkali and alkaline earth metals, as well as silica, iron, lead, silver, and zinc, in varying concentrations, depending upon the source of the brine. Recovery of these metals is potentially important to the chemical, pharmaceutical, and electronic industries. Typically, the economical recovery of metals from natural brines, which may vary widely in composition, depends not only on the specific concentration of the desired metal, but also upon the concentrations of interfering ions, particularly silica, calcium, and magnesium, because the presence of the interfering ions will increase recovery costs, as additional steps must be taken to remove the interfering ions. Economical recovery also depends upon the commercial cost and availability of the desired metal already present in the relevant market.

Silica is known to deposit in piping as scale deposits, typically as a result of the cooling of a geothermal brine. Frequently, geothermal brines are near saturation with respect to the silica concentration and upon cooling; deposition occurs because of the lower solubilities at lower temperatures. This is combined with the polymerization of silica and co-precipitation with other species, particularly metals. This is seen in geothermal power stations, and is particularly true for amorphous silica/silicates. Additionally, silica is a known problem in reverse osmosis desalination plants. Thus, removal of silica from low concentration brines may help to eliminate these scale deposits, and thus reduce costs and improve efficiency of facilities that use and process brines.

Known methods for the removal of silica from geothermal brines include the use of a geothermal brine clarifier for the removal and recovery of silica solids that may be precipitated with the use of various seed materials, or the use of compounds that absorb silica, such as magnesium oxide, magnesium hydroxide, or magnesium carbonate. In addition to a less than complete recovery of silicon from brines, prior methods also suffer in that they typically remove ions and compounds other than just silica and silicon containing compounds.

Geothermal brines can be flashed via several processes. There is the conventional method to produce steam for power. There have also been modifications to the conventional dual direct flash evaporation method to include multiple flash evaporation stages. One modification to the conventional dual direct flash method is the crystallizer reactor clarifier process. In the crystallizer reactor clarifier process, a reactor clarifier precipitates components that can cause scaling, such as iron rich amorphous silica, and removes suspended particles from the brines before injection into the flash process. The process also seeds the brine in the flash vessels to reduce scale formation. Thus, when precipitation occurs it is more likely that it will occur on the seed slurry than on the metal surfaces of the flash apparatus. There is also the pH modification process that differs from the crystallizer reactor clarifier process. In the pH modification process, compounds that cause scaling are maintained in solution. By lowering the pH of the brine solution, for example, as low as 3.0, compounds that typically cause scaling on the flash apparatus are maintained in solution. By lowering pH and modifying pressures, the compounds are maintained in solution and scaling is prevented or reduced.

Thus, although conventional methods employed in the processing of ores and brines can remove some of the silica present in silica containing solutions and brines, there exists a need to develop methods that are selective for the removal of silica from brines and other silica containing solutions at high yields to produce treated compositions with reduced silica concentrations. Additionally, once certain components are removed, the geothermal brine compositions may be injected into a geothermal reservoir, such as into the original reservoir. Compositions for improving injectivity of such brines will improve the efficiency of the process, as improved injectivity will reduce the costs and time associated with cleaning the equipment used for injecting such brines and will also increase long-term permeable flow. While current practices at geothermal plants have focused on reduction of scaling on the apparatus associated with the flash process, there is still a need to reduce scaling after the processing of the brine for energy. The current practice at Salton Sea geothermal plants is to clean injection wells on an annual basis. This is a significant expense as there are typically multiple wells (i.e., three wells) to clean out. This is typically done by hydroblasting or acid treatment. After a certain time, typically three years, this is no longer effective and portions of wells must be routed out to remove blockages, which is expensive and time consuming. The routing process can usually be repeated twice before the wells have to be completely replaced. Thus, compositions and processes that would reduce fouling and prolong the time between required cleanings would be of substantial benefit.

Geothermal brines, such as those found in the Salton Sea, typically include various valuable metal ions, such as silver, manganese, and zinc, dissolved therein. For example, the geothermal brines of the Salton Sea include about 500 mg/L of zinc and about 2000 mg/L manganese dissolved therein. Methods for the economical and selective removal and recovery of high purity manganese from manganese containing solutions, such as geothermal brines, are needed. These methods would produce brines having reduced concentrations of manganese.

SUMMARY OF THE INVENTION

Exemplary embodiments of the present invention include treated geothermal brine compositions. In certain embodiments, the composition contains a treated geothermal brine having a concentration of silica ranging from 0 to 80 mg/kg and a concentration of iron ranging from 0 to 300 mg/kg. In certain embodiments, the composition contains a treated geothermal brine having a concentration of silica ranging from 0 to 50 mg/kg and a concentration of iron ranging from 0 to 300 mg/kg.

In certain embodiments, the composition contains a treated geothermal brine having a concentration of manganese ranging from 0 to 200 mg/kg, a concentration of silica ranging from 0 to 80 mg/kg, and a concentration of iron ranging from 0 to 300 mg/kg. In certain embodiments, the composition contains a treated geothermal brine having a concentration of manganese ranging from 0 to 200 mg/kg, a concentration of silica ranging from 0 to 30 mg/kg, and the concentration of iron ranging from 0 to 300 mg/kg.

In certain embodiments, the composition contains a treated geothermal brine having a concentration of manganese less than about 100 mg/kg, a concentration of silica less than about 30 mg/kg, and a concentration of iron less than about 300 mg/kg. In certain embodiments, the composition contains a treated geothermal brine having a concentration of manganese less than about 50 mg/kg, a concentration of silica less than about 30 mg/kg, and a concentration of iron less than about 300 mg/kg. In certain embodiments, the composition contains a treated geothermal brine having a concentration of manganese less than about 30 mg/kg, a concentration of silica less than about 30 mg/kg, and a concentration of iron less than about 300 mg/kg. In certain embodiments, the composition contains a treated geothermal brine having a concentration of manganese less than about 30 mg/kg, a concentration of silica less than about 30 mg/kg, and a concentration of iron less than about 200 mg/kg. In certain embodiments, the composition contains a treated geothermal brine having a concentration of manganese less than about 20 mg/kg, a concentration of silica less than about 20 mg/kg, and a concentration of iron less than about 200 mg/kg. In certain embodiments, the composition contains a treated geothermal brine having a concentration of manganese less than about 20 mg/kg, a concentration of silica less than about 20 mg/kg, and a concentration of iron less than about 100 mg/kg.

In certain embodiments, the composition contains a treated geothermal brine having a concentration of manganese less than about 20 mg/kg, a concentration of silica less than about 20 mg/kg, and a concentration of iron less than about 50 mg/kg. In certain embodiments, the composition contains a treated geothermal brine having a concentration of manganese less than about 10 mg/kg, a concentration of silica less than about 20 mg/kg, and a concentration of iron less than about 100 mg/kg. In certain embodiments, the composition contains a treated geothermal brine having a concentration of manganese less than about 10 mg/kg, a concentration of silica less than about 10 mg/kg, and a concentration of iron less than about 100 mg/kg. In certain embodiments, the composition contains a treated geothermal brine having a concentration of manganese less than about 10 mg/kg, a concentration of silica less than about 10 mg/kg, and a concentration of iron less than about 10 mg/kg. In certain embodiments, the composition contains a treated geothermal brine having a concentration of manganese less than about 5 mg/kg, a concentration of silica less than about 5 mg/kg, and a concentration of iron less than about 5 mg/kg.

Exemplary embodiments of the present invention include treated Salton Sea brine compositions. In certain embodiments, the treated geothermal brine composition is a Salton Sea brine and has a concentration of manganese ranging from 0 to 200 mg/kg, a concentration of silica ranging from 0 to 30 mg/kg, and a concentration of iron ranging from 0 to 100 mg/kg. In certain embodiments, the Salton Sea brine has a concentration of manganese less than 50 mg/kg, a concentration of silica from less than 10 mg/kg, and a concentration of iron less than 10 mg/kg. In certain embodiments, the treated geothermal brine composition is a Salton Sea brine and has a concentration of manganese ranging from 0 to 100 mg/kg, a concentration of silica ranging from 0 to 30 mg/kg, and a concentration of iron ranging from 0 to 100 mg/kg.

In other aspects, the invention provides treated Salton Sea geothermal brine compositions containing a concentration of manganese ranging from 0 to 50 mg/kg, a concentration of silica ranging from 0 to 10 mg/kg and a concentration of iron ranging from 0 to 10 mg/kg. In another embodiment, the invention provides a geothermal brine composition having a pH of about 4.0 to about 6.0 that has less than 20 ppm by weight of zinc, less than 20 ppm by weight of silica, less than 20 ppm by weight of iron, and further wherein the geothermal brine composition has total suspended solids ("TSS") of less than 10 ppm.

In other aspects, the invention provides methods of using the treated geothermal brine compositions described herein. For example without limitations, the treated geothermal brine compositions can be supplied to a process for mineral extraction. For example without limitations, the minerals that can be extracted selectively or in combination from the treated geothermal brine include potassium, rubidium, cesium, phosphates, zinc, and lead. Also disclosed are exemplary embodiments of methods of using the treated geothermal brine compositions described herein by injecting the treated geothermal brine compositions into a geothermal reservoir.

BRIEF DESCRIPTION OF THE DRAWINGS

So that the manner in which the features and benefits of the invention, as well as others which will become apparent, may be understood in more detail, a more particular description of the embodiments of the invention may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIGS. 48A and 48B show histograms of iron concentrations in an exemplary treated brine composition during the silica management process.

DETAILED DESCRIPTION OF THE INVENTION

Figure 1:
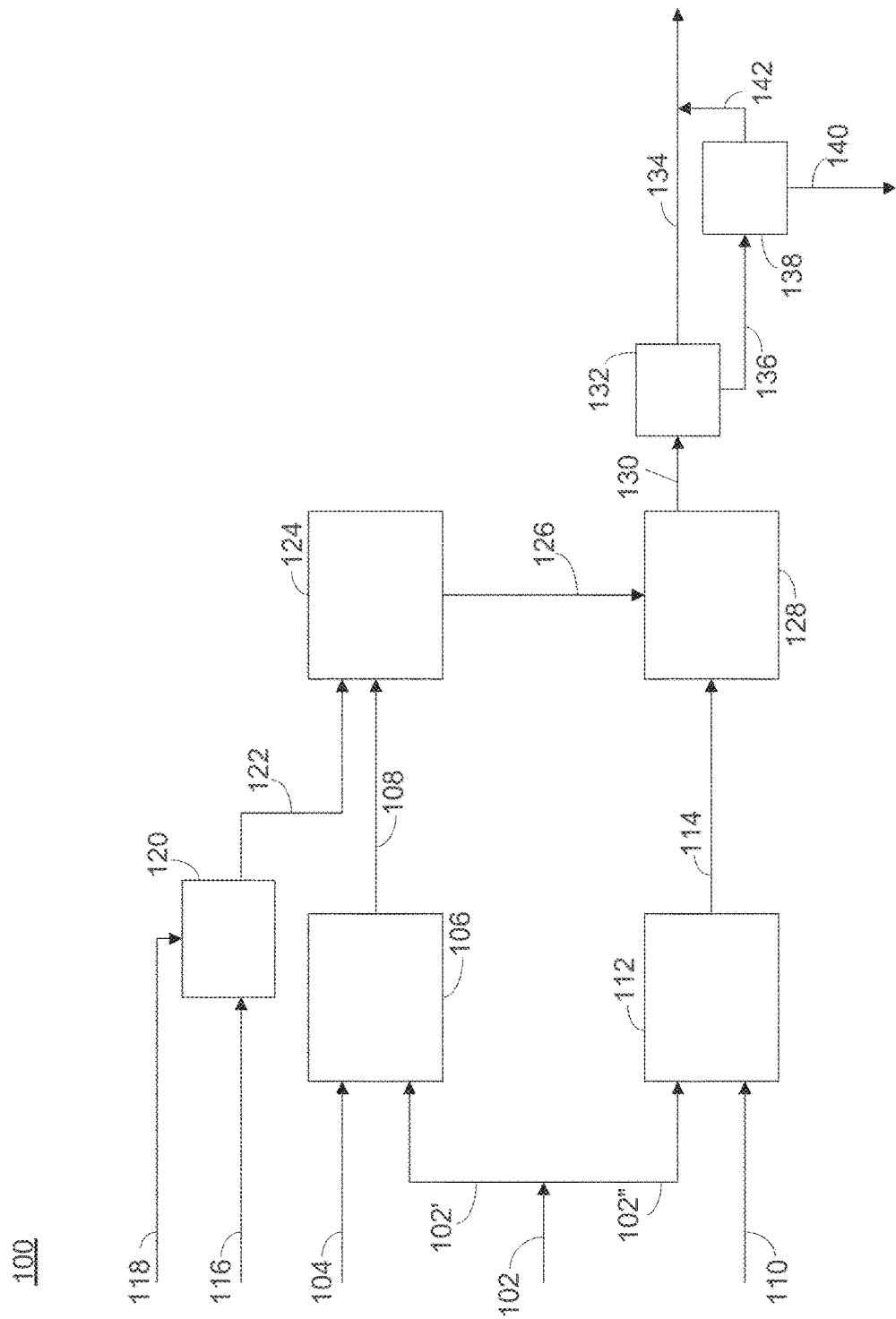
FIG. 1 is an illustration of an apparatus for the removal of silica from a silica containing brine according to an embodiment of the present invention.

As used herein, the following terms shall have the following meanings.

As used herein, "brine" or "brine solution" refers to any aqueous solution that contains a substantial amount of dissolved metals, such as alkali and/or alkaline earth metal salt(s) in water, wherein the concentration of salts can vary from trace amounts up to the point of saturation. Generally, brines suitable for the methods described herein are aqueous solutions that may include alkali or alkaline earth metal chlorides, bromides, sulfates, hydroxides, nitrates, and the like, as well as natural brines. In certain brines, other metals like lead, manganese, and zinc may be present. Exemplary elements present in the brines can include sodium, potassium, calcium, magnesium, lithium, strontium, barium, iron, boron, silica, manganese, chlorine, zinc, aluminum, antimony, chromium, cobalt, copper, lead, arsenic, mercury, molybdenum, nickel, silver, thallium, vanadium, and fluorine, although it is understood that other elements and compounds may also be present. Brines can be obtained from natural sources, such as Chilean brines or Salton Sea brines, geothermal brines, Smackover brines, sea water, mineral brines (e.g., lithium chloride or potassium chloride brines), alkali metal salt brines, and industrial brines, for example, industrial brines recovered from ore leaching, mineral dressing, and the like. The present invention is also equally applicable to artificially prepared brine or salt solutions. Brines include continental brine deposits, geothermal brines, and waste or byproduct streams from industrial processes, Smackover brines, synthetic brines, and other brines resulting from oil and gas production. In some embodiments, the brines are brines from which energy has already been extracted. For instance, brines used herein include brines from which a power plant has already extracted energy through methods such as flashing.

The term "geothermal brine" refers to a saline solution that has circulated through the crustal rocks in areas of high heat flow and has become enriched in substances leached from those rocks. Geothermal brines, such as those found in the Salton Sea geothermal fields, can include many dissolved metal salts, including alkali, alkaline earth, and transition metal salts.

The term "Salton Sea brine" refers to geothermal brines obtained from the geothermal fields in San Diego County, Imperial County, and Riverside County, in California, USA.

The term "treated" in reference to a brine (e.g., "treated brine" or "treated geothermal brine") refers to brines that have been processed such that the concentration of at least one metal or elemental component has been reduced in the brine. For instance, a brine in which the concentration of silica and iron has been reduced is a treated brine, also referred to as reduced silica and iron brine.

The term "concentrated" in reference to a brine (e.g., "concentrated brine" or "concentrated geothermal brine") refers to brines that have reduced water content compared to the original brine. The reduced water content brine may be subsequently diluted post-concentration to prevent salt precipitation. In some embodiments, concentrated brines can result from evaporative processes.

The term "synthetic brine" refers to a brine that has been prepared such that it simulates a naturally occurring brine. For instance, a synthetic brine can be prepared in an attempt to simulate the brine composition of various geothermal brine reservoirs found in the Salton Sea region (Calif., U.S.). Generally, the synthetic brine simulating a Salton Sea geothermal brine has a composition of about 280 ppm lithium, 63,000 ppm sodium, 20,000 ppm potassium, 33,000 ppm calcium, 130 ppm strontium, 700 ppm zinc, 1700 ppm iron, 450 ppm boron, 50 ppm sulfate, 3 ppm fluoride, 450 ppm ammonium ion, 180 ppm barium, 160 ppm silica (reported as $SiO_2$), and 180,000 ppm chloride. Additional elements, such as manganese, aluminum, antimony, bromine, chromium, cobalt, copper, fluorine, lead, arsenic, mercury, molybdenum, nickel, silver, thallium, and vanadium, may also be present in the brine.

The term "lithium salts" can include lithium nitrates, lithium sulfates, lithium bicarbonate, lithium halides (particularly chlorides and bromides), and acid salts. For example, the Salton Sea brines have lithium chlorides.

As used herein, precipitates of iron oxides include iron oxides, iron hydroxides, iron oxide-hydroxides and iron oxyhydroxides.

Exemplary embodiments of the present invention include treated geothermal brine compositions. In an embodiment, the concentration of silica is less than about 5 mg/kg, and the iron concentration is less than about 10 mg/kg in the treated geothermal brine composition. In another embodiment, the concentration of silica is less than about 5 mg/kg, and the iron concentration is less than about 100 mg/kg. In another embodiment, the concentration of silica is less than about 10 mg/kg, and the iron concentration is less than about 100 mg/kg. In another embodiment, the concentration of silica is less than about 20 mg/kg, and the iron concentration is less than about 100 mg/kg. In another embodiment, the concentration of silica is less than about 10 mg/kg, and the iron concentration is less than about 200 mg/kg. In another embodiment, the concentration of silica is less than about 20 mg/kg, and the iron concentration is less than about 200 mg/kg. In another embodiment, the concentration of silica is less than about 30 mg/kg, and the iron concentration is less than about 300 mg/kg. In another embodiment, the concentration of silica is less than about 40 mg/kg, and the iron concentration is less than about 300 mg/kg. In another embodiment, the concentration of silica is less than about 40 mg/kg, and the iron concentration is less than about 200 mg/kg. In another embodiment, the concentration of silica is less than about 60 mg/kg, and the iron concentration is less than about 300 mg/kg. In another embodiment, the concentration of silica is less than about 70 mg/kg, and the iron concentration is less than about 300 mg/kg.

In certain embodiments, the composition contains a treated geothermal brine having a concentration of manganese ranging from 0 to 200 mg/kg, a concentration of silica ranging from 0 to 80 mg/kg, and a concentration of iron ranging from 0 to 300 mg/kg. In certain embodiments, the composition contains a treated geothermal brine having a concentration of manganese ranging from 0 to 200 mg/kg, a concentration of silica ranging from 0 to 30 mg/kg, and the concentration of iron ranging from 0 to 300 mg/kg.

In certain embodiments, the composition contains a treated geothermal brine having a concentration of manganese less than about 100 mg/kg, a concentration of silica less than about 30 mg/kg, and a concentration of iron less than about 300 mg/kg. In certain embodiments, the composition contains a treated geothermal brine having a concentration of manganese less than about 50 mg/kg, a concentration of silica less than about 30 mg/kg, and a concentration of iron less than about 300 mg/kg. In certain embodiments, the composition contains a treated geothermal brine having a concentration of manganese less than about 30 mg/kg, a concentration of silica less than about 30 mg/kg, and a concentration of iron less than about 300 mg/kg. In certain embodiments, the composition contains a treated geothermal brine having a concentration of manganese less than about 30 mg/kg, a concentration of silica less than about 30 mg/kg, and a concentration of iron less than about 200 mg/kg. In certain embodiments, the composition contains a treated geothermal brine having a concentration of manganese less than about 20 mg/kg, a concentration of silica less than about 20 mg/kg, and a concentration of iron less than about 200 mg/kg. In certain embodiments, the composition contains a treated geothermal brine having a concentration of manganese less than about 20 mg/kg, a concentration of silica less than about 20 mg/kg, and a concentration of iron less than about 100 mg/kg.

In certain embodiments, the composition contains a treated geothermal brine having a concentration of manganese less than about 20 mg/kg, a concentration of silica less than about 20 mg/kg, and a concentration of iron less than about 50 mg/kg. In certain embodiments, the composition contains a treated geothermal brine having a concentration of manganese less than about 10 mg/kg, a concentration of silica less than about 20 mg/kg, and a concentration of iron less than about 100 mg/kg. In certain embodiments, the composition contains a treated geothermal brine having a concentration of manganese less than about 10 mg/kg, a concentration of silica less than about 10 mg/kg, and a concentration of iron less than about 100 mg/kg. In certain embodiments, the composition contains a treated geothermal brine having a concentration of manganese less than about 10 mg/kg, a concentration of silica less than about 10 mg/kg, and a concentration of iron less than about 10 mg/kg. In certain embodiments, the composition contains a treated geothermal brine having a concentration of manganese less than about 5 mg/kg, a concentration of silica less than about 5 mg/kg, and a concentration of iron less than about 5 mg/kg.

In other aspects, the invention provides methods of using the treated geothermal brine compositions described herein. For example without limitations, the treated geothermal brine compositions can be supplied to a process for mineral extraction. For example without limitations, the minerals that can be extracted selectively or in combination from the treated geothermal brine include zinc, potassium, rubidium, cesium, phosphates, lithium, and lead. Also disclosed are exemplary embodiments of methods of using the treated geothermal brine compositions described herein by injecting the treated geothermal brine compositions into a geothermal reservoir.

In another embodiment, the treated geothermal brine compositions described herein have a concentration of arsenic ranging from 0 to 7 mg/kg. In another embodiment, the treated geothermal brine compositions described herein have a concentration of barium ranging from 0 to 200 mg/kg. In another embodiment, the treated geothermal brine compositions described herein have a concentration of lead ranging from 0 to 100 mg/kg. In another embodiment, the treated geothermal brine compositions described herein are Salton Sea brines. In certain embodiments, the treated geothermal brine is a concentrated geothermal brine.

Also disclosed are exemplary embodiments of treated Salton Sea geothermal brine compositions containing a concentration of manganese ranging from 0 to 200 mg/kg, a concentration of silica ranging from 0 to 80 mg/kg, and a concentration of iron ranging from 0 to 300 mg/kg. In another embodiment, the treated geothermal brine compositions described herein have a concentration of arsenic ranging from 0 to 7 mg/kg. In another embodiment, the treated geothermal brine compositions described herein have a concentration of barium ranging from 0 to 200 mg/kg. In another embodiment, the treated geothermal brine compositions described herein have a concentration of lead ranging from 0 to 100 mg/kg. In another embodiment, the treated geothermal brine compositions described herein have a concentration of arsenic less than about 7 mg/kg, barium less than about 200 mg/kg, and lead less than about 100 mg/kg. In another embodiment, the invention provides a geothermal brine composition having a pH of about 4.0 to about 6.0 that has less than 20 ppm by weight of silica, less than 20 ppm by weight of iron, and further wherein the geothermal brine composition has TSS of less than 10 ppm.

In some embodiments, the treated geothermal brine has a concentration of silica less than about 80 mg/kg. In some embodiments, the treated geothermal brine has a concentration of silica less than about 30 mg/kg. In some embodiments, the treated geothermal brine has a concentration of silica that is less than about 25 mg/kg. In some embodiments, the treated geothermal brine has a concentration of silica that is less than about 20 mg/kg. In some embodiments, the treated geothermal brine has a concentration of silica that is less than about 15 mg/kg. In some embodiments, the treated geothermal brine has a concentration of silica that is less than about 12 mg/kg. In some embodiments, the treated geothermal brine has a concentration of silica that is less than about 10 mg/kg. In some embodiments, the treated geothermal brine has a concentration of silica that is less than about 8 mg/kg. In some embodiments, the treated geothermal brine has a concentration of silica that is less than about 5 mg/kg. In some embodiments, the treated geothermal brine has a concentration of silica that is less than about 1 mg/kg. Exemplary embodiments of the present invention include treated geothermal brine compositions with reduced concentrations of silica. In an embodiment, the concentration of silica ranges from 0 to 5 mg/kg. In another embodiment, the concentration of silica ranges from 0 to 10 mg/kg. In another embodiment, the concentration of silica ranges from 0 to 15 mg/kg. In another embodiment, the concentration of silica ranges from 0 to 20 mg/kg. In another embodiment, the concentration of silica ranges from 0 to 25 mg/kg. In another embodiment, the concentration of silica ranges from 0 to 30 mg/kg. In another embodiment, the concentration of silica ranges from 0 to 35 mg/kg. In another embodiment, the concentration of silica ranges from 0 to 40 mg/kg. In another embodiment, the concentration of silica ranges from 0 to 45 mg/kg. In another embodiment, the concentration of silica ranges from 0 to 50 mg/kg. In another embodiment, the concentration of silica ranges from 0 to 55 mg/kg. In another embodiment, the concentration of silica ranges from 0 to 60 mg/kg. In another embodiment, the concentration of silica ranges from 0 to 65 mg/kg. In another embodiment, the concentration of silica ranges from 0 to 70 mg/kg. In another embodiment, the concentration of silica ranges from 0 to 75 mg/kg. In another embodiment, the concentration of silica ranges from 0 to 80 mg/kg. In another embodiment, the concentration of silica ranges from 0 to 85 mg/kg. In another embodiment, the concentration of silica ranges from 0 to 90 mg/kg. In another embodiment, the concentration of silica ranges from 0 to 95 mg/kg. In another embodiment, the concentration of silica ranges from 0 to 100 mg/kg.

In some embodiments, the treated geothermal brine has a concentration of iron that ranges from 0 to 300 mg/kg. In some embodiments, the treated geothermal brine has a concentration of iron that is less than about 300 mg/kg. In some embodiments, the treated geothermal brine has a concentration of iron that is less than about 250 mg/kg. In some embodiments, the treated geothermal brine has a concentration of iron that is less than about 200 mg/kg. In some embodiments, the treated geothermal brine has a concentration of iron that is less than about 100 mg/kg. In some embodiments, the treated geothermal brine has a concentration of iron that is less than about 75 mg/kg. In some embodiments, the treated geothermal brine has a concentration of iron that is less than about 50 mg/kg. In some embodiments, the treated geothermal brine has a concentration of iron that is less than about 40 mg/kg. In some embodiments, the treated geothermal brine has a concentration of iron that is less than about 30 mg/kg. In some embodiments, the treated geothermal brine has a concentration of iron that is less than about 20 mg/kg. In some embodiments, the treated geothermal brine has a concentration of iron that is less than about 10 mg/kg. In some embodiments, the treated geothermal brine has a concentration of iron that is less than about 5 mg/kg. In some embodiments, the treated geothermal brine has a concentration of iron that is less than about 1 mg/kg.

Exemplary embodiments of the present invention include treated geothermal brine compositions with reduced concentrations of manganese. In an embodiment, the concentration of manganese ranges from 0 to 200 mg/kg. In another embodiment, the concentration of manganese ranges from 0 to 5 mg/kg. In another embodiment, the concentration of manganese ranges from 0 to 10 mg/kg. In another embodiment, the concentration of manganese ranges from 0 to 15 mg/kg. In another embodiment, the concentration of manganese ranges from 0 to 20 mg/kg. In another embodiment, the concentration of manganese ranges from 0 to 25 mg/kg. In another embodiment, the concentration of manganese ranges from 0 to 30 mg/kg. In another embodiment, the concentration of manganese ranges from 0 to 35 mg/kg. In another embodiment, the concentration of manganese ranges from 0 to 40 mg/kg. In another embodiment, the concentration of manganese ranges from 0 to 45 mg/kg. In another embodiment, the concentration of manganese ranges from 0 to 50 mg/kg. In another embodiment, the concentration of manganese ranges from 0 to 55 mg/kg. In another embodiment, the concentration of manganese ranges from 0 to 60 mg/kg. In another embodiment, the concentration of manganese ranges from 0 to 65 mg/kg. In another embodiment, the concentration of manganese ranges from 0 to 70 mg/kg. In another embodiment, the concentration of manganese ranges from 0 to 75 mg/kg. In another embodiment, the concentration of manganese ranges from 0 to 80 mg/kg. In another embodiment, the concentration of manganese ranges from 0 to 85 mg/kg. In another embodiment, the concentration of manganese ranges from 0 to 90 mg/kg. In another embodiment, the concentration of manganese ranges from 0 to 95 mg/kg. In another embodiment, the concentration of manganese ranges from 0 to 100 mg/kg. In another embodiment, the concentration of manganese ranges from 0 to 120 mg/kg. In another embodiment, the concentration of manganese ranges from 0 to 150 mg/kg. In another embodiment, the concentration of manganese ranges from 0 to 170 mg/kg. In another embodiment, the concentration of manganese ranges from 0 to 190 mg/kg. In another embodiment, the concentration of manganese ranges from 0 to 200 mg/kg. In another embodiment, the concentration of manganese ranges from 0 to 220 mg/kg. In another embodiment, the concentration of manganese ranges from 0 to 250 mg/kg. In another embodiment, the concentration of manganese ranges from 0 to 270 mg/kg. In another embodiment, the concentration of manganese ranges from 0 to 290 mg/kg. In another embodiment, the concentration of manganese ranges from 0 to 300 mg/kg. In another embodiment, the concentration of manganese ranges from 0 to 320 mg/kg. In another embodiment, the concentration of manganese ranges from 0 to 350 mg/kg.

Exemplary embodiments of the present invention include treated geothermal brine compositions with reduced concentrations of zinc. In an embodiment, the concentration of zinc ranges from 0 to 200 mg/kg. In another embodiment, the concentration of zinc ranges from 0 to 5 mg/kg. In another embodiment, the concentration of zinc ranges from 0 to 10 mg/kg. In another embodiment, the concentration of zinc ranges from 0 to 15 mg/kg. In another embodiment, the concentration of zinc ranges from 0 to 20 mg/kg. In another embodiment, the concentration of zinc ranges from 0 to 25 mg/kg. In another embodiment, the concentration of zinc ranges from 0 to 30 mg/kg. In another embodiment, the concentration of zinc ranges from 0 to 35 mg/kg. In another embodiment, the concentration of zinc ranges from 0 to 40 mg/kg. In another embodiment, the concentration of zinc ranges from 0 to 45 mg/kg. In another embodiment, the concentration of zinc ranges from 0 to 50 mg/kg. In another embodiment, the concentration of zinc ranges from 0 to 55 mg/kg. In another embodiment, the concentration of zinc ranges from 0 to 60 mg/kg. In another embodiment, the concentration of zinc ranges from 0 to 65 mg/kg. In another embodiment, the concentration of zinc ranges from 0 to 70 mg/kg. In another embodiment, the concentration of zinc ranges from 0 to 75 mg/kg. In another embodiment, the concentration of zinc ranges from 0 to 80 mg/kg. In another embodiment, the concentration of zinc ranges from 0 to 85 mg/kg. In another embodiment, the concentration of zinc ranges from 0 to 90 mg/kg. In another embodiment, the concentration of zinc ranges from 0 to 95 mg/kg. In another embodiment, the concentration of zinc ranges from 0 to 100 mg/kg. In another embodiment, the concentration of zinc ranges from 0 to 120 mg/kg. In another embodiment, the concentration of zinc ranges from 0 to 150 mg/kg. In another embodiment, the concentration of zinc ranges from 0 to 170 mg/kg. In another embodiment, the concentration of zinc ranges from 0 to 190 mg/kg. In another embodiment, the concentration of zinc ranges from 0 to 200 mg/kg. In another embodiment, the concentration of zinc ranges from 0 to 220 mg/kg. In another embodiment, the concentration of zinc ranges from 0 to 250 mg/kg. In another embodiment, the concentration of zinc ranges from 0 to 270 mg/kg. In another embodiment, the concentration of zinc ranges from 0 to 290 mg/kg. In another embodiment, the concentration of zinc ranges from 0 to 300 mg/kg. In another embodiment, the concentration of zinc ranges from 0 to 320 mg/kg.

In some aspects, the invention provides a method for producing geothermal power using geothermal brines and producing a reduced silica and iron brine having improved injectivity. The method includes flashing a geothermal brine containing silica and iron to generate electrical power. This flashing produces precipitated silica and a reduced silica brine. The precipitated silica is then separated from the reduced silica brine and returned to the flashing the geothermal brine step. The reduced silica brine is then exposed to air to facilitate oxidation and to produce precipitated silica and iron solids, and a reduced silica and iron brine. The silica and iron solids are then separated from the reduced silica and iron brine and optionally, at least a portion of the silica and iron solids are returned to the exposing the reduced silica brine to air step. The reduced silica and iron treated brine is then injected into a separate injection well, but the same reservoir, such as a geothermal reservoir, wherein the reduced silica and iron brine has improved injectivity as compared to the reduced silica brine. In further embodiments, the treated brine having reduced silica, and optionally iron, concentration is further treated to remove additional components selectively or in combination, such as lithium, manganese, and zinc.

In geothermal power plants, heat may be recovered from a geothermal brine through the use of one or more flash tanks in a process known as flashing. Any method of flashing may be used in the present invention. In some embodiments, the crystallizer reactor clarifier process is used. In other embodiments, the pH modification process is used. In some embodiments, the brine will be treated after it has left the first clarifier of a two clarifier processing system. In some embodiments, the brine will be treated after it has been completely processed by the clarifier system.

In further embodiments of the process, other components may be removed from the brine before the brine is injected into an underground region, such as a reservoir. In one embodiment, lithium is removed from the geothermal brine before the reduced silica and iron brine before it is injected into the underground region. In another embodiment, manganese is removed from the reduced silica and iron brine before it is injected into the underground region. In another embodiment, zinc is removed from the reduced silica and iron brine before it is injected into the underground region. In another embodiment, potassium is removed from the reduced silica and iron brine before it is injected into the underground region. In another embodiment, rubidium is removed from the reduced silica and iron brine before it is injected into the underground region. In another embodiment, cesium is removed from the reduced silica and iron brine before it is injected into the underground region. In further embodiments, any combination of these components is removed from the reduced silica and iron brine before it is injected into the underground region.

In some embodiments, the reduced silica and iron brine has less than about 20 ppm of silica. In some embodiments, the reduced silica and iron brine has less than about 20 ppm of iron. In further embodiments, the reduced silica and iron brine has less than about 20 ppm of silica and less than about 20 ppm of iron. In some embodiments, the reduced silica and iron brine has less than about 15 ppm of silica. In some embodiments, the reduced silica and iron brine has less than about 15 ppm of iron. In further embodiments, the reduced silica and iron brine has less than about 15 ppm of silica and less than about 15 ppm of iron. In some embodiments, the reduced silica and iron brine has less than about 10 ppm of silica. In some embodiments, the reduced silica and iron brine has less than about 10 ppm of iron. In further embodiments, the reduced silica and iron brine has less than about 10 ppm of silica and less than about 10 ppm of iron. In some embodiments, the reduced silica and iron brine has less than about 5 ppm of silica. In further embodiments, the reduced silica and iron brine has less than about 5 ppm of silica and less than about 10 ppm of iron.

Embodiments of the present invention yield treated brines with improved injectivity over untreated brines solutions. Injectivity is defined in terms of change in pressure over a given flow rate over time. Improvements in injectivity indicate that a brine is able to flow more freely over time, and thus will lead to less required cleanings of a well. One way to assess improved injectivity is through packed bed testing.

In another aspect, the invention provides a method for preventing silica scale in geothermal brine injection wells and improving injectivity of a treated aqueous brine solution by selectively removing silica and iron from a geothermal brine solution. The method includes obtaining a geothermal brine solution comprising silica and iron from a geothermal reservoir. The geothermal brine solution is then supplied to a silica management process to produce a reduced silica geothermal brine solution relative to the geothermal brine solution. The reduced silica geothermal brine solution is then supplied to an iron removal process to produce a treated aqueous brine solution relative to the reduced silica geothermal brine solution. The treated aqueous brine product solution is then injected into the geothermal reservoir. The treated brine also has a packed bed test result that yields an operation time at least 50% greater than an operation time of the geothermal brine solution.

In some embodiments, the step of supplying the geothermal brine solution to a silica management process and the step of supplying the reduced silica geothermal brine solution to an iron removal process are the same step. In other embodiments, the step of supplying the geothermal brine solution to a silica management process and the step of supplying the reduced silica geothermal brine solution to an iron removal process are different steps.

In further embodiments, the treated brine is further treated to remove manganese. In some embodiments, the process for removing manganese occurs after the geothermal brine is supplied to a silica management step. In some embodiments, the process for removing manganese occurs after the geothermal brine is supplied to both a silica management step and an iron removal process. In other embodiments, the treated brine is further treated to remove zinc.

In some embodiments, the treated brine has a packed bed test result that yields an operation time at least 100% greater than an operation time of the geothermal brine solution. In some embodiments, the treated brine has a packed bed test result that yields an operation time at least 200% greater than an operation time of the geothermal brine solution. In some embodiments, the treated brine has a packed bed test result that yields an operation time at least 300% greater than an operation time of the geothermal brine solution.

In another aspect, the invention provides a method for preventing silica scale in geothermal brine injection wells and improving injectivity of a treated brine by selectively removing silica and iron from a geothermal brine solution. The method includes obtaining a geothermal brine solution comprising silica and iron from a geothermal reservoir. The geothermal brine solution is supplied to a silica management process to produce a reduced silica geothermal brine solution relative to the geothermal brine solution. The reduced silica geothermal brine solution is supplied to an iron removal process to produce a treated brine. The treated brine is then injected into the geothermal reservoir. Additionally, the treated brine has a TSS of less than about 60 ppm. In some embodiments, the treated brine has a TSS of less than about 55 ppm. In some embodiments, the treated brine has a TSS of less than about 50 ppm. In some embodiments, the treated brine has a TSS of less than about 45 ppm. In some embodiments, the treated brine has a TSS of less than about 40 ppm. In some embodiments, the treated brine has a TSS of less than about 35 ppm. In some embodiments, the treated brine has a TSS of less than about 30 ppm. In some embodiments, the treated brine has a TSS of less than about 25 ppm. In some embodiments, the treated brine has a TSS of less than about 20 ppm. In some embodiments, the treated brine has a TSS of less than about 15 ppm. In some embodiments, the treated brine has a TSS of less than about 10 ppm.

In another aspect, the invention provides a method for generating energy from a geothermal brine solution and improving injectivity of a treated aqueous brine solution by selectively removing silica and iron from a geothermal brine solution used for energy production. The method includes obtaining a geothermal brine solution comprising silica and iron from a geothermal reservoir. The geothermal brine solution is then flashed to produce and recover heat and energy therefrom and to produce a spent geothermal brine solution. The spent geothermal brine solution is then supplied to a silica management process to produce a reduced silica geothermal brine solution relative to the spent geothermal brine solution. The reduced silica geothermal brine solution is then supplied to an iron removal process to produce a treated aqueous brine solution relative to the reduced silica geothermal brine solution. The treated aqueous brine product solution is then injected into the geothermal reservoir. Additionally, the treated brine has a TSS of less than about 60 ppm.

In some embodiments, the step of supplying the geothermal brine solution to a silica management process and the step of supplying the reduced silica geothermal brine solution to an iron removal process are the same step. In other embodiments, the step of supplying the geothermal brine solution to a silica management process and the step of supplying the reduced silica geothermal brine solution to an iron removal process are different steps. In further embodiments, the treated brine is further treated to remove manganese. In some embodiments, the process for removing manganese occurs after the geothermal brine is supplied to a silica management step. In some embodiments, the process for removing manganese occurs after the geothermal brine is supplied to both a silica management step and an iron removal process. In other embodiments, the treated brine is further treated to remove zinc.

In some embodiments, the treated brine has a TSS of less than about 55 ppm. In some embodiments, the treated brine has a TSS of less than about 50 ppm. In some embodiments, the treated brine has a TSS of less than about 45 ppm. In some embodiments, the treated brine has a TSS of less than about 40 ppm. In some embodiments, the treated brine has a TSS of less than about 35 ppm. In some embodiments, the treated brine has a TSS of less than about 30 ppm. In some embodiments, the treated brine has a TSS of less than about 25 ppm. In some embodiments, the treated brine has a TSS of less than about 20 ppm. In some embodiments, the treated brine has a TSS of less than about 15 ppm. In some embodiments, the treated brine has a TSS of less than about 10 ppm.

In another aspect, the invention provides a treated geothermal brine composition having a pH of about 4.0 to about 6.0 that has less than about 20 ppm by weight of zinc, less than about 20 ppm by weight of silica, less than about 20 ppm by weight of iron, and further wherein the treated geothermal brine composition has TSS of less than about 30 ppm. In some embodiments, the treated geothermal brine composition has a TSS of less than about 25 ppm. In some embodiments, the treated geothermal brine composition has a TSS of less than about 20 ppm. In some embodiments, the treated geothermal brine composition has a TSS of less than about 15 ppm. In some embodiments, the treated geothermal brine composition has a TSS of less than about 10 ppm.

Packed Bed Testing

The objective of packed bed testing is to simulate injectivity of brine solutions. This entails pumping a brine solution through a material that simulates the region where the brine is to be injected. Incompatibility is primarily manifested as a shorter run time to reach a 1000 maximum psi, due to generation of suspended solids and scales that cause an increase in pressure across the packed bed.

In general, the packed beds should be selected such that granulated materials, such as rock chips, may be packed within the inner region, and such that the flow of brine may be allowed continuously over the granulated materials under pressures up to at least 1000 psig and temperatures ranging from about 80 to 110° C. The primary response factor for the packed bed testing is the time period, or operation time, that the brine is able to be pumped through the packed bed, until scaling and blockage cause the head pressure to reach 1000 psi. Long-term permeable flow is desired, so the longer the packed bed unit runs, the better the potential outcome of the brine for injecting into a reservoir. In some embodiments, the brine can be injected into the reservoir from which it was obtained (also sometimes referred to as "reinjecting"). In some embodiments, the brine can be injected into a different reservoir than the one from which it was obtained.

In some embodiments, the beds are packed with screened drilling rock chips from the well hydrothermal zone (e.g., from the well into which the brine will be injected). In some embodiments, the rock chips may be primarily of two types: 1) hydrothermally-crystallized fine-grained granitic material composed of quartz and feldspar, and 2) silica-bonded meta-siltstone. In some embodiments, the packed beds may be a combination of the two types of rock chips. In other embodiments, the packed beds may be primarily of a single type of rock chip. In some embodiments, the packing material is uniform in size.

In order to yield appropriate comparisons, the same type of material and packing should be used in both packed bed tests (i.e., for the treated and untreated brine) for the comparative testing. The packed beds will have brine pumped through them until the pressure reaches about 1000 psig at 1 LPM brine flow. Thus, the materials for the packed beds should be selected from materials that will allow for such pressures and temperatures ranging from about 80 to 110° C. By comparing the packed bed tests of a treated and an untreated brine, one can assess whether the treatment process used has improved injectivity and reduced scaling. If a treated brine has a longer operation time, or the time to reach 1000 psi, then the treated brine will have improved injectivity. In some embodiments, the treated brine has an operation time at least about 50% greater than the operation time of the untreated brine solution. In some embodiments, the treated brine has an operation time at least about 100% greater than the operation time of the untreated brine solution. In some embodiments, the treated brine has an operation time at least about 150% greater than the operation time of the untreated brine solution. In some embodiments, the treated brine has an operation time at least about 200% greater than the operation time of the untreated brine solution. In some embodiments, the treated brine has an operation time at least about 250% greater than the operation time of the untreated brine solution. In some embodiments, the treated brine has an operation time at least about 300% greater than the operation time of the untreated brine solution.

The quantity of total suspended solids is also an important parameter for assessing brines. TSS can indicate whether brines may have minerals that could precipitate solids and generate suspended solids, contributing to scaling and plugging. In some embodiments, the TSS of the treated brine will be less than about 60 ppm. In some embodiments, the TSS of the treated brine will be less than about 30 ppm. In some embodiments, the TSS of the treated brine will be less than about 25 ppm. In some embodiments, the TSS of the treated brine will be less than about 20 ppm. In some embodiments, the TSS of the treated brine will be less than about 15 ppm. In some embodiments, the TSS of the treated brine will be less than about 10 ppm.

Broadly, also described herein are methods for the selective removal of silica and silicates (typically reported as silicon dioxide ($SiO_2$)) from solution. Methods for the removal of silica are commonly known as silica management. As used herein, the selective removal of silica generally refers to methods to facilitate the removal of silica from solutions, such as geothermal brines, Smackover brines, synthetic brines, and other brines resulting from oil and gas production without the simultaneous removal of other ions. In certain embodiments, silica is selectively removed such that the silica can be further refined or supplied to an associated process, without the need for extensive purification thereof. In some embodiments, the brines are brines from which energy has already been extracted. For instance, brines from which a power plant has already extracted energy through methods such as flashing. Broadly described, in certain embodiments, the methods described herein employ chemical means for the separation of silica. The removal of silica from solutions, such as geothermal brines, can prevent, reduce or delay scale formation as silica present in brines can form scale deposits. It is known that scale deposit formation is a common problem with geothermal brines and therefore the methods described herein for the selective removal of silica can be utilized to prevent scale formation in geothermal power equipment and also improve injectivity of treated brines in reservoirs. Additionally, the removal of silica from solutions, such as geothermal brines, also facilitates the subsequent recovery of various metals from the solution, such as lithium, manganese, zinc, as well as boron, cesium, potassium, rubidium, and silver. It is understood that the recovery of valuable metals from a geothermal brine depends upon the concentration of a metal in the brine, and the economics of the recovery thereof, which can vary widely among brines. The prevention, reduction, and/or delay of scale production in geothermal wells and geothermal power plant equipment can result in increased geothermal energy production by improving the equipment lifetime and reducing the frequency of equipment maintenance, as well as increase or prolong well permeability.

Typically, in geothermal power plants, heat is recovered from a geothermal brine through the use of one or more flash tanks. In certain embodiments, a silica precipitate seed can be supplied to the geothermal brine prior to the brine being supplied to the flash tanks to remove at least a portion of the silica present. In other embodiments, the post-flash geothermal brine from a geothermal plant is then fed through the silica management and iron removal steps. In certain embodiments, the silica precipitate seed can result in the removal of up to 25% of the silica present in the brine, alternatively up to about 40% of the silica present in the brine, alternatively up to about 50% of the silica present in the brine, alternatively up to about 60% of the silica present in the brine, or alternatively greater than about 60% of the silica present in the brine. In certain embodiments, the silica precipitate seed can reduce the silica concentration of the brine to less than about 200 ppm, alternatively less than about 175 ppm, alternatively less than about 160 ppm, alternatively less than about 145 ppm.

The geothermal brine supplied to the flash tanks is typically supplied at a temperature of at least about 250° C., alternatively at least about 300° C. After flashing of the geothermal brine and the recovery of significant heat and energy therefrom, the geothermal brine can be supplied to a silica management process (as further described herein) for the removal of additional silica. As noted previously, the removal of silica can prevent, reduce, or delay the buildup of scale, thereby increasing the lifetime of the equipment and improving injectivity of the treated brine. Typically, the temperature of the brine has been reduced to less than about 150° C. before it is supplied to one of the silica removal processes described herein, alternatively less than about 125° C., alternatively less than about 120° C., alternatively less than about 115° C., alternatively less than about 110° C., alternatively less than about 105° C., or alternatively less than about 100° C.

While the removal of silica from geothermal brines in geothermal power plants is useful for reducing scale buildup in the power plant, supplying the brine to one or more of the silica removal processes described herein also has the effect of reducing the injection temperature of the brine to less than about 100° C., alternatively less than about 90° C., alternatively less than about 80° C., alternatively less than about 75° C.

As described herein, the selective silica recovery of the present invention can include the use of activated alumina, aluminum salts (such as $AlCl_3$), or iron (III) oxyhydroxides.

In certain embodiments of the present invention, the brine or silica containing solution can first be filtered or treated to remove solids present prior to the selective recovery and removal of silica.

Simulated brines can be prepared to mimic naturally occurring brines. As described herein, a simulated brine can be prepared to mimic the brine composition of various test wells found in the Salton Sea geothermal fields (Calif., U.S.). Generally, the simulated brine is an aqueous solution having a composition of about 260 ppm lithium, 63,000 ppm sodium, 20,100 ppm potassium, 33,000 ppm calcium, 130 ppm strontium, 700 ppm zinc, 1700 ppm iron, 450 ppm boron, 54 ppm sulfate, 3 ppm fluoride, 450 ppm ammonium ion, 180 ppm barium, 160 ppm silicon dioxide, and 181,000 ppm chloride. Additional elements, such as manganese, aluminum, antimony, chromium, cobalt, copper, lead, arsenic, mercury, molybdenum, nickel, silver, thallium, and vanadium, may also be present in the brine. It is understood, however, that the methods described herein can be used to remove silica from brines and other silica containing solutions having silica concentrations greater than about 160 ppm. In certain embodiments, the brine or silica containing solution can have a silica concentration of greater than about 400 ppm, greater than about 500 ppm, or greater than about 600 ppm. In certain instances, geothermal brines can have silica concentrations of between about 400 and 600 ppm.

Selective Silica Recovery by Precipitation with Aluminum Salts

The addition of aluminum salts, such as $AlCl_3$, to brine at a pH of between about 4 and 6, results in the formation of charged polymers, such as $Al_3O_4(OH)_{24}^{7+}$. These charged polymers are highly reactive with respect to silica, resulting in the formation of amorphous aluminosilicate precipitates, which can be removed by filtration. In certain embodiments, any silica present in the brine will react with the positively charged polymer to form an amorphous aluminosilicate precipitate, thereby reducing the silica concentration of the brine. In certain embodiments, the brine can be seeded with an aluminosilicate precipitate, which allows the silica to attach to the seed material, thereby allowing the silica and aluminum polymer to be removed by conventional filtration or clarification processes. Typically, the aluminum polymers do not react with other components in the brine, such as lithium or iron, and thus they stay in solution while the silica forms the precipitate.

Silica can be selectively recovered from silica containing solutions (including brines) by contacting them with aluminum salts, particularly aluminum halides, such as chlorides and bromides and maintaining a pH of between about 4 and 6, preferably between about 4.5 and 5.5, more preferably between about 4.75 and 5.25, and even more preferably between about 4.85 and 5.15. Generally, the brine solution, as prepared, has a measured pH of between about 5.1 and 5.3, which is comparable to the brines of the Salton Sea, which typically have a measured pH of between about 4.9 and 5.1. Aluminum salt is added in a molar ratio of aluminum salt to silica of at least about 0.25:1, preferably at least about 0.5:1, and more preferably at least about 1:1. In certain embodiments, the aluminum salt to silica ratio is between about 0.5:1 and 2:1. Optionally, the solution can be maintained at elevated temperatures. In certain embodiments, the solution can be at a temperature greater than about 50° C., more preferably at least about 75° C., and even more preferably at least about 90° C. Optionally, the silica containing solution is seeded with between about 0.1 and 10% by weight of an amorphous aluminosilicate solid. In certain embodiments, the solution is seeded with between about 1 and 2% by weight of the amorphous aluminosilicate solid. In certain other embodiments, the solution is seeded with between about 1.25 and 1.75% by weight of the amorphous aluminosilicate solid.

The addition of, for example, aluminum chloride to an aqueous silica solution, such as brine, typically lowers the pH (i.e., acidifies) of the silica containing solution as the addition results in the production of aluminum hydroxide and hydrochloric acid. Typically, the pH is monitored during the process to maintain the solution at a constant pH. In certain embodiments, a base (for example, but not limited to, sodium hydroxide, calcium hydroxide, and the like) can be added to the silica containing solution to maintain the pH of the solution between about 4 and 6 alternatively, between about 4.5 and 5.5, and preferably at or about 5.

In certain embodiments, the addition rate of the base is near stoichiometric. In certain embodiments, the equipment can be designed to include control equipment to add the base in a controlled process so that at least a stoichiometric amount of base is added to the solution, based upon the amount of silica and $AlCl_3$ present in solution.

In certain embodiments, the amorphous aluminosilicate solid used as the seed material is prepared in a laboratory setting. Aluminum salt can be added to a concentrated sodium silicate solution that may optionally be heated, neutralized to a pH of between about 4 and 6, and stirred to form a precipitate. The precipitate is collected, washed, and dried.

Precipitation of the amorphous aluminosilicate with an aluminum salt is capable of removing at least 75% of the silica present in the silica containing solution, preferably at least about 90%, and even more preferably at least about 95% of the silica present in the silica containing solution. In certain embodiments, precipitation of silica from a silica containing solution with an aluminum salt results in a total silica concentration in the resulting solution of less than about 15 ppm, preferably less than about 10 ppm, and even more preferably less than about 5 ppm.

In one embodiment, the resulting amorphous aluminosilicate precipitate is removed from the solution by filtration, dried, and recycled as seed material for subsequent precipitation of silica. In other embodiments, the aluminosilicate precipitate is supplied to a subsequent process for recovery of silica and/or aluminum.

In certain embodiments, contacting the silica containing solution with an aluminum halide at a pH of between 4 and 6 results in the formation of a gel, which can be subsequently separated from the remaining aqueous solution by filtration, which can be aided by the use of a centrifuge.

In certain embodiments, precipitation occurs by adding a seed containing solution to the brine, contacting the mixture with aluminum chloride, and then contacting the resulting mixture with a base, such as limestone. NaOH or $Ca(OH)_2$. In other embodiments, the brine is contacted with $AlCl_3$, and the resulting mixture is contacted with a base. In yet other embodiments, the brine is contacted with $AlCl_3$, the mixture is then contacted with a seed containing solution, and the resulting mixture is then contacted with a base. Finally, in certain embodiments, the brine is first contacted with $AlCl_3$ then contacted with a base, and then the resulting mixture is contacted with a seed containing solution.

Referring now to FIG. 1, apparatus 100 for the removal of silica from a silica containing brine is provided. Water is provided via line 102. First water stream 102' is supplied to first mixer 106, where the water is mixed with base 104, for example NaOH (caustic soda) or $Ca(OH)_2$ (slaked lime) or limestone to produce aqueous base stream 108. First mixer 106 can include any known means for mixing the base and water to form a homogeneous stream. Second water stream 102" is supplied to second mixer 112 where the water is combined with flocculant 110 to produce mixed flocculant stream 114. Exemplary flocculants include, but are not limited to, Magnafloc 351, Nalco 9907, 9911, 9913, 8181, 7193, 8170, and the like.

Brine 116 is supplied to third mixer 120 where it is combined with aluminum chloride ($AlCl_3$) containing stream 118 to produce mixed brine stream 122. Aqueous base stream 108 is combined with mixed brine stream 122 in fourth mixer 124 to produce basic brine stream 126. Basic brine stream 126 is supplied to fifth mixer 128 where it is combined and intimately mixed with mixed flocculant stream 114 to coagulate at least a portion of the silica present in brine stream 126 as an aluminosilicate solid. Mixed stream 130 with a reduced silica brine and solids is supplied to clarifier 132 to produce reduced silica brine stream 134 and slurry stream 136, which can include aluminosilicate precipitate. Clarifier 132 can be a settling tank or like device that can be utilized for the separation of a liquid stream from a slurry. Slurry stream 136 can be supplied to filter 138, which separates the slurry into a solid aluminosilicate precipitate, which can be removed via solid removal line 140, and a precipitate removed treated brine stream 142. Precipitate removed treated brine stream 142 can then be recombined with reduced silica brine stream 134.

Fifth mixer 128 can include multiple stages. In one embodiment, fifth mixer 128 includes three reactor stages wherein the first reactor stage includes a mixer to facilitate intimate mixing of the brine, and the aluminum salt, to produce a solid aluminosilicate solid. The second reactor stage can include means for introducing the base, such as NaOH or $Ca(OH)_2$ to the reaction mixture. The second reactor stage can optionally include means for determining the pH of the solution, and control means, such as automated valves, operable to control the addition of the base to the solution to maintain a desired predetermined pH. In certain embodiments, the second reactor stage can include means for adding an aluminum salt to the solution. The third reactor stage can include means for stabilizing the pH of the solution, and means for supplying a buffer to the solution. In certain embodiments, the third reactor stage can include means for adding an aluminum salt to the solution.

Clarifier 132 can be a vessel and can include valves and lines configured to facilitate the removal of an aluminosilicate slurry from the bottom of the vessel and a low silica concentration brine stream from a position at the midpoint or top of the vessel. In certain embodiments, fifth mixer 128 or clarifier 132 can include a line for supplying a portion of the aluminosilicate precipitate to the basic brine stream 108 as seed. In certain embodiments, fifth mixer 128 can include a line for supplying a low silica concentration brine stream to brine stream 116.

The mixers used herein can each separately be a series of continuously stirred reactors. In certain embodiments, fourth mixer 124 can include at least one pH meter, wherein the feed of the aqueous base stream 108 and brine stream 112 are regulated to maintain a desired pH.

Selective Silica Recovery by Precipitation with Iron

In one embodiment, silica can be removed from a brine by contacting the brine with iron (III) hydroxide at a pH of between about 4.5 and 6, preferably between about 4.75 and 5.5, more preferably between about 4.9 and 5.3.

A synthetic brine can be prepared having the approximate composition provided herein for the simulated Salton Sea reservoir, and further including about 1880 ppm manganese. In certain embodiments, the brine will have an iron (II) salt, such as iron (II) chloride, naturally present in a concentration, for example, of greater than about 1000 ppm. In other embodiments, an iron (II) salt or iron (III) hydroxide can be added to the brine to achieve a certain concentration of iron (II) salt or iron (III) hydroxide relative to the silica or silicon containing compounds present in the brine. In certain embodiments, the molar ratio of the iron (II) salt or iron (III) hydroxide to silica is at least about 1:1, preferably at least about 4:1, more preferably at least about 7:1 and even more preferably at least about 10:1.

When the iron in the brine or silica containing solution is iron (I), for example iron (II) chloride, an oxidant can be added to oxidize iron (I) salt to iron (II) hydroxide. Exemplary oxidants include hypohalite compounds, such as hypochlorite, hydrogen peroxide (in the presence of an acid), air, halogens, chlorine dioxide, chlorite, chlorate, perchlorate and other analogous halogen compounds, permanganate salts, chromium compounds, such as chromic and dichromic acids, chromium trioxide, pyridinium chlorochromate (PCC), chromate and dichromate compounds, sulfoxides, persulfuric acid, nitric acid, ozone, and the like. While it is understood that many different oxidants can be used for the oxidation of iron (II) to iron (II), in an embodiment, oxygen or air is used as the oxidant and lime or a like base is used to adjust and maintain the pH to a range of between about 4 and 7. This pH range is selective for the oxidation of the iron (II) salt to iron (III) hydroxide, and generally does not result in the co-precipitation or co-oxidation of other elements or compounds present in the brine. In an embodiment, the iron (II) salt can be oxidized to iron (II) by sparging the reaction vessel with air. Air can be added at a rate of at least about 10 cfm per 300 L vessel, preferably between about 10 and 50 cfm per 300 L vessel. A person of skill in the art will recognize that the cfm rate can be adjusted based on specific operation parameters. It will be recognized by those skilled in the art that iron (III) hydroxide may also have a significant affinity for arsenic (III) and (V) oxyanions, and these anions, if present in the brine, may be co-deposited with the silica on the iron (III) hydroxide. Thus, in these embodiments, steps may have to be employed to remove arsenic from the brine prior to silica management.

In another embodiment, iron (II) hydroxide can be produced by adding a solution of iron (III) chloride to the brine, which upon contact with the more neutral brine solution, will precipitate as iron (III) hydroxide. The resulting brine may require subsequent neutralization with a base to initiate precipitation of the silica. In certain embodiments, iron (III) hydroxide can be contacted with lime to form insoluble ferric hydroxide solids, which can be adsorbed with silica.

The iron (III) hydroxide contacts the silica present in the brine to form a precipitate. Without being bound to any specific theory, it is believed that the silica or silicon-containing compound attaches to the iron (I) hydroxide. In certain embodiments, the ratio of iron (III) hydroxide to silica is at least about 1:1, more preferably at least about 4:1, more preferably at least about 7:1. In other embodiments, the iron (III) hydroxide is present in a molar excess relative to the silica. The reaction of the iron (III) hydroxide with silica is capable of removing at least about 80% of the silica present, preferably at least about 90% of the silica present, and more preferably at least about 95% of the silica present, and typically depends upon the amount of iron (III) hydroxide present in the solution.

In certain embodiments, the pH is monitored continually during the reaction of iron (III) with silica and an acid or a base is added, as needed, to maintain the pH the desired level, for example, between about 4.9 and 5.3. In alternate embodiments, a pH of between about 5.1 and 5.25 is maintained. In certain embodiments, a pH of about 5.2 is maintained.

In certain embodiments, the iron (II) salt containing solution is sparged with air for a period of at least about 5 minutes, alternately at least about 10 minutes, alternately at least about 15 minutes, and preferably at least about 30 minutes, followed by the addition of a base, such as calcium oxide, calcium hydroxide, sodium hydroxide, or the like, to achieve the desired pH for the solution. A person of skill in the art will recognize that the sparging time can be adjusted based on specific operation parameters. In certain embodiments, the base can be added as an aqueous solution, such as a solution containing between about 10 and 30% solids by weight.

In certain embodiments, a flocculant, such as the Magnafloc® products from Ciba®, for example Magnafloc 351, or a similar flocculant can be added in the clarification step. The flocculant can be added in an aqueous solution in amounts between about 0.005% by weight and about 1% by weight. The flocculant can be added at a rate of at least 0.001 gpm, preferably between about 0.001 and 1 gpm, based upon a 300 L vessel. A person of skill in the art will recognize that the gpm can be adjusted based on specific operation parameters. In certain embodiments, the flocculant is a non-ionic flocculant. In other embodiments, the flocculant is a cationic flocculant. In certain embodiments, it is believed that non-ionic and cationic flocculants may be useful for use with iron precipitates. In certain embodiments, Cytec Superfloc-N flocculants, such as the N-100, N-100 S, N-300, C-100, C-110, C-521, C-573, C-577 and C581 may be used for the recovery of iron and silica precipitates, according to the present invention. In other embodiments, flocculant products from Nalco, such as CAT-Floc, MaxiFloc, Nalco 98DF063, Nalco 1317 Liquid, Nalco 97ND048, Nalco 9907 Flocculant, Nalco 73281, and Nalco 9355 may be used with the present invention.

In certain embodiments, a flocculant can be added to the brine, in addition to the base, to facilitate the production of larger solids for easier solid/liquid separation. In certain embodiments, iron (III) silicate solids can be added to the solution to increase the rate of precipitation of silicates.

Figure 2:
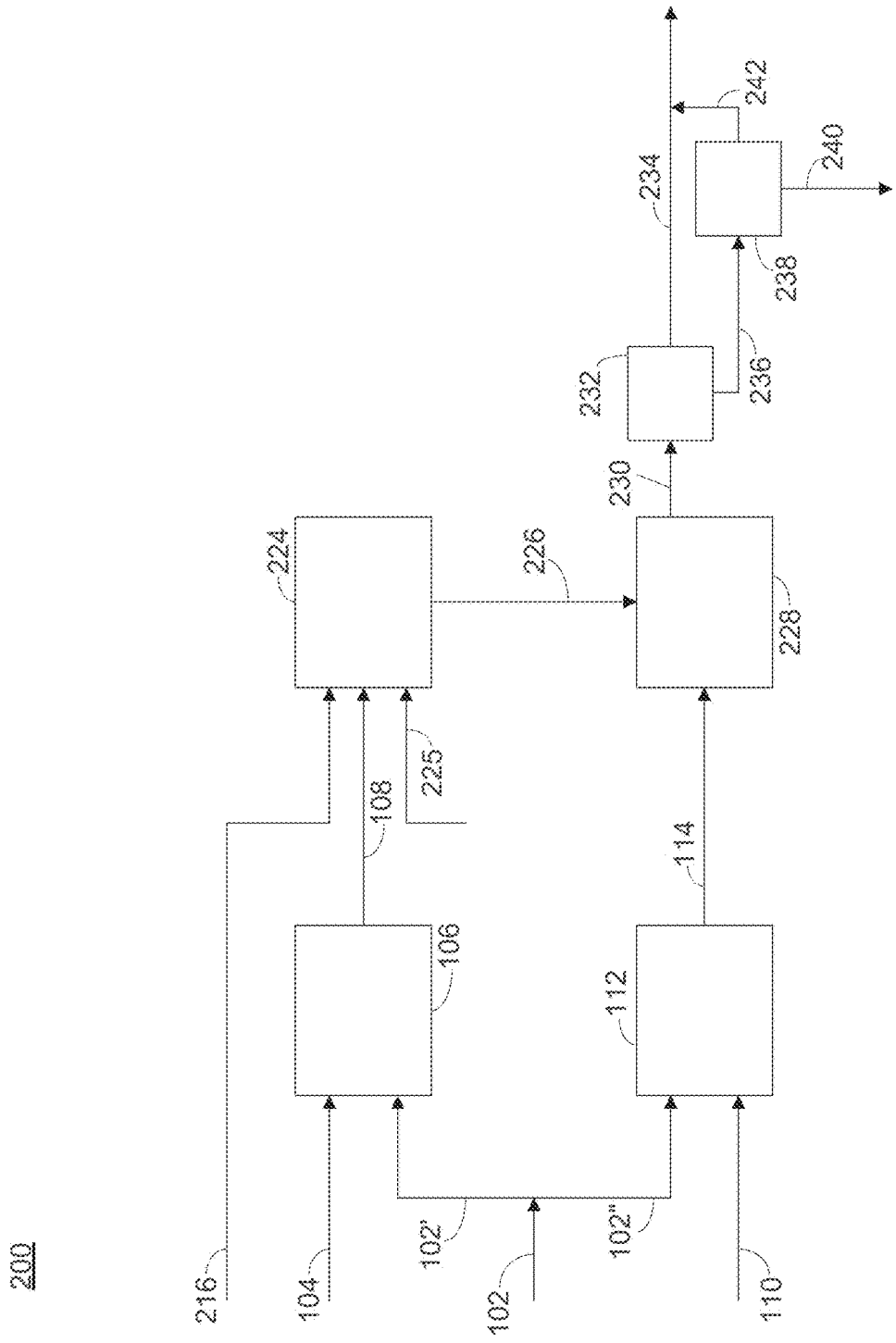
FIG. 2 is an illustration of an apparatus for the removal of silica from a silica containing brine according to an embodiment of the present invention.

Referring now to FIG. 2, apparatus 200 for the removal of silica from a silica containing brine is provided. Water is provided via line 102. First water stream 102' is supplied to first mixer 106, where the water is mixed with base 104, for example NaOH (caustic soda) or Ca(OH)$_2$ (slaked lime), to produce aqueous base stream 108. First mixer 106 can include any known means for mixing the base and water to form a homogeneous stream. Second water stream 102" is supplied to second mixer 112 where the water is combined with flocculant 110 to produce mixed flocculant stream 114.

Brine 216 is supplied to third mixer 224 where it is combined with aqueous base stream 108 and air 225 to produce mixed brine stream 226, with iron-silica precipitates. Mixed brine stream 226 is supplied to fourth mixer 228 where it is combined and intimately mixed with mixed flocculant stream 114 to further encourage precipitation of at least a portion of the silica present in brine stream 226. Mixed stream 230 containing a reduced silica brine and solids is supplied to clarifier 232 to produce reduced silica brine stream 234 and slurry stream 236, which can include iron-silica precipitates. Clarifier 232 can be a settling tank or like device that can be utilized for the separation of a liquid stream from a slurry including a filter such as candle filters. Slurry stream 236 can be supplied to filter 238, which separates the slurry into a solid precipitate, which can be removed via solid removal line 240, and a precipitate removed treated brine stream 242. Solids removed via solid removal line 240 can optionally be separated from any remaining liquid by centrifugation. Precipitate removed treated brine stream 242 can then be recombined with reduced silica brine stream 234. Optionally, precipitate removed treated brine stream 242 can be recycled to third mixer 224, or alternatively can be combined with brine stream 226.

Fourth mixer 228 can include multiple stages. In an embodiment, fourth mixer 228 includes three reactor stages wherein the first reactor stage includes a mixer to facilitate intimate mixing of the brine and air. In some embodiments, sufficient air is supplied to the reactor to oxidize at least a portion of the iron (II) present to iron (III). The second reactor stage can include means for introducing the base, such as NaOH or Ca(OH)$_2$ to the reaction mixture. The second reactor stage can optionally include means for determining the pH of the solution, and control means, such as automated valves, operable to control the addition of the base to the solution to maintain a desired predetermined pH. In certain embodiments, the third reactor stage can include means for adding an aluminum salt to the solution. Optionally, apparatus 200 can include means for supplying air to the second and third reactor stages.

In certain embodiments, the brine is supplied to the first reactor stage at a pH of about 4.9 to 5.1 and a temperature of about 95 to 110° C. where it is contacted and sparged with air to produce certain iron (III) oxyhydroxides. Preferably, a sparging diffuser is utilized to facilitate contact between the air and iron (II) contained in the brine. At a temperature of greater than about 90° C., the pH of the first reactor stage is controlled such that the pH is at least about 2.5, but preferably in the range of 3.5 to 5.3. The pH is maintained by the addition of lime or other base to the reactor to prevent the pH becoming too acidic, which would prevent further oxidation of the iron (II) to iron (III).

In certain embodiments, in the second reactor stage, the lime or other base is added while continuing to sparge air through the brine. This provokes precipitation of ferric ions as oxides, hydroxides, or oxyhydroxides. Additionally, silica and other metals are adsorbed on the surface of the iron oxyhydroxides. The metals that adsorb on the ferric oxyhydroxides include arsenic, antimony, lead, and barium. The pH of the second stage of the reactor is maintained such that the pH of no greater than about 6, alternatively not greater than about 5.4, preferably not above about 5.3, and more preferably not above about 5.2. Additional air can be fed to the second reactor stage through a sparger, such as an air diffuser, to facilitate the preparation and precipitation of iron (III) hydroxides adsorbed with silica.

In certain embodiments, the third reactor stage can serve as a buffer tank that is configured to maintain the pH of the solution at a pH of no greater than about 6, alternatively not greater than about 5.4, preferably not greater than about 5.3, and even more preferably at a pH of not greater than about 5.2. Optionally, the third reactor stage can include an air sparger, such as an air diffuser, to facilitate preparation and precipitation of iron (III) hydroxides adsorbed with silica.

Clarifier 232 can be a vessel and can include valves and lines configured to facilitate the removal of an iron-silica slurry from the bottom of the vessel and a reduced silica concentration brine stream from a position at the midpoint or top of the vessel. In certain embodiments, fourth mixer 228 or clarifier 232 can include a line for supplying a portion of the iron-silica precipitate to the basic brine stream 216 as seed. Alternatively, clarifier 232 can include one or more lines configured to deliver iron (II) hydroxide precipitate material adsorbed with silica to one or more of the first, second, or third reactor stages. In certain embodiments, fourth mixer 228 can include a line for supplying a reduced silica concentration brine stream to basic brine stream 216.

In certain embodiments, apparatus 200 can include control means for controlling the addition of base to third mixer 224. In alternate embodiments, apparatus 200 can include control means for controlling the addition of base to the second reactor stage.

In certain embodiments, brine stream 216 can be preconditioned by sparging the brine stream with air prior to supplying the brine to third mixer 224.

The mixers used herein can each separately be a series of continuously stirred reactors. In certain embodiments, third mixer 224 can include at least one pH meter, wherein the feed of the aqueous base stream 108 and brine stream 216 are regulated to maintain a desired pH.

In certain embodiments, precipitation of silica and iron hydroxide can be achieved by recycling precipitate from the clarifier 232 to third mixer 224, resulting in an increase of the size of ferrosilicate particles. Additional recycling can also be achieved by recycling the seeds from clarifier 232 to first mixer 106, where base 104 is mixed with some or all of the seeds to promote the formation of a densified seed, which can then be fed to third mixer 224. This recycling step can enhance the quality of the precipitate by increasing density of the precipitate, thus making the design of clarifier 232 smaller and simpler. It has also surprisingly been found that on the introduction of these solids to the reaction vessel a minor amount of the zinc and/or manganese is retained in the precipitate. In certain embodiments, when seeds are re-introduced into third mixer 224, there is no or minimal net loss of zinc and manganese that may be present in the brine, and the ability of the ferrosilicate precipitate to grow and capture silica is unimpaired.

The rate of the addition of the air, base, and flocculant is based upon the size of the reactor and the concentrations of iron and silica. Generally, the rates of addition of the components is proportional to the other components being added and the size of the reaction vessels. For example, to a geothermal brine having iron and silica present, which is supplied at a rate of about 6 gpm (gallons per minute) to a silica removal process having an overall capacity of about 900 gallons, air can be added at a rate of about 100 cfm, a 20% solution of calcium oxide in water can be added at a rate of about 0.5 lb/min., and a 0.025% solution of Magnafloc 351 (flocculant) at a rate of about 0.01 gpm.

Selective Silica Recovery with Activated Alumina

Activated alumina is a known absorbent for silica. In certain embodiments, activated alumina is a mixture of $\gamma$-$Al_2O_3$ and $AlO(OH)$ (boehmite). Specifically, activated alumina has been utilized in the removal of silica from raw water, such as water that is fed to a boiler. Activated alumina has not been used for the removal of silica from brines, wherein the removal of the silica does not also result in the removal of other ions or compounds by the activated alumina. Methods have not been reported for the selective removal of silica from brines without concurrent removal of other ions or compounds.

Activated alumina is a known absorbent for organic and inorganic compounds in nonionic, cationic, and anionic forms. Indeed, activated alumina is a common filter media used in organic chemistry for the separation and purification of reaction products.

In another embodiment of the present invention, silica can be removed from a brine by contacting the brine with activated alumina at a pH of between about 4.5 and 7, alternatively between about 4.75 and 5.75, or in certain embodiments, between about 4.8 and 5.3. The activated alumina can have a BET surface area of between about 50 and 300 $m^2/g$. In certain embodiments, the brine can be combined and stirred with activated alumina to selectively remove the silica. In alternate embodiments, the activated alumina can be added to the brine and stirred to selectively remove silica and silicon containing compounds. In certain embodiments, the pH of the brine can be maintained at between about 4.5 and 8.5, preferably between about 4.75 and 5.75, and more preferably between about 4.8 and 5.3, during the step of contacting the silica with the activated alumina. In certain embodiments, the pH can be maintained at between about 4.75 and 5.25. Alternatively, the pH can be maintained at between about 5.25 and 5.75. Alternatively, the pH can be maintained at between about 5.75 and about 6.25. A pH meter can be used to monitor the pH before, during, and after the contacting step. In certain embodiments, the pH is controlled by titrating the solution with a strong base, such as sodium hydroxide. In an exemplary embodiment, approximately 0.1M solution of sodium hydroxide is used to adjust the pH of the reaction, although it is understood that a base of higher or lower concentration can be employed.

Regeneration of the activated alumina can be achieved by first washing the alumina with a base, for example, a sodium hydroxide solution of at least about 0.01M, followed by the subsequent washing with an acid, for example, a hydrochloric acid solution of at least about 0.01M. In some embodiments, regeneration can be followed by treatment with a sodium fluoride solution having a pH of between about 4 and 5, to completely recover the capacity of the activated alumina. Optionally, the column can be rinsed with water, preferably between 1 and 5 volumes of water, prior to contacting with sodium hydroxide.

In certain embodiments, wherein the silica containing solution can be contacted with the activated alumina in a column, the solution exiting the column can be monitored to determine loading of the activated alumina.

Figure 3:
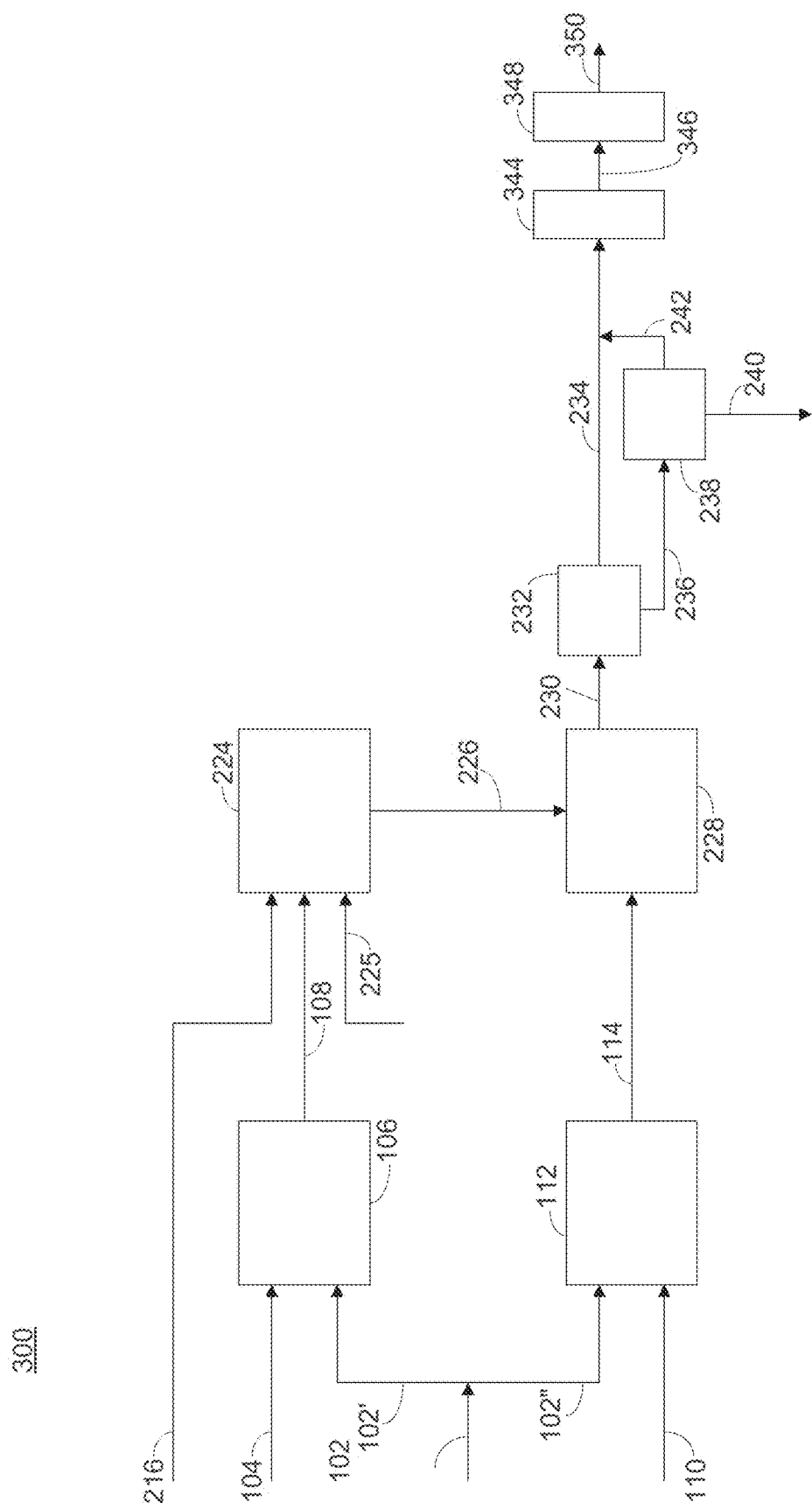
FIG. 3 is an illustration of an apparatus for the removal of silica from a silica containing brine according to an embodiment of the present invention.

FIG. 3 details apparatus 300 and shows an embodiment that incorporates removal of silica by precipitation with iron, as shown in FIG. 2, followed by removal of any remaining silica by adsorption with activated alumina. Specifically, low silica brine stream 234 can be supplied to first adsorbent column 344, which is charged with activated alumina and is operable to remove at least a portion of the silica present in the low silica brine stream. Treated stream 346 is then supplied to a second adsorbent column 348, which is similarly charged with activated alumina and is operable to remove at least a portion of the silica present in the treated stream, to produce product stream 350, which has a silica content that is lower than that of the low silica brine stream 234. In embodiments wherein treated stream 346 includes a measurable concentration of silica, second adsorbent column 348 is operable to produce a product stream 350 having a lower silica concentration than that of the treated stream 346.

Figure 4:
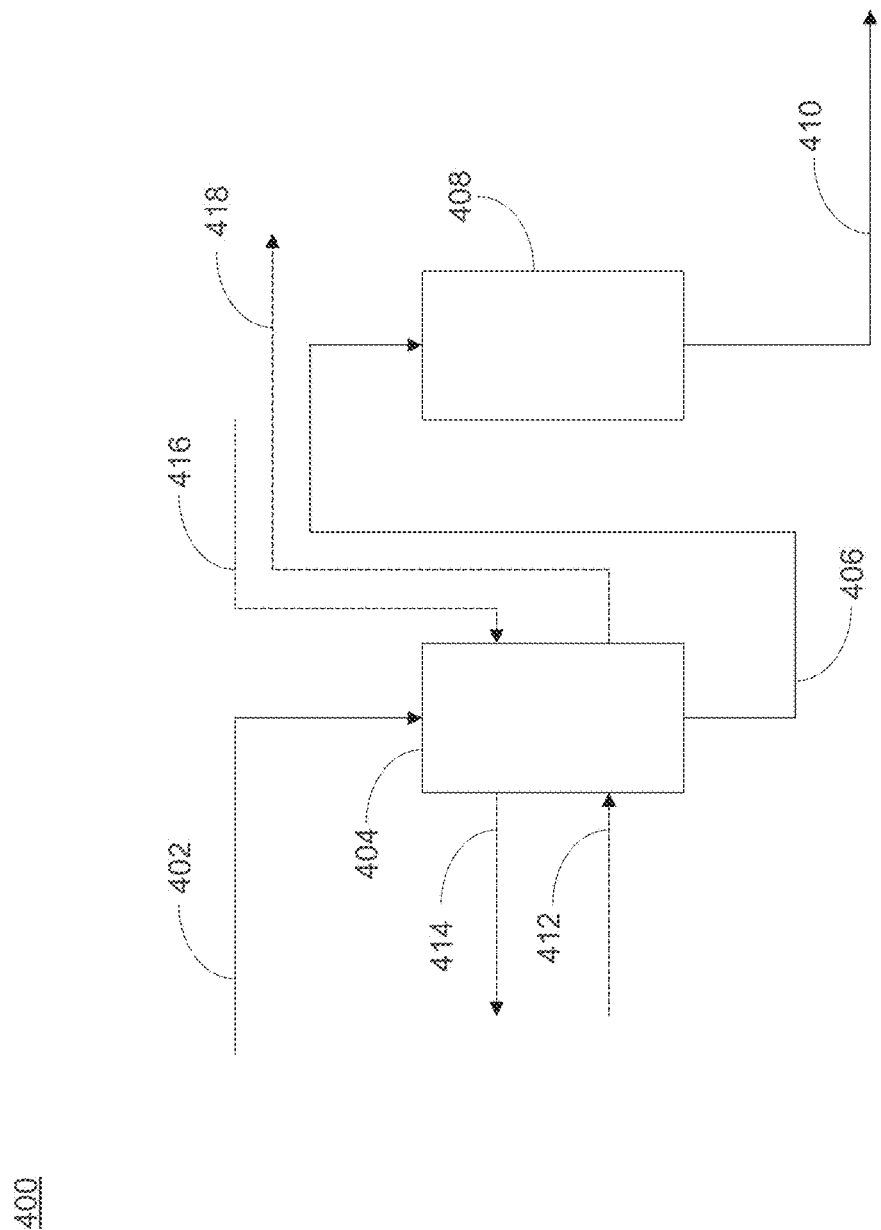
FIG. 4 is an illustration of an apparatus for the removal of silica from a silica containing brine according to an embodiment of the present invention.

Referring to FIG. 4, apparatus 400 for the removal of silica by adsorption with activated alumina is provided. A silica containing solution or silica containing brine is supplied via line 402 to first adsorbent column 404, which is charged with activated alumina and is operable to remove at least a portion of the silica present in the brine or other solution and produce treated stream 406 having a reduced silica content relative to that of the stream being fed through line 402. Treated stream 406 can then be supplied to a second adsorbent column 408, which can also be charged with an activated alumina adsorbent that is operable to remove at least a portion of the silica present in treated stream 406 to produce a product stream 410 having a reduced silica content relative to the silica containing solution or silica containing brine supplied via line 402, and in certain embodiments, relative to treated stream 406.

In certain embodiments, regenerant solution 412 can be supplied to first adsorbent column 404. Regenerant solution 412 can be a strong base, and can be supplied to remove silica adsorbed onto the activated alumina. Waste stream 414 is configured to provide means for the removal of the regenerant solution and any silica removed from the activated alumina. Optionally, as noted above, a strong acid can be supplied to first adsorbent column 404 after the regenerant solution, and/or a sodium fluoride solution can be supplied to the column. While FIG. 4 shows that regenerant solution 412 is supplied at the bottom of adsorbent column 404 and flows in a counter-current flow, it is understood that the regenerant solution can also be supplied such that it flows in a co-current flow.

In certain embodiments, wash water 416, such as deionized water, can be supplied to adsorbent column 404 and a wash water waste stream 418 can be removed from the column. While the wash water is shown as being supplied in a co-current flow, it is understood that the wash water can be supplied in a counter-current flow.

In certain embodiments, apparatus 400 can include more than two adsorbent columns. In certain methods wherein three or more columns are included in the apparatus, only two adsorbent columns are utilized at any one time. When the activated alumina of one column begins to lose efficiency (i.e., when silica has become adsorbed to a major portion of the activated alumina such that the increasing amounts of silica are not removed by the column), that column can be removed from service and a third column can be employed. When the column is removed from service, it can be regenerated, as described above, and returned to service when the efficiency of the second column decreases, thereby indicating the adsorbent in the second column is losing effectiveness. In this manner, apparatus 400 can be run continuously as two columns and can be employed for the removal of silica while a third column is regenerated.

In certain embodiments, a brine, such as a geothermal brine, can be supplied to a process designed to remove a significant portion of silica, and optionally iron, present in the brine as a precursor step to the subsequent recovery of valuable components, such as potassium, rubidium, cesium, lithium, zinc, and manganese, and other metals. Exemplary methods for the reduction of the silica concentration include those described herein. The treated brine solution having a reduced silica concentration can then be supplied to an associated process that is designed to selectively remove one or more components from the treated brine. Optionally, the process for the removal of silica can also include the removal of iron.

In certain embodiments, the treated brine can be supplied to a process designed to selectively remove and recover lithium. Certain methods for the recovery are known in the art, such as is described in U.S. Pat. Nos. 4,116,856, 4,116,858, 4,159,311, 4,221,767, 4,291,001, 4,347,327, 4,348,295, 4,348,296, 4,348,297, 4,376,100, 4,430,311, 4,461,714, 4,472,362, 4,540,509, 4,727,167, 5,389,349, 5,599,516, 6,017,500, 6,048,507, 6,280,693, 6,555,078, 8,287,829, 8,435,468, 8,574,519, and 8,637,428.

Alternatively, methods can be employed utilizing a lithium aluminate intercalate/gibbsite composite material, a resin based lithium aluminate intercalate, and a granulated lithium aluminate intercalate as described in U.S. Pat. No. 8,637,428 and U.S. patent application Ser. Nos. 12/945,519 and 13/283,311. Preferably, recovery of lithium occurs without the co-precipitation of other metals.

Figure 5:
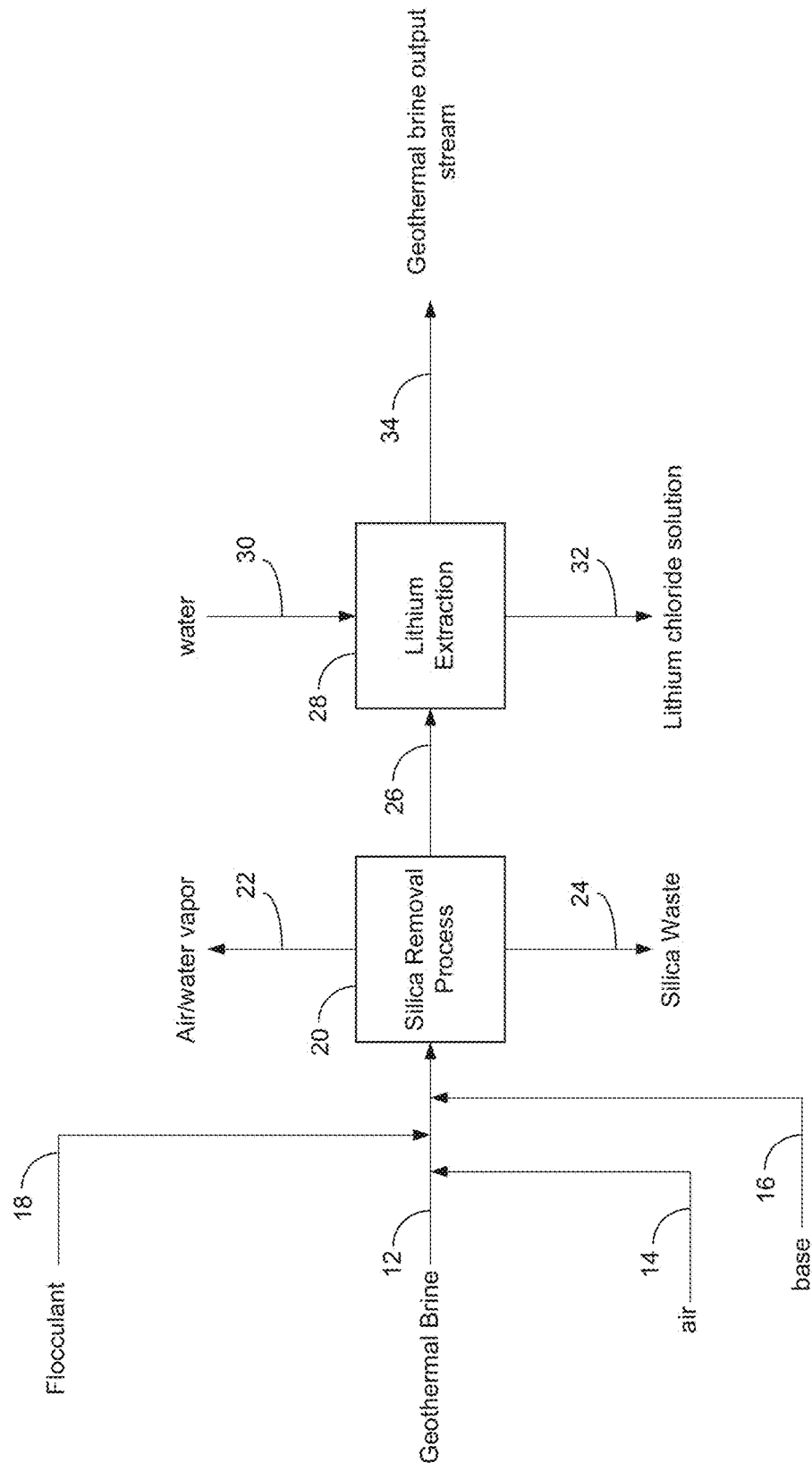
FIG. 5 is an illustration of a process for the removal of silica and iron from a geothermal brine, followed by the subsequent removal of lithium according to an embodiment of the present invention.

For example, as shown in FIG. 5, process 10 for the removal of silica and iron from brine, followed by the subsequent removal of lithium, is provided. In an exemplary embodiment, brine 12, having a silica concentration of at least about 100 ppm, an iron concentration of at least about 500 ppm, and a recoverable amount of lithium or other metal, is supplied with air 14, base stream 16, and flocculant stream 18 to a silica removal process 20.

Silica removal process 20 can produce brine solution 26 having a reduced concentration of silica, and optionally iron, compared to the initial brine, as well as a reaction by-product stream 24 that includes silica that was previously present in the geothermal brine. Additionally, air/water vapor are produced and removed via line 22.

The brine solution 26 having a reduced concentration of silica and iron can be supplied to a lithium recovery process 28. The lithium recovery process can include a column or other means for contacting the brine with an extraction material suitable for the extraction and subsequent recovery of lithium. In certain embodiments, the extraction material can be a lithium aluminate intercalate, an inorganic material with a layered crystal structure that is both highly selective for lithium and economically viable. Exemplary lithium intercalate materials can include a lithium aluminate intercalate/gibbsite composite material, a resin based lithium aluminate intercalate and a granulated lithium aluminate intercalate. The gibbsite composite can be a lithium aluminate intercalate that is grown onto an aluminum trihydrate core. The resin-based lithium aluminate intercalate can be formed within the pores of a macroreticular ion exchange resin. The granulated lithium aluminate intercalate can consist of fine-grained lithium aluminate intercalate produced by the incorporation of a small amount of inorganic polymer.

The process of contacting the lithium aluminate intercalate material with the brine is typically carried out in a column that includes the extraction material. The brine flows into the column and lithium ions are captured on the extraction material, while the water and other ions pass through the column as geothermal brine output stream 34. After the column is saturated, the captured lithium is removed by flowing water supplied via line 30, wherein the water can include a small amount of lithium chloride present, through the column to produce lithium chloride stream 32. In other embodiments, multiple columns are employed for the capture of the lithium.

Figure 6:
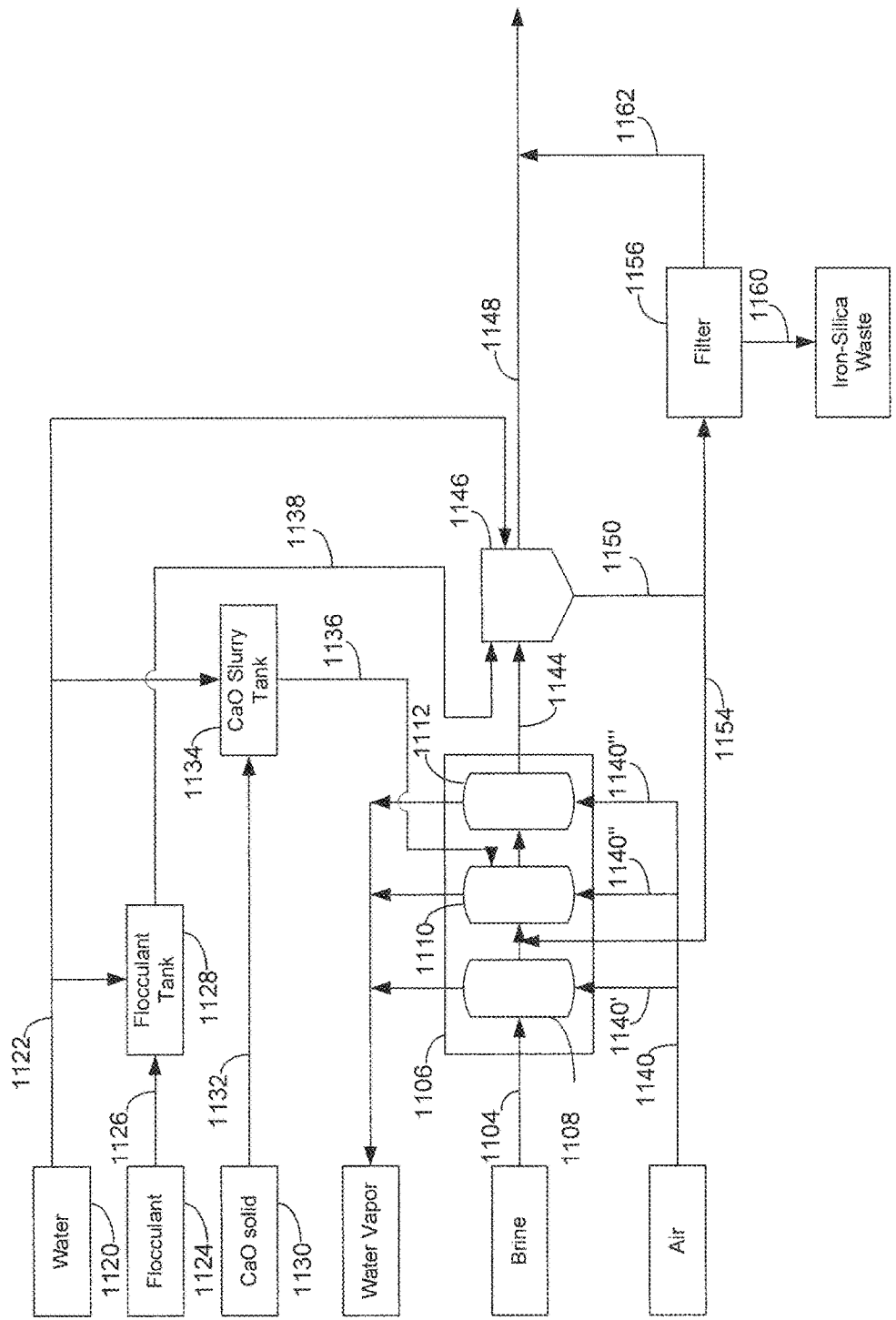
FIG. 6 is an illustration of a continuous process for the management of silica according to an embodiment of the present invention.

As shown in FIG. 6, a continuous process for the management of silica is provided. Silica management system 1106 includes three stirred vessels 1108, 1110, and 1112 provided in series. To first reactor 1108 is provided a geothermal brine via line 1104. In some embodiments, the geothermal brine has an iron content of approximately 1500 ppm and a silica content of about 160 ppm is added at a rate of about 6 gpm. Air is supplied via line 1140 to each reactor 1108, 1110, and 1112 and is sparged through the geothermal brine. In some embodiments, the air is supplied at a rate of about 100 cfm. In some embodiments, the brine supplied to each of the three reactors is maintained at a temperature of about 95° C.

An aqueous calcium oxide slurry is prepared by mixing solid calcium oxide provided from tank 1130 via line 1132 to vessel 1134, where the solid is mixed with water 1120 provided via line 1122. In some embodiments, the calcium oxide slurry includes between about 15 and 25% by weight, alternatively about 20% by weight, calcium oxide, and is supplied to second reactor 1110 at a rate on a wet basis of about 0.5 lb/min.

In silica management system 1106, brine is supplied to first vessel 1108 where the brine is sparged with air via line 1140'. The brine is then supplied from first vessel 1108 to second vessel 1110. The brine in second vessel 1110 is contacted with calcium oxide supplied via line 1136 and is again sparged with air supplied via line 1140". The brine is then supplied from second vessel 1110 to third vessel 1112 where it is again sparged with air supplied via line 1140'''. In some embodiments, the air to the vessels is supplied at a constant rate. In further embodiments, the air to the vessels is supplied at a constant rate of about 100 cfm.

After the addition of the air via line 1140' to first reactor 1108, the pH drops. In some embodiments, the pH drops to between about 2.3 and 3.5. Air is added to second reactor 1110 via line 1140". In some embodiments, air is supplied at a rate of about 100 cfm and a charge of approximately 15-25% by weight of an aqueous calcium oxide slurry at a rate of about 0.5 lb/min., which can raise the pH in the second reactor to between about 4.8 and 6.5, and preferably between about 5.0 and 5.5. The addition of calcium oxide slurry initiates the precipitation of iron (II) hydroxide and iron silicate. In some embodiments, to third reactor 1112, air is added via line 1140''' at a rate of about 100 cfm. Each of the three reactors includes means for stirring to ensure sufficient mixing of the brine, base, and air oxidant.

In some embodiments, the continuous addition of air and base to the reaction vessels results in the precipitation of the iron and silica at rates up to about 0.5 lb/min., depending upon the concentration of iron and silica in the geothermal brine.

The geothermal brine, which now includes precipitates of iron (III) hydroxide and iron silicate, is then supplied from third vessel 1112 to clarifier 1146 via line 1144. Water may be added to clarifier 1146 via line 1122. In some embodiments, an aqueous flocculant solution of Magnafloc 351, in a concentration between about 0.005% and 1% by weight, such as about 0.025% by weight, is prepared by supplying solid flocculant 1124 via line 1126 to flocculant tank 1128, where the solid is contacted with water 1120 supplied via line 1122. In further embodiments, the aqueous flocculant solution is supplied to clarifier vessel 1146 via line 1138 at a rate of about 0.01 gpm.

Two streams are produced from clarifier 1146. First clarifier product stream 1148 includes the geothermal brine having a reduced concentration of silica and iron, and may be supplied to a secondary process, such as lithium recovery. Second clarifier product stream 1150 includes solid silica-iron waste, as well as some geothermal brine. Stream 1150 can be supplied to filter process 1156 which serves to separate the solid silica-iron waste 1160 from the liquid brine 1162. Alternately, a portion stream 1160 can be resupplied (not shown) to second vessel 1110 via line 1154.

Alternate processes for the removal of silica can also be employed as described herein.

In certain embodiments, the treated brine solution can be supplied to a process designed to selectively remove and recover at least one of manganese and zinc. In a first embodiment, the pH of the solution can be adjusted to selectively precipitate zinc and/or manganese. Following precipitation of zinc and/or manganese, the solids can be separated from the solution by known filtration means.

Separation of the zinc and manganese solids can be achieved by dissolving the solids in acid, followed by selective recovery of either zinc or manganese. In certain embodiments, manganese can be oxidized to precipitate a manganese solid, which can be separated by filtration. Zinc remaining in solution can be recovered by electrochemical means.

Alternatively, zinc and/or manganese can be selectively removed by extraction. In certain embodiments, zinc and manganese can be recovered selectively or in combination by individual extractions, or by double extraction. In certain embodiments, zinc and manganese can each selectively be recovered by electrochemical means.

Known methods for the recovery of zinc that can be used for recovery from brine solutions are described in U.S. Pat. Nos. 5,229,003, 5,358,700, 5,441,712, 6,458,184, 8,454,816, and 8,518,232.

Known methods for the recovery of manganese that can be used for recovery from brine solutions are described in U.S. Pat. Nos. 6,682,644, 7,776,202, 8,454,816, and 8,518,232.

Figure 7:
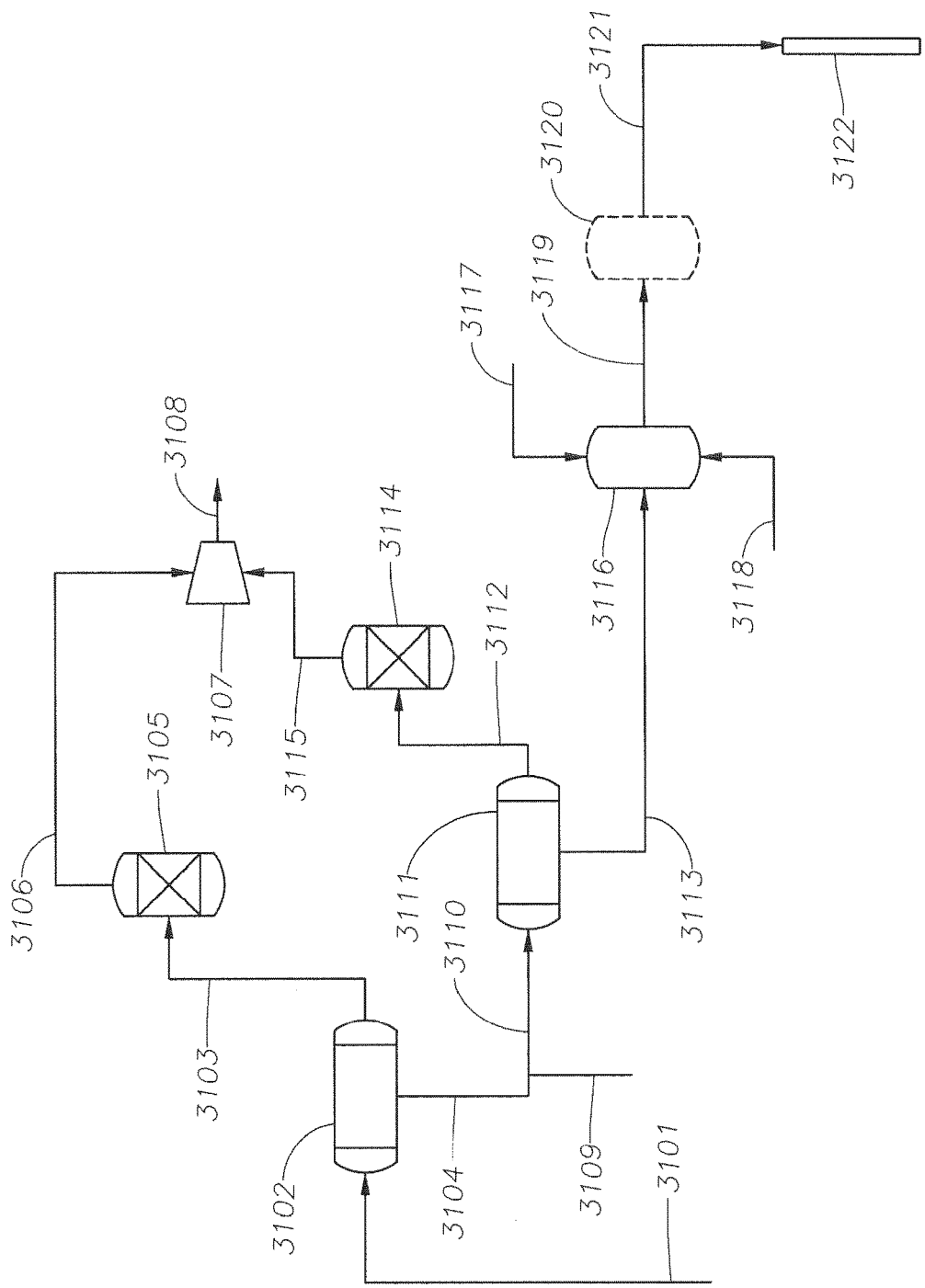
FIG. 7 shows a process according to an embodiment using a pH modification process.
Figure 8:
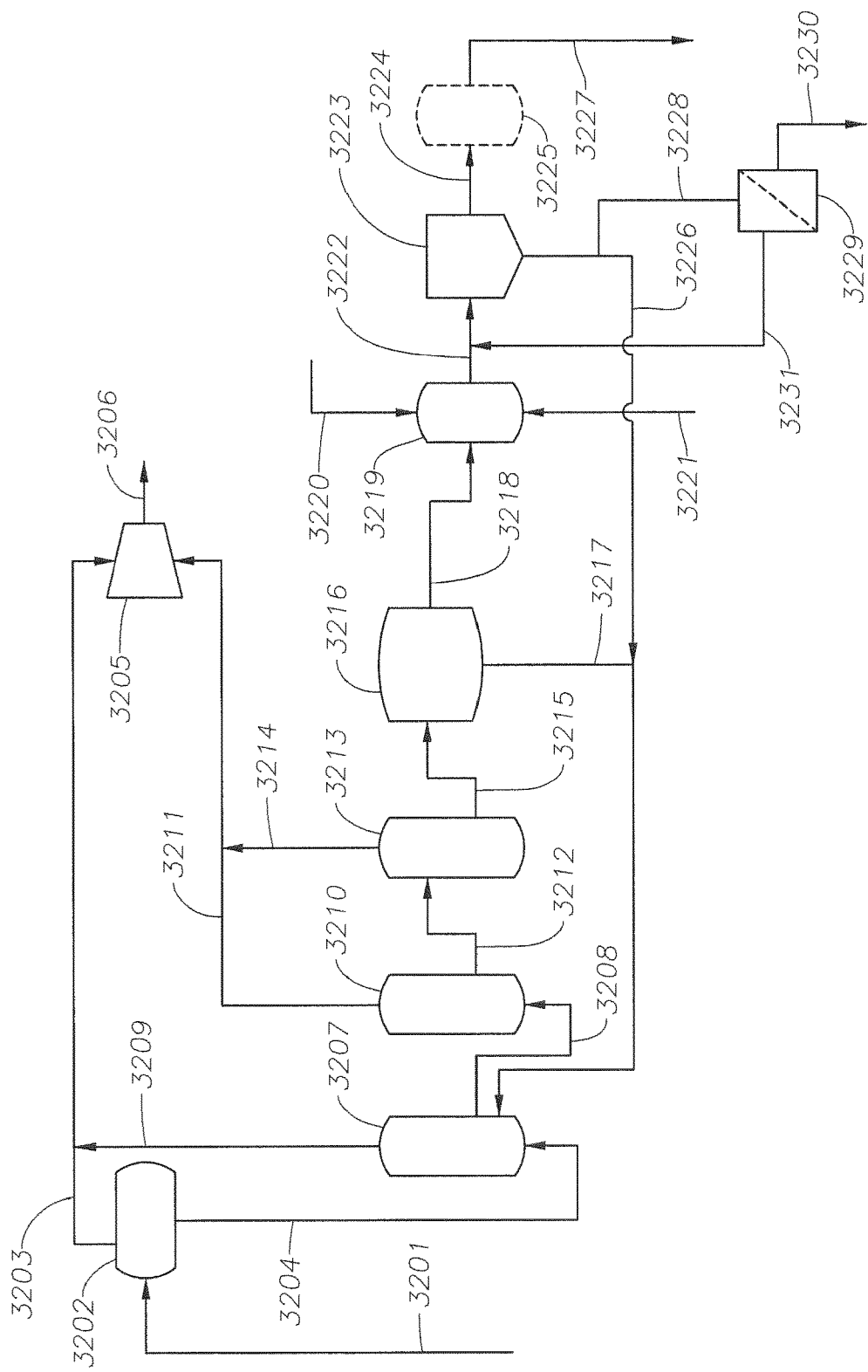
FIG. 8 shows a process according to an embodiment using a crystallizer reactor clarifier process.
Figure 9:
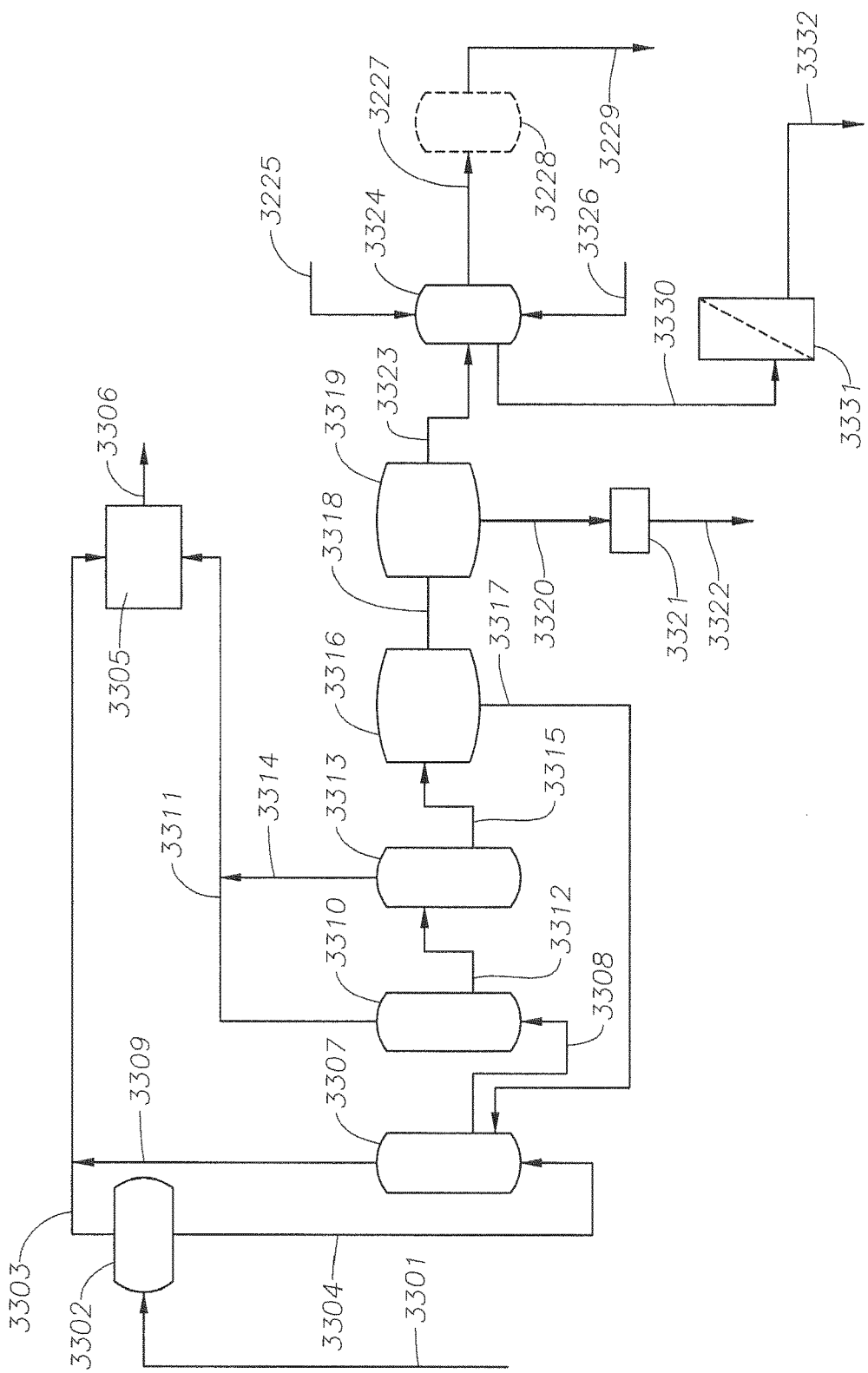
FIG. 9 shows a process according to an embodiment using a crystallizer reactor clarifier process.

FIGS. 7, 8, and 9 show exemplary embodiments of the present invention. FIG. 7 is an illustration of an exemplary embodiment of power production using a geothermal brine, followed by silica management. The brine 3101 is taken from a reservoir and supplied to a high pressure separator 3102. From the high pressure separator are produced two streams, hot brine 3104 and steam 3103. The steam 3103 is then fed to a condenser 3105 to remove salts and entrained water whereby high pressure steam 3106 is generated and fed to a turbine/generator 3107 to produce energy 3108. An acid 3109, preferably hydrochloric acid is added to the hot brine 3104, as the brine is a chloride brine. Other acids also can be used. The acid/hot brine stream 3110 is then fed to a standard pressure separator 3111. Two streams are produced from the standard pressure separator, a standard pressure steam 3112 and return brine 3113. The standard pressure steam 3112 is then fed to a condenser 3114 to remove entrained brine whereby clean standard pressure steam 3115 is generated and fed to turbine/generator 3107 to produce energy 3108. The return brine 3113 is fed to an iron-silica removal process 3116 whereby iron and silica are removed from the brine by addition of a base 3117 and an oxidant 3118 to produce a reduced silica and iron brine stream 3119. The reduced silica and iron brine stream can optionally be fed to a mineral extraction process 3120 whereby at least one mineral is removed from the reduced silica and iron brine stream. The reduced silica and iron brine stream 3121 is then injected into a reservoir 3122.

FIG. 8 is an illustration of an exemplary embodiment of power production using a geothermal brine, followed by silica management. The brine 3201 is taken from a reservoir and supplied to a high pressure separator 3202. From the high pressure separator 3202 are produced two streams, high pressure steam 3203 and concentrated brine stream 3204. The high pressure stream 3203 is then fed to a turbine/generator 3205 to produce energy 3206. The concentrated brine stream 3204 is then fed to a high pressure crystallizer 3207 to produce a stream 3208 that is fed to a low pressure crystallizer 3210. A high pressure steam 3209 is generated and fed to a turbine/generator 3205 to produce energy 3206. From the low pressure crystallizer 3210 is produced a low pressure steam 3211 that is fed to the turbine/generator 3205 to produce electricity 3206 and a stream 3212 that is fed to a flash tank 3213. From the flash tank 3213 are produced two streams, low pressure steam 3214 that is fed to a turbine 3205 and a stream of brine and silica solids 3215 that are fed to a primary clarifier 3216. From the primary clarifier 3216, seeds 3217 are recycled to the high pressure crystallizer 3207 and brine 3218 is fed to a silica management process 3219 to remove silica by addition of a base 3220 and an oxidant 3221. Optionally, iron may be removed, as well. From the silica management process 3219, a reduced silica (and optionally reduced iron) brine 3222 is then fed to a secondary clarifier 3223 to remove silica. From the secondary clarifier 3223 the stream 3224 is fed to an optional metal recovery process 3225. Seeds 3226 are also recycled from the secondary clarifier 3223 to the high pressure crystallizer 3207. The reduced silica (and optionally reduced iron) brine 3227 is then injected into a reservoir. Stream 3228 can be supplied to filter process 3229 which serves to separate the solid silica-iron waste 3230 from the liquid brine 3228. Alternately, stream 3231 can be resupplied to second clarifier 3223.

Similarly, FIG. 9 is an illustration of an exemplary embodiment of power production using a geothermal brine, followed by silica management. The brine 3301 is taken from a reservoir and supplied to a high pressure separator 3302. From the high pressure separator 3302 are produced two streams, high pressure steam 3303 and concentrated brine stream 3304. The high pressure steam 3303 is then fed to a turbine/generator 3305 to produce energy 3306. The concentrated brine stream 3304 is then fed to a high pressure crystallizer 3307 to produce a stream 3308 that is fed to a low pressure crystallizer 3310. A high pressure steam 3309 is generated and fed to a turbine generator 3305 to produce energy 3306. From the low pressure crystallizer 3310 is produced a low pressure steam 3311 that is fed to the turbine/generator 3305 to produce electricity 3306 and a stream 3312 that is fed to a flash tank 3313. From the flash tank 3313 are produced two streams, a low pressure steam 3314 that is fed to a turbine 3305, and a stream of brine and silica solids 3315 that is fed to a primary clarifier 3316. From the primary clarifier 3316, seeds 3317 are recycled to the high pressure crystallizer 3307, and the brine 3318 is fed to a secondary clarifier 3319. While the primary clarifier 3316 removes the bulk of the solids, the secondary clarifier 3319 can further reduced the TSS. From the secondary clarifier 3319, two streams are produced. One stream 3320 is fed in part to a filter 3321 or alternative solids liquid separator where silica solids 3322 are removed. The brine containing silica and iron 3323 is fed to a silica management process 3324, which receives base 3325 and oxidant 3326. Optionally, iron can be removed as well. In some embodiments, the brine contains about 160 ppm silica and about 1600 to 2000 ppm of iron. The reduced silica (and optionally reduced iron) brine 3327 may be fed to an optional metal recovery process 3328. The reduced silica (and optionally reduced iron) brine is then injected into a reservoir 3329. Stream 3330 can be supplied to filter process 3331 which serves to separate the solid silica-iron waste 3332.

In further embodiments, the reduced silica (and optionally reduced iron) brine is then supplied to a process for the selective removal of lithium. In certain embodiments, the brine or lithium containing solution can be filtered or treated to remove solids or other elements present prior to the selective recovery of lithium.

In further embodiments, the reduced silica (and optionally reduced iron) brine is then supplied to a process for the selective removal of zinc. In one embodiment, manganese, as well as zinc, lead, and silver, can be selectively or in combination removed from brines, particularly geothermal brines. In certain embodiments, the present invention utilizes the coordination chemistry of the various metals to facilitate separation thereof.

Figure 10:
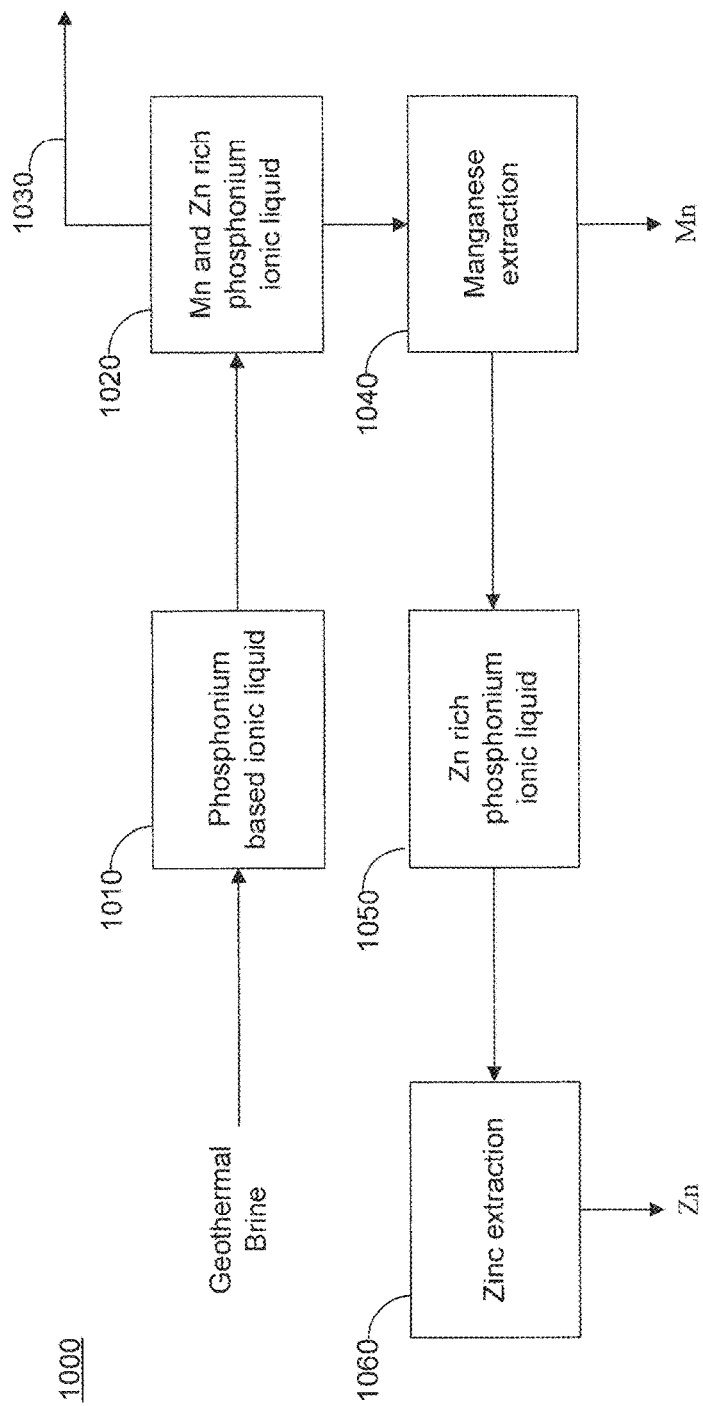
FIG. 10 illustrates a process for the recovery of manganese and zinc from a geothermal brine according to one embodiment of the invention.

As shown in FIG. 10, process 1000 of the present invention first contacts a geothermal brine with an ionic liquid in step 1010. In certain embodiments, the ionic liquid is a phosphonium based ionic liquid. In certain embodiments, the phosphonium based ionic liquid is trihexyl(tetradecyl) phosphonium chloride or Cyphos IL 101 (available from Cytec Industries). One method for contacting the geothermal brine with the ionic liquid is to agitate them vigorously at high heat for a required amount of time. In one embodiment, the agitation time is at least 2 minutes. In certain embodiments, agitation temperatures range between about 85-95° C., alternatively between about 90-95° C., alternatively at about 95° C. In certain embodiments, agitation times range between about 1-3 minutes and preferably between about 2-3 minutes. It is understood that the specific agitation times depend upon various factors, such as agitation/mixing speeds, viscosity of the brine and the ionic liquid mixture, and amount of heat that is applied.

In step 1020, after the ionic liquid has contacted the geothermal brine for sufficient time to extract the manganese and zinc from the geothermal brine, the solutions can be separated to provide a manganese and zinc-rich ionic liquid and a manganese and zinc-depleted geothermal brine. The manganese and zinc-depleted geothermal brine or the treated brine 1030 can be analyzed for metal ion composition to determine if sufficient manganese and zinc have been extracted from the brine. In certain embodiments, the manganese and zinc-depleted geothermal brine can be analyzed for metal ion composition using ICP mass spectrometry. In certain embodiments, if manganese and zinc have been successfully removed from the geothermal brine, the treated brine can be injected into a geothermal reservoir, such as the geothermal reservoir from which it was originally removed.

After step 1020, the manganese and zinc rich ionic liquid can be treated with an aqueous solution in step 1040, to selectively remove manganese from the manganese and zinc-rich ionic liquid. In certain embodiments, the aqueous solution is water. In embodiments utilizing water as the aqueous solution, the water can be contacted with the manganese and zinc-rich ionic liquid at a temperature of between about 80-95° C. In alternate embodiments, the aqueous solution can be an acid. Exemplary acids can include hydrochloric acid and sulfuric acid. In certain embodiments using acid as the aqueous solution, the acid can be at a concentration of between about 0.25 and 1.25 M.

Following the removal of manganese from the ionic liquid in step 1040, a manganese depleted, zinc-rich ionic liquid can be treated with an aqueous solution to precipitate zinc in step 1050. In certain embodiments, the aqueous solution is water. In certain embodiments, the pH of the water can be adjusted using a base until the pH of the water is between about 6 and 8.

Figure 11:
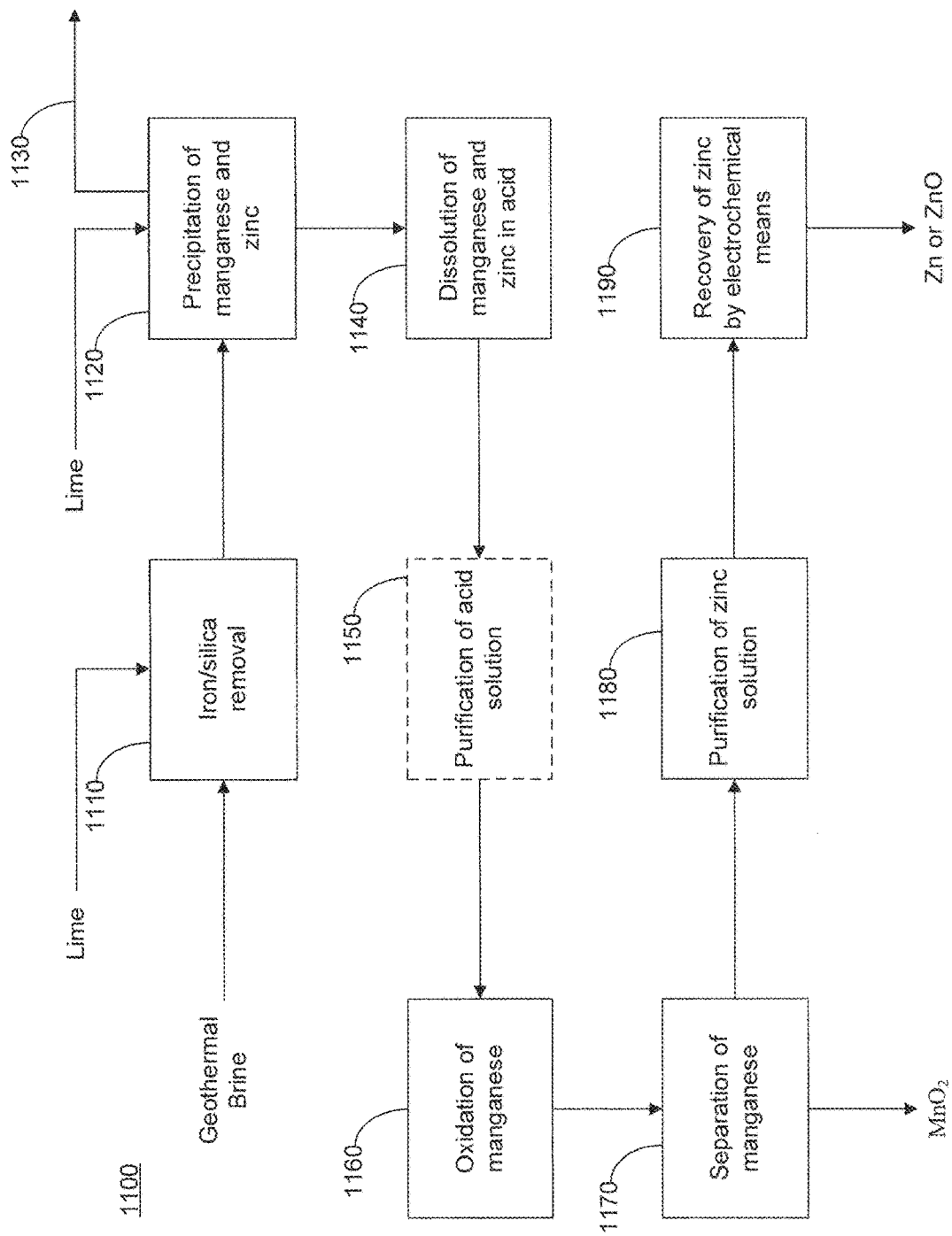
FIG. 11 illustrates another process for the recovery of manganese and zinc from a geothermal brine according to another embodiment of the invention.

As shown in FIG. 11, process 1100 of an embodiment of the present invention involves the removal of silica and/or iron from a brine solution. Step 1110 can include any of the iron/silica removal methods described herein. In certain embodiments, the iron and silica removal step preferably removes only the iron and silica, while at the same time leaving all other metals and/or ions present in the brine undisturbed. The removal of silica is an important step as the presence of silica can interfere with subsequent processes for the recovery of various other metals. For example, silica frequently clogs pores in filtration media.

After silica and iron removal step 1110, in precipitation step 1120, a base (e.g., calcium oxide, calcium hydroxide, or the like) is added to the brine to adjust or maintain a pH of the brine at greater than at least about 6, alternatively between about 6 and 8.5, alternatively between about 6.5 and 8, alternatively between about 6.5 and 7.5. In alternate embodiments, the pH is maintained at about 7. In certain embodiments, the pH is maintained at less than about 9. The base may be in solution or slurry form. Furthermore, the solution is exposed to an oxygen source and manganese and zinc precipitates are formed. In certain embodiments, depending upon the pH of the solution, a lead precipitate may also be formed. To achieve oxidation of the manganese, air is preferably supplied to the solution by sparging or bubbling. Other oxidants suitable for the oxidation of the manganese can include hypohalites, hydrogen peroxide, and ozone. In certain embodiments wherein sodium hydroxide or ammonia is utilized as the base, reduced amounts of calcium and magnesium impurities are present in the precipitates. For example, in certain embodiments, magnesium concentration in the zinc and manganese precipitates is less than about 200 ppm, alternatively less than about 150 ppm, alternatively less than about 100 ppm. Similarly, the concentration of calcium in the zinc and manganese precipitates is less than about 450 ppm, alternatively less than about 400 ppm, alternatively less than about 350 ppm, alternatively less than about 300 ppm, alternatively less than about 250 ppm, alternatively less than about 200 ppm.

The solids in the brine and base, which can include at least one of manganese and zinc, are separated from the remainder of the mixture, which retains the majority of ions present in the brine. Separation of the solids can be done by conventional filtration means and can optionally include centrifugation or other known techniques for concentration of solids. In certain embodiments, the treated brine solution 1130 with reduced concentrations of at least one of manganese and zinc can then be injected into the geothermal reservoir, such as the one from which the brine was originally removed. In certain embodiments, the treated brine solution 1130 with reduced concentrations of at least one of manganese and zinc can then be subjected to further processing for extraction of other metals.

In certain embodiments, the preferential precipitation of zinc and manganese from the brine solution results in the precipitation of at least about 80% of the zinc and manganese present in solution, alternatively at least about 85%, alternatively at least about 90%, alternatively at least about 95%. Similarly, the preferential precipitation results in the precipitation of no more than about 10% of other ions present in the brine solution, alternatively less than about 8%, alternatively less than about 6%, alternatively less than about 5%, alternatively less than about 3%.

The manganese and zinc solids that are separated from the remaining brine solution can then be dissolved in an acid solution in step 1140. Preferred acids include strong mineral acids, such as hydrochloric acid, sulfuric acid, methanesulfonic acid, and the like. The use of hydrochloric acid results in the production of zinc chloride and manganese chloride. Similarly, the use of sulfuric acid results in the production of zinc sulfate and manganese sulfate. In certain embodiments, lead and/or calcium precipitates may be formed during the precipitation of the manganese and zinc. In these embodiments, the selected acid is preferably sulfuric acid, as sulfuric acid is selective for manganese and zinc precipitates, and does not dissolve the lead and/or calcium precipitates that may be present. The acid is preferably added to the solids in greater than approximately a 1:1 molar ratio to the solids. In certain embodiments, it may be beneficial to minimize the amount of excess acid that is utilized for dissolving the manganese and zinc precipitates, for case of performance of downstream processes, as well as for economic and environmental considerations. In certain embodiments, the solids and acid are mixed to ensure complete dissolution of the solids.

The acid and dissolved metal solution is then filtered to remove remaining solids, if any, and the solution may then be purified in optional purification step 1150 to remove trace metals, which may be present in the acidified solution. It is believed that metals, such as copper, cadmium, nickel, antimony, and/or cobalt, as well as other metals or ions, may be present in trace amounts in the acid and dissolved metal solution. These trace metals may interfere with the subsequent separation of manganese and zinc. Purification of the acid and dissolved metal solution can be achieved by known means, such as ion exchange or by treatment with zinc dust. Zinc dust operates by first displacing other more noble metals from solution and allowing them to precipitate on undissolved zinc dust. For example, copper ions present in the solution will precipitate as copper metal or will deposit on undissolved zinc dust.

Manganese and zinc can be extracted from the acid and dissolved metal solution using solvent extraction techniques. Suitable solvents for the extraction of manganese and zinc include phosphines, phosphoric acids, and phosphinic acids, such as the following: di(2-ethylhexyl)phosphoric acid (DEHPA) in kerosene or Cyanex® 272 (bis(2,4,4-trimethylpentyl)phosphinic acid); Ionquest 290 (available from Rhodia, Inc.) in aliphatic kerosene or the highly branched carboxylic acid extractant (versatic 10)(10-decyl-4-pyridinecarboxylate). In certain embodiments, DEHPA is a suitable extraction solvent, particularly in embodiments where iron has been previously removed. In certain embodiments, manganese and zinc can be extracted with organic amines, such as 1,4-diazabicyclo[2.2.2]octane (DABCO), 2,2'-bipyridyl and piperazine. In certain embodiments, zinc can be preferentially extracted with a functionalized amine, such as polyvinyl pyrrolidone.

Other exemplary solvents that may be used for the extraction of zinc are discussed in U.S. Pat. No. 5,135,652, the disclosure of which is herein incorporated by reference in its entirety. These exemplary solvents include mono-2-ethylhexylphosphoric acid (M2EHPA), di-2-ethylhexylphosphoric acid (D2EHPA), and mixtures thereof (EHPA). Other exemplary solvents include bis-2,4,4-trimethylpentylmonothiophosphinic acid (Cyanex® 302) and bis-2,4,4-trimethylpentyldithiophosphinic acid (Cyanex® 301). In certain embodiments, the extractant includes both phosphoric acid and phosphinic acid. In certain embodiments, the ratio of phosphoric acid to phosphinic acid is greater than about 1:1, preferably between about 1:1 and 1:6. In certain embodiments, the extractant can be diluted with a hydrocarbon solvent, preferably a dearomatized aliphatic hydrocarbon. Exemplary diluents include Exxsol™ D80.

The pH during the extraction is maintained at less than about 7, alternatively between about 1 and 5, alternatively between about 1 and 3, alternatively in the range of about 1.5 to 3.5, alternatively between about 2 and 4.

Other solvents suitable for the extraction of zinc from brine solutions are described in "Recovery of Zinc(U) from Acidic Sulfate Solutions. Simulation of Counter-Current Extraction Stripping Process," Gotfryd, L. and Szymanowski, J.; Physicochemical Problems of Mineral Processing, vol. 38 (2004), pp. 113-120; "New Developments in the Boleo Copper-Cobalt-Zinc-Manganese Project," Dreisinger, et al.; available at http://bajamining.com/_resources/Reports/alta_paper_2006_boleo_final.pdf; "Zinc Solvent Extraction in the Process Industries," Cole, P. and Sole, K.; Mineral Processing and Extractive Metallurgy Review, vol. 24, no. 2 (2003), pp. 91-137; "Solvent extraction of zinc(II) and manganese(II) with 5,10,15,20-tetraphenyl-21H,23H-porphine(TPP) through the metal exchange reaction of lead (II)-TPP," Kawai, T., Fujiyoshi, R., and Sawamura, S.; Solvent Extr. Res. Dev. Japan, vol. 7 (2000), pp. 36-43, "Solvent Extraction of Zinc from Strong Hydrochloric Acid Solution with Alamine336," Lee, M. and Nam, S.; Bull. Korean Chem. Soc., vol. 30, no. 7 (2009), pp. 1526-1530, the disclosures of which are incorporated herein by reference.

Manganese can be isolated by electrolysis or, in step 1160, by oxidation to produce manganese dioxide, or by precipitation as a carbonate by reaction with sodium carbonate. In certain preferred embodiments, manganese can be selectively isolated from zinc as manganese dioxide by electrolysis in a sulfate solution, at an anode made of metals, such as titanium or carbon. Alternatively, selective oxidation of manganese to manganese dioxide can be achieved utilizing an oxidant, such as chlorine, hydrogen peroxide, or the like to provide solid manganese dioxide and zinc containing solution. In step 1170, precipitated manganese dioxide is separated from the zinc containing solution by known means, such as filtration, centrifugation, or a like process.

In an alternate embodiment, manganese dioxide can be generated at the anode of a divided electrochemical cell by the oxidation of manganese (II) and manganese (III) to generate a manganese dioxide deposited on the surface of the electrode. After the solution is passed through the anode compartment, it is then fed to the cathode compartment where zinc metal is electrodeposited. The current density ranges from between about 50 to about 500 A/m2. The separator, such as an ion exchange membrane or a porous material that allows the passage of liquids, positioned between the anode and cathode assists in preventing deposition of manganese dioxide on the zinc metal. In certain embodiments, the separator can include a series of baffles. In certain embodiments, it may be advantageous to remove solid manganese dioxide from the electrolytic stream formed in the anode compartment that may be lost from the surface of the anode, such as by filtration, prior to supplying to the cathode compartment. Production of manganese dioxide by electrochemical means and the recovery of zinc metal by electrowinning (also known as electroextraction), preferably, includes a conductive solution, such as sulfate, chloride, methanesulfonate, or the like, for improved efficiency. In certain embodiments, it is preferred that the electrochemical cell includes a small amount of free acid in the solution. In alternate embodiments, the electrochemical cell can be operated at a pH ranging from about 0 to 2. Following recovery of the manganese and zinc, the respective solutions can be recycled to the solvent extraction step. Alternatively, the respective solutions can be recycled to the acid solution.

The zinc containing solution can then be optionally purified in step 1180 and then supplied to an electrochemical cell for electrochemical recovery in step 1190 by electrowinning (also known as electroextraction). Electrowinning utilizes an electrochemical cell wherein a current is passed from an inert anode, such as lead dioxide, iridium dioxide coated titanium, or other stable substrate, through the zinc containing solution, leading to deposition of the zinc on the cathode. The base cathode can be aluminum, although other metals, such as steel, stainless steel, and titanium, can also be used. The cathode material is selected based upon chemical stability, electrical conductivity, and the ease of removal of zinc from substrate.

Alternatively, in the process illustrated by FIG. 11, the steps for the isolation and recovery of manganese and zinc can be reversed, i.e., the zinc can be separated and isolated from a solution that includes zinc and manganese by electrowinning, followed by the isolation of manganese by either electrowinning or oxidation of the manganese to produce manganese dioxide.

Optionally, the process may include a step for the recovery of lithium from the geothermal brine. Methods for the recovery are known in the art, such as is described in U.S. Pat. Nos. 4,116,856, 4,116,858, 4,159,311, 4,221,767, 4,291,001, 4,347,327, 4,348,295, 4,348,296, 4,348,297, 4,376,100, 4,430,311, 4,461,714, 4,472,362, 4,540,509, 4,727,167, 5,389,349, 5,599,516, 6,017,500, 6,280,693, and 6,555,078, each of which is incorporated herein by reference its entirety. Alternatively, methods can be employed utilizing a lithium aluminate intercalate/gibbsite composite material, a resin based lithium aluminate intercalate, and/or a granulated lithium aluminate intercalate. The gibbsite composite is a lithium aluminate intercalate that is grown onto an aluminum trihydrate core. The resin-based lithium aluminate intercalate is formed within the pores of a macroreticular ion exchange resin. The granulated lithium aluminate intercalate consists of fine-grained lithium aluminate intercalate produced by the incorporation of a small amount of inorganic polymer. The process of contacting the lithium aluminate intercalate material with the geothermal brine is typically carried out in a column that includes the extraction material. The geothermal brine is flowed into the column and lithium ions are captured on the extraction material, while the water and other ions pass through the column. After the column is saturated, the captured lithium is removed by flowing water having a small amount of lithium chloride present through the column. In preferred embodiments, multiple columns are employed for the capture of the lithium.

Figure 12:
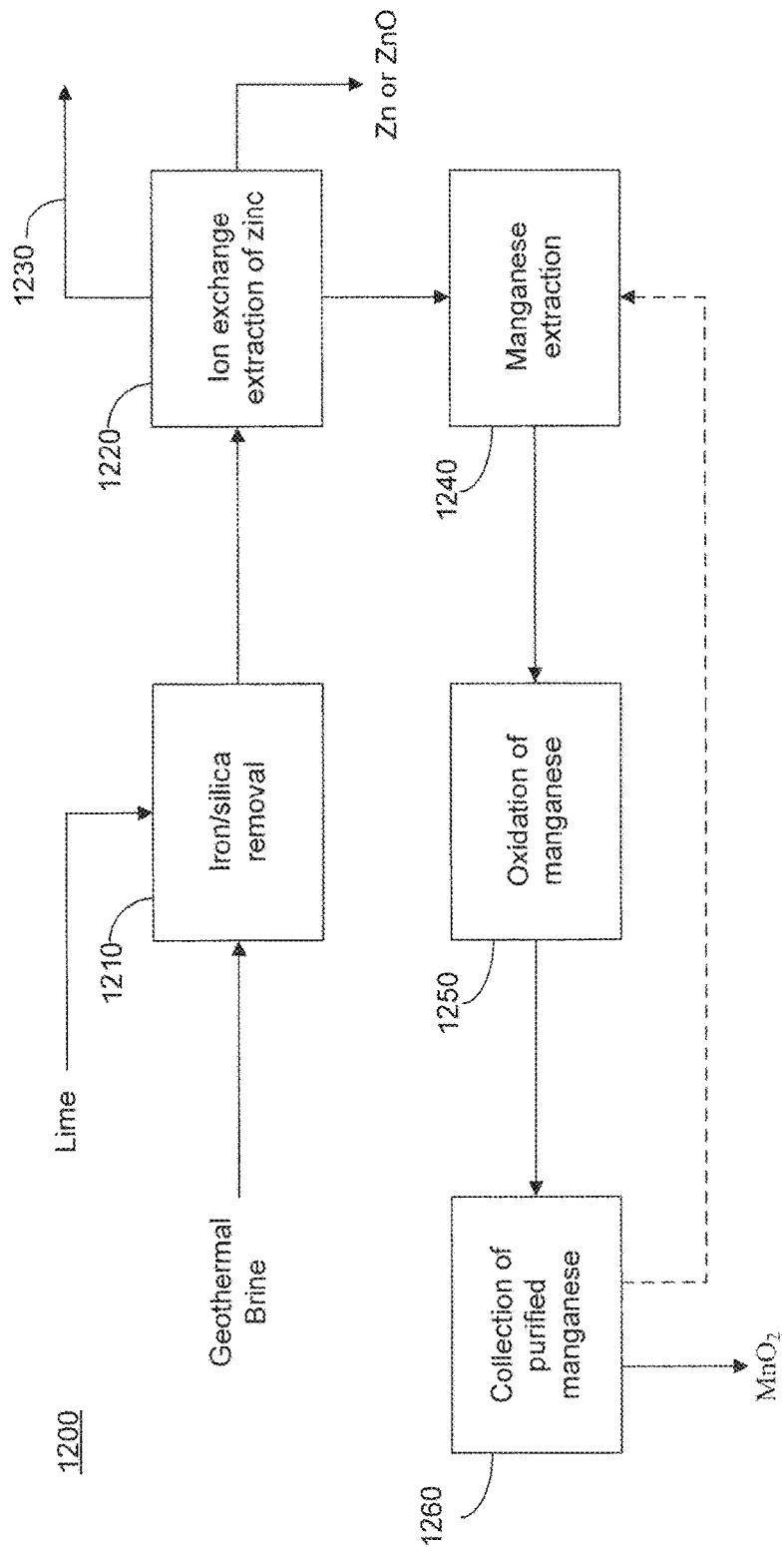
FIG. 12 illustrates another process for the recovery of manganese and zinc from a geothermal brine according to another embodiment of the invention.

In another embodiment of the present invention, in process 1200 provided in FIG. 12, iron and silica are first removed from the geothermal brine in step 1210. Methods for the removal of silica and iron include those methods previously described herein, and preferably include oxidation of the iron from iron (II) to iron (II), and the control of the pH of the solution with the addition of a base. Preferably, the iron is oxidized with air, and the pH is controlled by the addition of a base, such as calcium oxide or calcium hydroxide, or like compound.

The brine solution, now having a reduced concentration of silica and iron relative to the initial brine feed, can be supplied to zinc removal process 1220 that can include an ion exchange process, for example a basic anionic ion exchange resin like the chloride of a quaternary amine divinylbenzene/stryrene copolymer, or the chloride of trimethylamine functionalized chloromethylated copolymer of styrene and divinylbenzene, such as is described in U.S. Pat. No. 6,458,184, which is incorporated herein by reference in its entirety. Zinc separated by ion exchange, existing as zinc chloride or a zinc chloride anions, can then be converted into a saleable zinc product, such as zinc metal, zinc oxide, or zinc sulfate. In certain embodiments, the treated brine solution 1230 with reduced concentrations of at least zinc can then be injected into a geothermal reservoir, such as the geothermal reservoir from which the brine was originally removed. In certain embodiments, the treated brine solution 1230 with reduced concentrations of at least zinc can then be subjected to further processing for extraction of other metals.

The remaining brine solution, which includes manganese, can then optionally be supplied to a manganese recovery step 1240 and recovered by ion exchange, solvent extraction, precipitation, or like process. The manganese containing phase can be provided to oxidation step 1250, such as an electrochemical cell or chemical oxidation process, as described with respect to FIG. 11, to facilitate the recovery of manganese dioxide. Purified manganese can be collected in step 1260 by filtration. As shown with the dashed line, the liquid phase from step 350 can optionally be recycled to manganese extraction step 1240. As previously discussed, following recovery of the manganese and zinc, the respective solutions can be recycled to the solvent extraction step. Alternatively, the respective solutions can be recycled to the acid solution.

As noted with respect to FIG. 11, in process 1200 the lithium can optionally be removed from the brine solution at any point during the process by the means discussed above.

Figure 13:
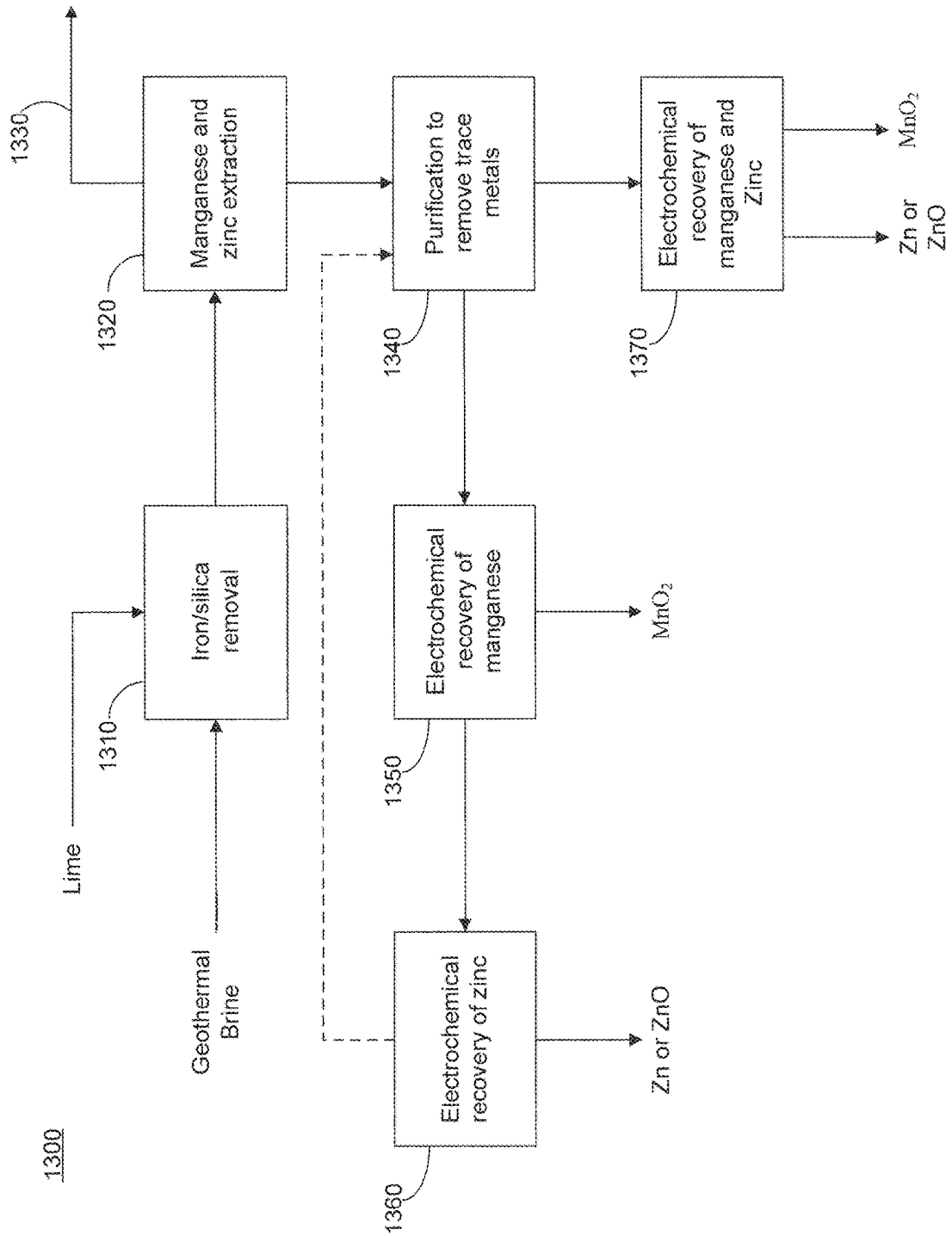
FIG. 13 illustrates another process for the recovery of manganese and zinc from a geothermal brine according to another embodiment of the invention.

In yet another embodiment, in process 1300 shown in FIG. 13, a method for the separation and isolation of manganese and zinc from a brine is provided. As noted with respect to FIGS. 11 and 12, the first step of the process includes the removal of iron and silica from the brine solution in step 1310. Preferably, as discussed above, the iron is oxidized and base is added to the solution to control the pH. Preferably, iron is oxidized with air, and the base is calcium oxide, calcium hydroxide, or a like compound.

Following removal of a major portion of the silica and iron, the manganese and zinc can be removed by liquid-liquid extraction step 1320. In some embodiments, the manganese and zinc are removed together by liquid-liquid extraction step 1320. In some embodiments, the manganese and zinc are either selectively or in combination removed by liquid-liquid extraction step 1320. Exemplary liquids suitable for the extraction of manganese and zinc are described in U.S. Pat. Nos. 6,458,184 and 6,682,644, the disclosures of which are incorporated herein by reference in their entireties. The solvents can include, for example, water-immiscible cationic organic solvents, such as di-(2-ethylhexyl) phosphoric acid (D2EHPA), and other similar solvents, as known in the art. In certain embodiments, the treated brine solution 1330 from extraction step 1320, from which the manganese and/or zinc have been removed, can then be injected into a geothermal reservoir, such as the geothermal reservoir from which the brine was originally removed. In certain embodiments, the treated brine solution 1330 with reduced concentrations of at least one of zinc and manganese can then be subjected to further processing for extraction of other metals.

Following the liquid-liquid extraction step, the extraction solution that includes the manganese and zinc can be provided to one or more purification step 1340. Purification step 1340 preferably is operable to remove calcium and other divalent cations, as well as some metals, such as copper, cadmium, cobalt, molybdenum, and nickel, although the purification steps are not limited to these metals.

Following purification step 1340, the manganese and zinc can be isolated in steps 1350 and 1360, respectively. Specifically, as previously discussed, manganese dioxide and zinc can each separately be produced from solution by electrowinning. In one embodiment, zinc is recovered first, followed by manganese. In an alternate embodiment, manganese is recovered first, followed by zinc. In certain embodiments, the pH is maintained at less than about 3.5 during the electrowinning process. In alternate embodiments, the temperature is maintained at less than about 60° C. during the electrowinning process. In certain embodiments, the pH of the solution supplied to manganese electrochemical recovery step 1350 is about 5, and the pH of the solution exiting the electrochemical cell is about 1. The pH of the solution supplied to zinc electrochemical recovery step 1360 is about 1.

In an alternate embodiment, the solution from purification step 1340 can be supplied to a single electrochemical recovery step 1370 wherein zinc and manganese can be deposited simultaneously as zinc oxide and manganese dioxide.

As previously discussed, following recovery of the manganese and zinc, the respective solutions can be recycled to either the solvent extraction step or to the acid solution. In certain embodiments, as shown by the dashed line, the solution from zinc electrochemical recovery step 1360 can be recycled to purification step 1340.

Use of Amines and Ammonium Salts

In certain embodiments, the present invention utilizes the coordination chemistry of the various metals to facilitate separation thereof. For example, the binding affinity or binding strength of transition metals with certain amine compounds, including primary, secondary, and tertiary amines, to preferentially form either a solid precipitate or a soluble complex can change, depending upon several experimental factors. Exemplary factors that can affect whether the metal salt will typically form a solid precipitate include basicity of the amine, the hydrophilic/hydrophobic nature of the amine, steric hindrance of the amine, whether the amine coordinates directly with the metal or forms one or more polymeric coordination complexes with the metal, solution pH, ionic strength of the solution, crystallization kinetics, and solvation properties. Because the formation of metal-amine coordination complexes can be influenced by so many factors, in general, it can be very difficult to customize/optimize an amine to selectively precipitate or dissolve a targeted metal(s) from a geothermal brine or solution that includes a targeted metal merely by identifying the binding characteristics of the metal for a given amine. In this context, ammonia, an inorganic amine, is very unique in that it can act as both base and a ligand simultaneously, depending upon the solution conditions, such as the pH and/or the concentration of metal salts and/or ammonia in the solution.

For example, in certain embodiments, ammonia reacts with certain hexaaqua metal ions in solution to form metal hydroxide (see, eqs. 1 and 2) precipitates or soluble metal ammonium coordination complexes (see, eq. 3), depending upon ammonia concentration. In equations 1 and 2, ammonia acts as a base to form the metal hydroxide precipitates. In equation 3, ammonia acts as a ligand, resulting in a clear solution having the metal complex dissolved therein.

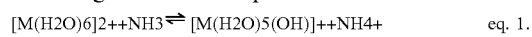

[M(H2O)6]2++NH3 ⇌ [M(H2O)5(OH)]++NH4+    eq. 1.

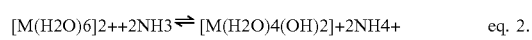

[M(H2O)6]2++2NH3 ⇌ [M(H2O)4(OH)2]+2NH4+    eq. 2.

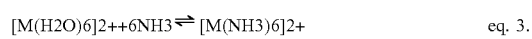

[M(H2O)6]2++6NH3 ⇌ [M(NH3)6]2+    eq. 3.

Furthermore, in certain embodiments, the metal ion and ammonia can form one of several possible intermediate complex species that may be isolated, wherein the metal ion coordination sphere can include ammonia, water and hydroxyl groups, depending upon the composition of the salt solution, temperature, pH, and ammonia concentration. The chemical equilibrium involving the precipitation and dissolution of metals salts can thus be advantageously used to selectively isolate certain transition metals from brines and metal containing solutions.

Figure 14:
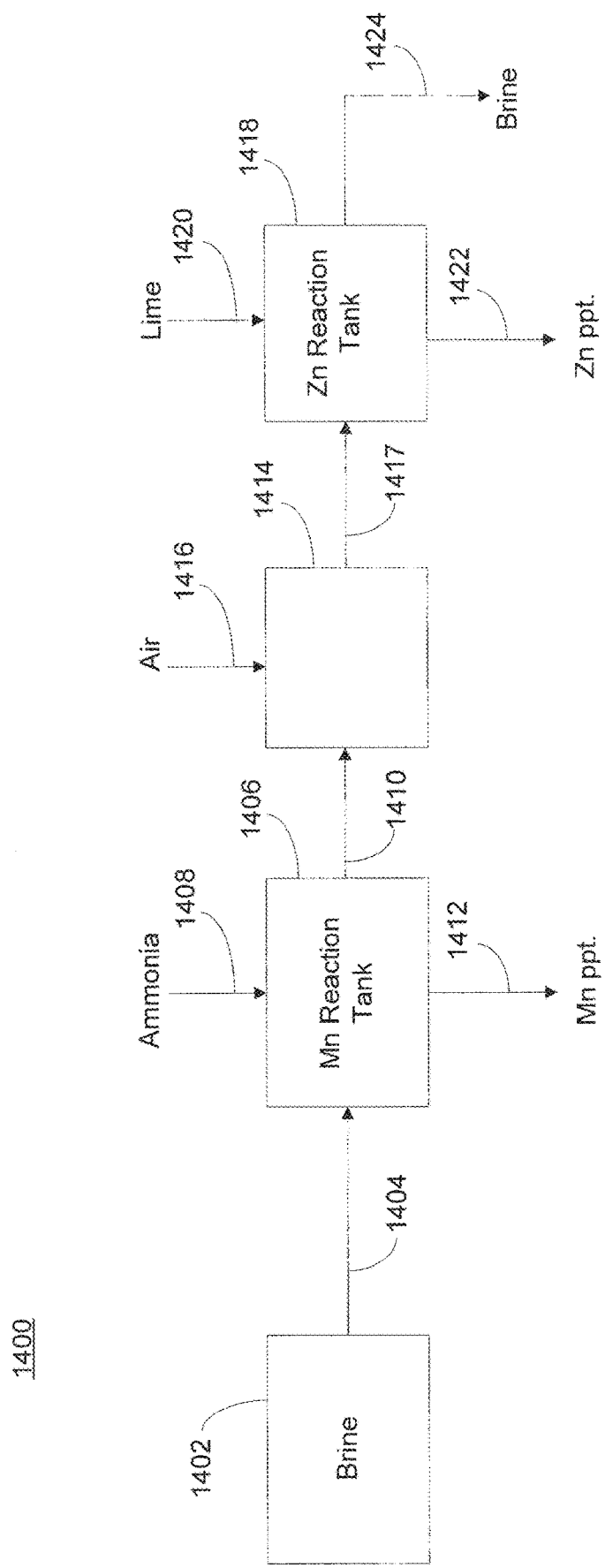
FIG. 14 illustrates another process for the recovery of manganese and zinc from a geothermal brine according to another embodiment of the invention.

An embodiment of the present invention is illustrated in FIG. 14. Process 1400 for the selective removal of manganese from a manganese containing solution, such as a geothermal brine, is provided. Brine 1402 is provided via line 1404 to manganese reaction tank 1406. Ammonia is supplied via line 1408 to manganese reaction tank 1406, where it contacts the manganese containing solution to selectively precipitate manganese having a purity of greater than 95%, alternatively greater than about 97%, alternatively greater than about 99%. The manganese reaction tank 1406 is maintained at a pH of at least about 6.8, alternatively at least about 8.2, alternatively at least about 8.4, to limit co-precipitation of other metal ions. A manganese-oxide/hydroxide precipitate can be collected from reaction tank 1406 via line 1412. In certain embodiments, it is believed that the manganese-oxide/hydroxide may include a high percentage of $Mn_3O_4$. The brine, having a reduced concentration of manganese, also referred to as a manganese depleted brine solution, can optionally be supplied via line 1410 to a holding tank 1414. In certain embodiments, the manganese depleted brine can be supplied via line 1410 into an injection well (not shown). Air is supplied via line 1416 to produce a reduced pH brine solution having a pH of less than about 7, alternatively less than about 6, alternatively between about 5 and 6. The reduced pH solution can be supplied from holding tank 1414 via line 1417 to zinc reaction tank 1418, which can also be supplied with lime supplied via line 1420, to increase the pH to greater than about 7, alternatively a pH of between about 7.2 and 7.7, alternatively about 7.5, thereby causing the zinc to precipitate. The zinc precipitate can be collected via line 1422, and the remaining brine solution, having a reduced concentration of both manganese and zinc, also referred to as a manganese and zinc depleted brine solution, can be removed via line 1424. The manganese and zinc depleted brine removed via line 1424 can be supplied to an alternate process for the recovery of additional metal ions, or alternatively can be supplied to an injection well (not shown).

In some embodiments, the brine may first have undergone a silica and/or iron removal step, wherein at least about 70% of the silica and/or at least about 70% of the iron has been removed from the brine. An amine, such as ammonia, is supplied via line 108 to manganese reaction tank 1406, where it contacts the manganese containing solution to selectively precipitate manganese, while not precipitating other ions from the manganese containing solution, such as zinc. In certain embodiments, the manganese can be precipitated from the manganese containing solution, while at least 90% of the zinc remains in solution (i.e., is not precipitated with the manganese). Alternatively, at least about 95% of the zinc remains in solution, alternatively at least about 97%, alternatively at least about 98%, alternatively at least about 99%, alternatively at least about 99.9%, and alternatively at least about 99.99%. The manganese precipitate can be washed with an aqueous solution and dried to produce a manganese containing compound having a purity, as measured by ICP, of greater than about 85% by weight, alternatively greater than about 90%, alternatively greater than about 95%, alternatively greater than about 97%, alternatively greater than about 99%. Purity, as used herein, refers to the amount (by weight) of the manganese containing compound, relative to amount (by weight) of other elements and compounds in the precipitate.

In another embodiment, an ion exchange agent can be used instead of lime to precipitate zinc. Exemplary ion exchange agents include DOWEX-K-21 resin beads, di(2-ethylhexyl)phosphonic acid (DEH2PA), and 2-ethylhexylphosphonic acid.

Figure 15:
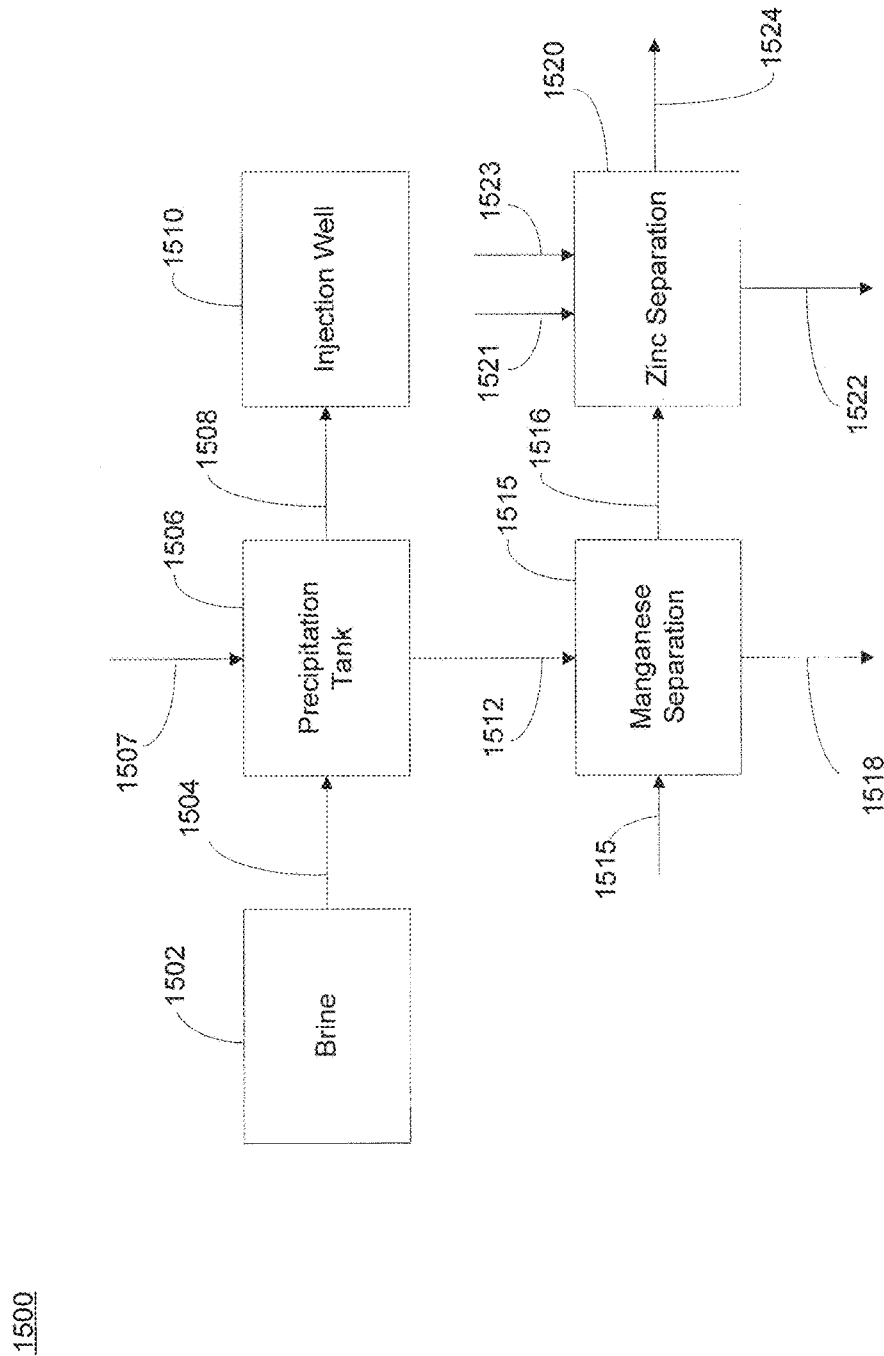
FIG. 15 illustrates another process for the recovery of manganese and zinc from a geothermal brine according to another embodiment of the invention.

Referring now to FIG. 15, another embodiment of the present invention is provided. Process 1500 for the selective removal of manganese and zinc from a manganese and zinc containing solution, such as a geothermal brine, is provided. Brine that includes manganese and zinc is provided from tank 1502 via line 1504 to precipitation tank 1506, where the brine is combined with lime supplied via line 1507 to provide a pH of between about 7.5 and 8, thereby precipitating zinc and manganese. The remaining brine solution, having a decreased concentration of manganese and zinc, can be supplied via line 1508 to injection well 1510, or alternatively supplied to an alternate process for the removal of additional metal ions (not shown). The solid manganese and zinc can be supplied from tank 1506 via line 1512 to a manganese separation process 1514, where the solids are contacted with an ammonium salt that is supplied via line 1515, until a pH of at least about 8.5, alternatively about 9.0 is achieved, to dissolve zinc precipitates, while the manganese remains as a solid. In certain embodiments, at least 90% of the zinc is dissolved. Alternatively, at least about 95% of the zinc is dissolved, alternatively at least about 97% of the zinc is dissolved, alternatively at least about 98% of the zinc is dissolved, alternatively at least about 99% of the zinc is dissolved, alternatively at least about 99.9% of the zinc is dissolved, and alternatively at least about 99.99% of the zinc is dissolved. The solid manganese is collected via line 1518, and the zinc containing solution 1516 is supplied to a zinc precipitation process 1520. The zinc containing solution is contacted with air supplied via line 1521, preferably supplied via a bubbler, until a major portion of the ammonia present has been removed, for example, at least about 70%, alternatively about 80%, or alternatively about 90%, and lime supplied via line 1523, to produce a pH of between about 7 and 8.5, or less than about 8, or between about 7.2 and 7.7, alternatively between about 7 and 8, alternatively between 6.8 and 7.7, or alternatively about 7.5. Lowering the pH is effective to produce a zinc precipitate, which can be collected via line 1522. Waste solution can be removed via line 1524. In some embodiments, the waste solution includes calcium, lead, sodium, potassium, and other ions.

It is understood that various means can be employed for isolating precipitated solids, including filters, settling tanks, centrifuges, and the like. It is also understood that purification of collected solids can include means for washing solids with water.

In certain aspects of the invention, the process for selectively removing manganese and zinc from brine solutions can also include steps for the removal and recovery of lead from brine solutions. In addition to providing a source for the production of lead, the process also results in higher purity manganese, as a portion of the lead can be present in the recovered manganese.

Figure 16:
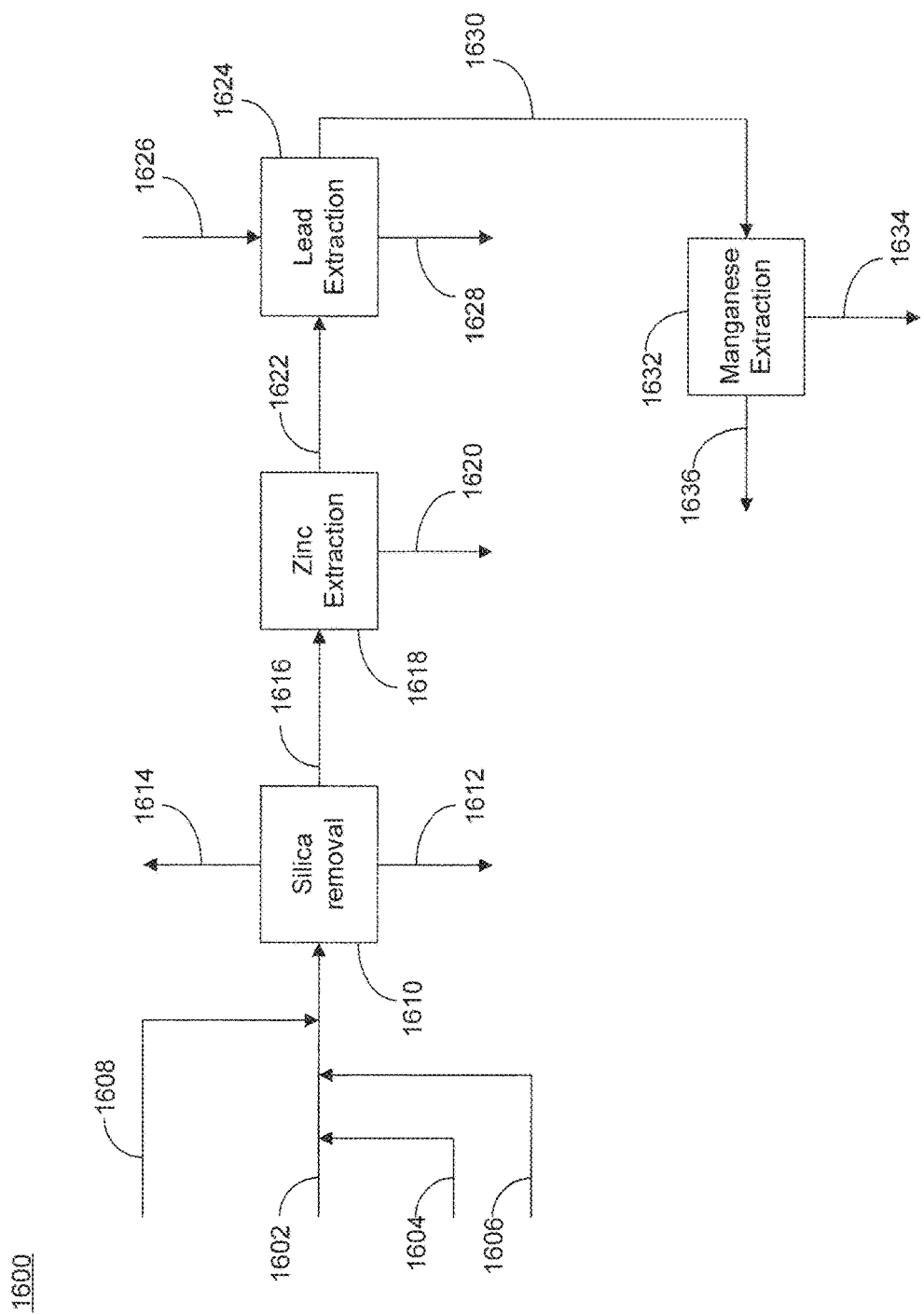
FIG. 16 illustrates another process for the recovery of manganese and zinc from a geothermal brine according to another embodiment of the invention.

Referring now to FIG. 16, a process 1600 for the extraction of various metals from brine, according to one aspect of the present invention, is provided. Brine is supplied via line 1602 and is combined with air supplied via line 1604, lime (20% solution by volume) supplied via line 1606, and flocculant (0.025% by volume in water) supplied via line 1608 in silica removal reactor 1610. Exemplary flow rates are as follows: brine (6 gal/min), flocculant (0.01 gal/min), air (100 cfm), and lime (0.5 lb/min). In silica removal reactor, a solid silica precipitate is formed, which is then removed via line 1612. Air and water vapor can be removed from silica removal reactor 1610 via line 1614. Under the exemplary flow conditions, for a brine solution having a silica concentration of about 10 ppm, production of the wet silica cake is about 15 lb/hr. A silica lean brine solution can then be supplied via line 1616 zinc extraction reactor 1618, which in certain embodiments can be an ion exchange resin that is designed to extract zinc ions, while allowing other ions to pass through the membrane. Zinc chloride can be collected from the extraction process via line 1620. The remaining brine solution, having had silica and zinc extracted therefrom, can be supplied via line 1622 to lead extraction reactor 1624. In certain embodiments, the brine solution supplied via line 1622 can have a pH of between about 5 and 6, and a temperature of between about 75° C. and 105° C. In lead extraction reactor 1624, the brine is contacted with a sulfide compound, such as sodium sulfide, hydrogen sulfide, sodium hydrogen sulfide, calcium sulfide, and the like, which can be supplied to the reactor via line 1626, to form a lead sulfide precipitate. The lead sulfide precipitate can be removed from reactor 1624 via line 1628.

Following the lead extraction, the remaining solution is supplied via line 1630 to manganese extraction reactor 1632, which can include any of the several different examples of manganese extraction that have been described herein. The treated brine composition, having reduced concentration of silica, zinc, lead, and manganese, can be collected via line 1634 and either injected into a geothermal reservoir, such as the geothermal reservoir from which the brine was originally removed, or supplied to further extraction or other processes. A solid manganese oxide and/or manganese hydroxide precipitate can be collected via line 1636.

In certain embodiments, the silica removal process can also include the addition of one or more NORM inhibitors (Normally Occurring Radioactive Materials inhibitors), such as Nalco 9355 and Nalco 1387, which is supplied to the silica removal reactor, along with the lime, air, brine and flocculant. The NORM inhibitors can be added at any stage of the process including, but not limited to, the reactors, clarifiers, and post-clarifier units.

Figure 17:
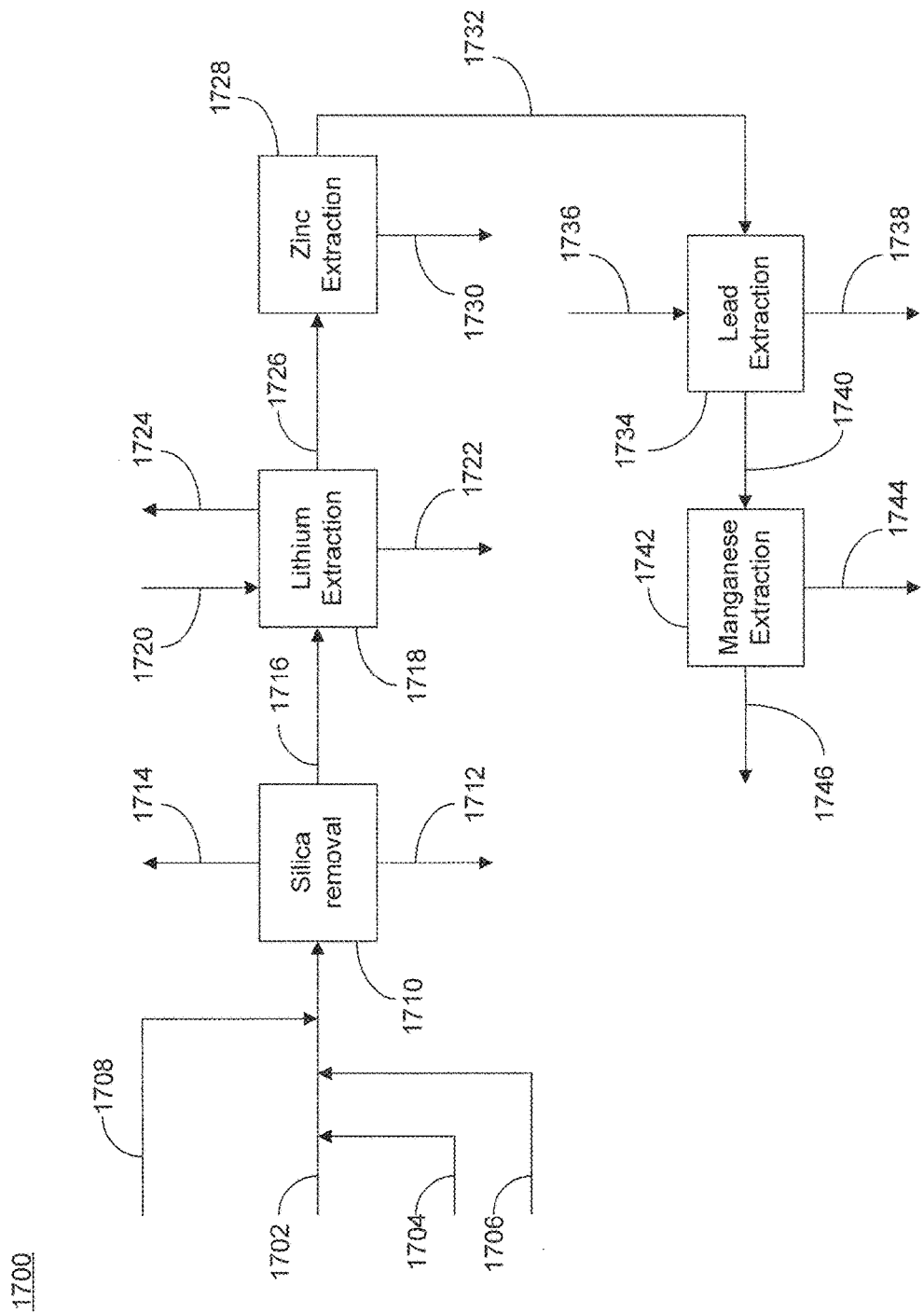
FIG. 17 illustrates another process for the recovery of manganese and zinc from a geothermal brine according to another embodiment of the invention.

As shown in FIG. 17, a process 1700 for the extraction of various metals from brine, according to one aspect of the present invention, is provided. Brine is supplied via line 1702 and is combined with air supplied via line 1704, lime (20% solution by volume) supplied via line 1706, and flocculant (0.025% by volume in water) supplied via line 1708 in silica removal reactor 1710. Exemplary flow rates are as follows: brine (6 gal/min), flocculant (0.01 gal/min), air (100 cfm), and lime (0.5 lb/min). In silica removal reactor, a solid silica precipitate is formed, which is then removed via line 1712. Air and water vapor can be removed from silica removal reactor 1710 via line 1714. Under the exemplary flow conditions, for a brine solution having a silica concentration of about 10 ppm, production of the wet silica cake is about 15 lb/hr. A silica lean brine solution can then be supplied via line 1716 to a lithium extraction reactor 1718. Lithium extraction reactor 1718 can include a lithium aluminate intercalate or other extraction medium that has been prepared for the purposes of extracting lithium. Lithium extraction reactor 1718 can include a water inlet 1720, a lithium salt extraction line 1722 for removal of lithium, typically as a chloride salt, after the salt has extracted from the silica lean brine. Water vapor can be removed from reactor 1718 via line 1724.

A brine solution that is lean in both silica and lithium can be supplied via line 1726 to zinc extraction process 1728, which in certain embodiments can be an ion exchange resin that is designed to extract zinc ions, while allowing other ions to pass through the membrane. Zinc chloride can be collected from the extraction process via line 1730. The remaining brine solution, having reduced concentrations of silica, lithium, and zinc, can be supplied via line 1732 to lead extraction reactor 1734. In certain embodiments, the brine solution supplied via line 1732 can have a pH of between about 5 and 6, and a temperature of between about 75° C. and 105C. In lead extraction reactor 1734, the brine is contacted with a sulfide compound, such as hydrogen sulfide, sodium sulfide, sodium hydrogen sulfide, and calcium sulfide, which can be supplied to the reactor via line 1736, to form lead sulfide. The lead sulfide precipitate can optionally be filtered or centrifuged, and then can be removed from reactor 1734 via line 1738.

Following lead extraction, the remaining solution is supplied via line 1740 to manganese extraction reactor 1742, which can include any of the several different examples of manganese extraction that have been described herein. A remaining brine solution, having reduced concentration of silica, lithium, zinc, lead and manganese, can be collected via line 1744 and either injected into a geothermal reservoir, such as the geothermal reservoir from which the brine was originally removed, or supplied to further extraction or other processes. A solid manganese oxide and/or manganese hydroxide precipitate (which can include $MnO_4$, $MnO_2$, and/or $Mn(OH)_2$) can be collected via line 1746. Preferably, air is excluded during the manganese precipitation.

In certain embodiments, the lithium extraction process can be an ion exchange process. Additionally, in certain embodiments, the extraction of lithium may result in the co-extraction of trace amounts of other salts present in the brine solution, such as sodium, potassium, calcium, manganese, and zinc.

Following the manganese extraction, in the embodiments of the present invention exemplified by FIGS. 16 and 17, the remaining brine solution can have a pH of between about 4.9 and about 5.5, at a temperature of between about 90° C. and 100° C. Generally, in processes that include a lithium extraction step, the lithium concentration will be less than about 250 ppm, preferably less than about 100 ppm. Similarly, the concentrations of zinc, silica, lead and manganese, will all be decreased relative to the feed solution. The treated brine composition, having reduced concentration of silica, lithium, zinc, lead, and manganese, can be collected via line 1746 and either injected into a geothermal reservoir, such as the geothermal reservoir from which the brine was originally removed, or supplied to further extraction or other processes.

The methods and systems described herein can be utilized in various sequences for removing zinc, manganese, lithium, and lead. One of ordinary skill in the art would recognize many variations, modifications, and alternatives. It is also understood that the examples and embodiments described herein are for illustrative purposes only and that various modifications or changes in light, thereof will be suggested to persons skilled in the art and are to be included within the spirit and purview of this application and scope of the appended claims.

EXAMPLES

Example 1. Selective Removal of Silica Using Aluminum Salts

A simulated brine was prepared to mimic the brine composition from exemplary Salton Sea deep test wells (post reactor crystallizer clarifier system), having an approximate composition of 260 ppm (mg/kg) lithium, 63,000 ppm sodium, 20,100 ppm potassium, 33,000 ppm calcium, 130 ppm strontium, 700 ppm zinc, 1700 ppm iron, 450 ppm boron, 54 ppm sulfate, 3 ppm fluoride, 450 ppm ammonium ion, 180 ppm barium, 160 ppm silica (measured as silicon dioxide), and 181.000 ppm chloride. The silica was added to the brine as acidified sodium silicate solution, with the target of a concentration of about 160 ppm, the anticipated value for the test well brine, after undergoing a clarifying process to partially remove silica. The pH of the simulated brine was between about 3 and 4, and was subsequently adjusted with sodium hydroxide or other suitable base.

To enhance separation of the aluminosilicates from the brine once precipitated, aluminosilicates are recycled to contact them with a fresh batch of brine. This enhances silica removal by increasing the size of the particles, making it easier to separate them physically. The amorphous aluminosilicate material was prepared by neutralizing a concentrated sodium silicate solution with an aluminum chloride salt. Specifically, 710 g of $NaSiO_3 \cdot 9H_2O$ was dissolved in 400 mL of distilled water. To the solution, 420 g of $AlCl_3$ was slowly added while stirring to produce a wet paste of precipitated material. The paste was dried at 60° C. in an oven overnight and washed with Milli-Q water to remove fines to produce a solid. The resulting solid was relatively insoluble (relative to pure amorphous silica) and suitable for use as a seed material for subsequent silica removal tests.

Approximately 1.6 mL of a 0.1M solution of $AlCl_3$ was added to approximately 60 mL of the simulated brine solution, which had an initial silica concentration of about 160 ppm and a pH of about 5. Approximately 1.5% by weight (relative to the total mass) of solid amorphous aluminosilicate was added to the solution. The $AlCl_3$ was slowly added in an amount equal to the molar amount of silica in solution to achieve a ratio of silica to aluminum of about 1:1. The solution was heated to approximately 95° C. and stirred constantly. The pH was monitored and adjusted by titrating with sodium hydroxide or calcium hydroxide to maintain the starting pH of about 5. The solution was allowed to stir for approximately 10 minutes, during which the silica and aluminum reacted to selectively precipitate on the seed material, thereby removing both aluminum and silica from the solution. The monomeric silica content (i.e., non-amorphous aluminosilicate content) dropped to approximately 25-40 ppm upon addition of base to maintain the pH at about 5. An additional 5-15% of the silica present precipitated over the next 30 minutes. Total silica removal for the process after 15 minutes of stirring was about 95%, resulting in a brine solution having a silica content of approximately 10 ppm. The aluminum concentration of the solution, after precipitation of the silica, was between about 2-10 ppm.

Example 2. Selective Removal of Silica Using Ferrous Iron

A simulated brine was prepared to mimic the brine composition of test wells found in the Salton Sea, having an approximate composition of about 252 ppm lithium, 61,900 ppm sodium, 20,400 ppm potassium, 33,300 ppm calcium, 123 ppm strontium, 728 ppm zinc, 1620 ppm iron, 201 ppm boron, 322 ppm sulfate, 3 ppm fluoride, 201 ppm barium, 57 ppm magnesium, 1880 ppm manganese, 136 ppm lead, 6 ppm copper, II ppm arsenic, 160 ppm silicon dioxide, and 181,000 ppm chloride. The simulated brine (1539.2 g) was sparged with air for about 60 minutes, during which time pH was measured. A calcium hydroxide slurry having 20% solids by weight was added dropwise after 60, 90, and 120 minutes (total weight of the calcium hydroxide slurry added was 13.5 g; calcium hydroxide was 2.7 g dry basis) to the solution. The pH was monitored throughout the reaction and was initially allowed to fall, and was then adjusted to a pH of about 5 with the addition of calcium hydroxide after 60 minutes, and maintained at about a pH of 5 thereafter. The reaction was allowed to stir while the pH was maintained at about 5. Total reaction time was about 180 minutes. A white precipitate was collected, washed and weighed, providing a yield of about 95% recovery of the silica present in the brine and about 100% of the iron present in the brine.

Example 3. Selective Removal of Silica Using Activated Alumina

A 50 mL brine solution having approximately 180 ppm dissolved silica was passed through a 2.5 cm diameter column filled to a depth of 20 cm and containing approximately 0.5 g activated alumina and about 1.2 g water. The silica preferentially adsorbed onto the alumina and was removed from the solution. The activated alumina had a surface area of about 300 $m^2$/g and a grain size of between about 8-14 mesh (~2 mm diameter). The total bed volume was about 102 mL. The temperature during the step of contacting the silica containing brine and the activated alumina was maintained between about 90 and 95° C.

The concentration of silica in the brine was monitored by measuring monomeric silica using the molybdate colorimetric method and using Atomic Absorption for total silica. Silica values were significantly lower in the exit solution due to adsorption of the silica on the activated alumina. Saturation of the activated alumina in the column was indicated by a sudden increase in silica concentration in the exit solution. A total loading of about 1.8% by weight of silica ($SiO_2$) on the activated alumina was achieved.

To regenerate the alumina for another cycle of silica removal, the alumina was first washed with 5 bed volumes of dilute water in order to remove any salt solution remaining in the pores. This removed only a small amount of silica from the alumina. The alumina was then reacted with a dilute (0.1 M) sodium hydroxide solution at a temperature of between about 50 to 75° C. until a desired amount of silica has been removed. The alumina was then rinsed with between about 2-3 bed volumes of dilute acid to prepare the surface for the next silica adsorption cycle.

Example 4. Processing of Geothermal Brine

Approximately 1.5% by weight aluminosilicate seed was added to a brine solution containing about 200 mg/L Li, 75,000 mg/L Na, 24,000 mg/L K, 39,000 mg/L Ca, 156 mg/L Sr, 834 mg/L Zn, 539 mg/L B, 219 mg/L Ba, 160 mg/L $SiO_2$, and 215,500 mg/L Cl and maintained at about 95° C. About 1.07 mL of a 0.1 M solution of $AlCl_3$ was added to approximately 39 mL of the brine solution such that the ratio of $SiO_2$:Al was 1:1. About 0.45 mL of a 1N solution of NaOH was used to titrate the pH of the solution to about 5. The solution was heated and stirred for about 10 minutes to ensure complete precipitation of the aluminosilicate.

Analysis of both the feed and the output fluids during silica removal yielded mixed results. Comparing the results of molybdate blue calorimetry (MBC; useful for quantifying monomeric silica) and ICP-OES yielded silica levels that were significantly lower than input levels (160 mg/L).

As shown in Table 1, the results of several methods for the removal of silica from a brine solution were tested. Both $Ca(OH)_2$ and NaOH were investigated, as was NaOH along with a 10% excess of $AlCl_3$. For the use of an excess of $AlCl_3$, the additional $AlCl_3$ was added approximately 2 minutes after initiation of the reaction, and additional NaOH was titrated into the reaction mixture to maintain a pH of about 5. Finally, NaOH and polymerized aluminum in the form of aluminum chlorohydrate (PAC) was also investigated, instead of $AlCl_3$, and was prepared in situ by titrating NaOH into $AlCl_3$ until a pH of about 4.5 was achieved. Additional base was added to raise the pH to about 5.

Both $Ca(OH)_2$ and NaOH were effective in both increasing the pH of the solution, and in removing silica, with $Ca(OH)_2$ being slightly more effective at removing silica than NaOH, and removing at least about 80% of the silica present. Precipitation of silica by contacting with an excess of $AlCl_3$ resulted in the precipitation of nearly 87% of silica present. Finally, use of the PAC resulted in the removal of about 84% of the silica present.

TABLE 1

| Test Condition | ICP | | MBC | |
| --- | --- | --- | --- | --- |
| | % $SiO_2$ remaining in solution | % $SiO_2$ removed | % $SiO_2$ remaining in solution | % $SiO_2$ removed |
| $Ca(OH)_2$ | 17 | 83 | 19 | 81 |
| NaOH | 28 | 72 | 20 | 80 |
| NaOH + 110% $AlCl_3$ | 16 | 84 | 13 | 87 |
| NaOH + PAC | 17 | 83 | 15 | 85 |

Example 5. Silica Removal Process Using Aluminum Salts

Approximately 60 mL of brine containing about 160 mg/L silica at a pH of 5 was added to 1.07 g of amorphous aluminosilicate seed (~1.5 wt. % solids). Approximately 1.6 mL of a 0.1M solution of aluminum chloride ($AlCl_3$) was added to the brine solution. The solution was stirred, maintained at nominally 95° C., and the pH monitored. The pH dropped to about 2.7 upon addition of the $AlCl_3$ solution. Approximately 13 mL of a saturated and filtered $Ca(OH)_2$ solution was added. Silica and the aluminum salt formed precipitates, yielding a brine solution having a silica content of about 0.23 mg/mL.

Example 6. Packed Bed Testing

A hold-up vessel and packed bed tester (HUV-PB) were used in the packed bed testing. A baffled, plug-flow design with stirred sections to keep solid particles suspended in solution was employed. The plug-flow design with mixing is important as it maintains a constant and narrow residence time distribution (RTD) while preventing premature deposition of suspended solids, which would bias scaling and packed-bed fouling rates.

The test set-up included brine pumping and metering equipment, a hold-up vessel (HUV) to provide controlled residence times similar to a full-scale injection system, and related controls and instrumentation.

A HUV sized for the minimum and maximum hold-up time for injection pipelines and wellbores was used to test the fouling rate across the packed bed. The fouling rate was monitored by real-time pressure drop (Δ P) signals at constant flow through the packed bed.

The packing configuration and flow through the packed bed was designed to provide accelerated fouling compared to that occurring in the injection well. The packed beds were packed with screened drilling rock chips from a well hydrothermal zone. The rock chips were primarily of two types: 1) hydrothermally-crystallized fine-grained granitic material composed of quartz and feldspar, and 2) silica-bonded meta-siltstone. The rock chips were uniformly packed to allow for the measurement of relative fouling rates under process conditions for each test.

The run time of each experiment depended on the behavior of the brine across the packed bed and the increase in pressure across the packed bed. If a pressure drop maximum was not reached, the test was run for up to 2 weeks before discontinuation of the test.

A side-stream of brine was supplied to the packed bed through heat-traced packed bed tubing at about 10 psig from continuously flowing bypass loops. The brine streams were metered by positive-displacement peristaltic pumps at a controlled ratio through a HUV to simulate the average residence time in the injection pipeline and well casings. The HUV was fitted with baffles and mixing paddles to provide plug flow without settling of suspended solids. The brine was then pumped under high-pressure (up to 1000 psig) through the columns packed with rock chips in order to simulate the reservoir formation.

During each test, data collection included brine flow rate, temperature, pressure, and differential pressure for each of the columns. Brine samples were collected for chemical analysis upstream and downstream of the beds. The tests were run until the pressure drop (Δ P) across the packed bed indicated significant plugging (approaching 1000 psig) while the brine flow rate through the column was maintained at a constant rate by a positive displacement pump. The tubes had injection brine pumped through them until the pressure reached about 1000 psig at 1 LPM brine flow. The tests were concluded at 2 weeks, if the pressure drop of 1000 psig was not experienced.

At the end of each test the packed bed and tubing test sections were weighed to determine the amount of scale deposited and the residual bulk porosity of the packed bed was measured. Cross-sections of the packed bed were examined by Scanning Electron Microscopy (SEM) and X-ray diffraction (XRD). Brine samples and deposited solids in the tubing were also analyzed for chemical composition.

The test runs were performed in accordance with Table 2.

TABLE 2

| Test 1 | Untreated Brine (UB) |
| --- | --- |
| Test 2 | Treated Brine (TB) |
| Test 3 | 50% UB:50% TB |
| Test 4 | Untreated Brine (UB) |
| Test 5 | 50% UB:50% TB |
| Test 6 | Treated Brine (TB) |
| Test 7 | Untreated Brine (UB) |
| Test 8 | Treated Brine (TB) |
| Test 9 | 50% UB:50% TB |
| Test 10 | Untreated Brine (UB) |

Treated brine was brine that had been subjected to a silica management and iron removal step as described in Example 4 above (continuous removal of silica). The brine was treated by first oxidizing the Fe (II) to Fe (II) and precipitating it as FeO(OH) with the addition of lime (as described herein). The lithium was extracted using a granulated sorbent based on a lithium aluminate intercalate. Untreated brine was brine that had been flashed for purposes of extracting energy, but which had only a portion of silica removed, and had not been processed to remove iron, in a process in accordance with that described in U.S. Pat. No. 5,413,718. The untreated brine had approximately 160 mg/kg of silica. The 50:50 blends were 50:50 by volumetric flow rate of treated and untreated brine.

Lithium Extraction Step

Lithium was extracted with a granular lithium aluminate sorbent placed in two five foot deep and 18 inch diameter columns that were run in alternating sequences of load and strip. Each operation was approximately two hours in duration. The sorbent was made according to the process described in co-pending U.S. application Ser. No. 12/945,519, filed on Nov. 12, 2010, which is hereby incorporated by reference in its entirety. Once the brine had passed through the columns it was recovered in a holding tank before a part of the flow was pumped packed bed test. The lithium was reduced from approximately 250 mg/kg to generally less than about 100 mg/kg and preferably less than about 15 ppm.

The pressure profiles of each run are shown in FIGS. 18-26, and are summarized in Table 3 below.

TABLE 3

| Packed Bed Days of Operation (to 1000 psi stop-point) | | | | |
|---|---|---|---|---|
| Source | | | | Average |
| Untreated Brine | 1.38 (Test 1) | 1.67 (Test 4) | 0.97 (Test 7) | 1.34 days |
| Treated Brine | +15.0 (Test 2) | 4.59 (Test 6) | +13.0 (Test 8) | +10.9 days sig |
| 50:50 blend | 1.39 (Test 3) | 3.28 (Test 5) | 4.60 (Test 9) | 3.09 days |

Figure 18:
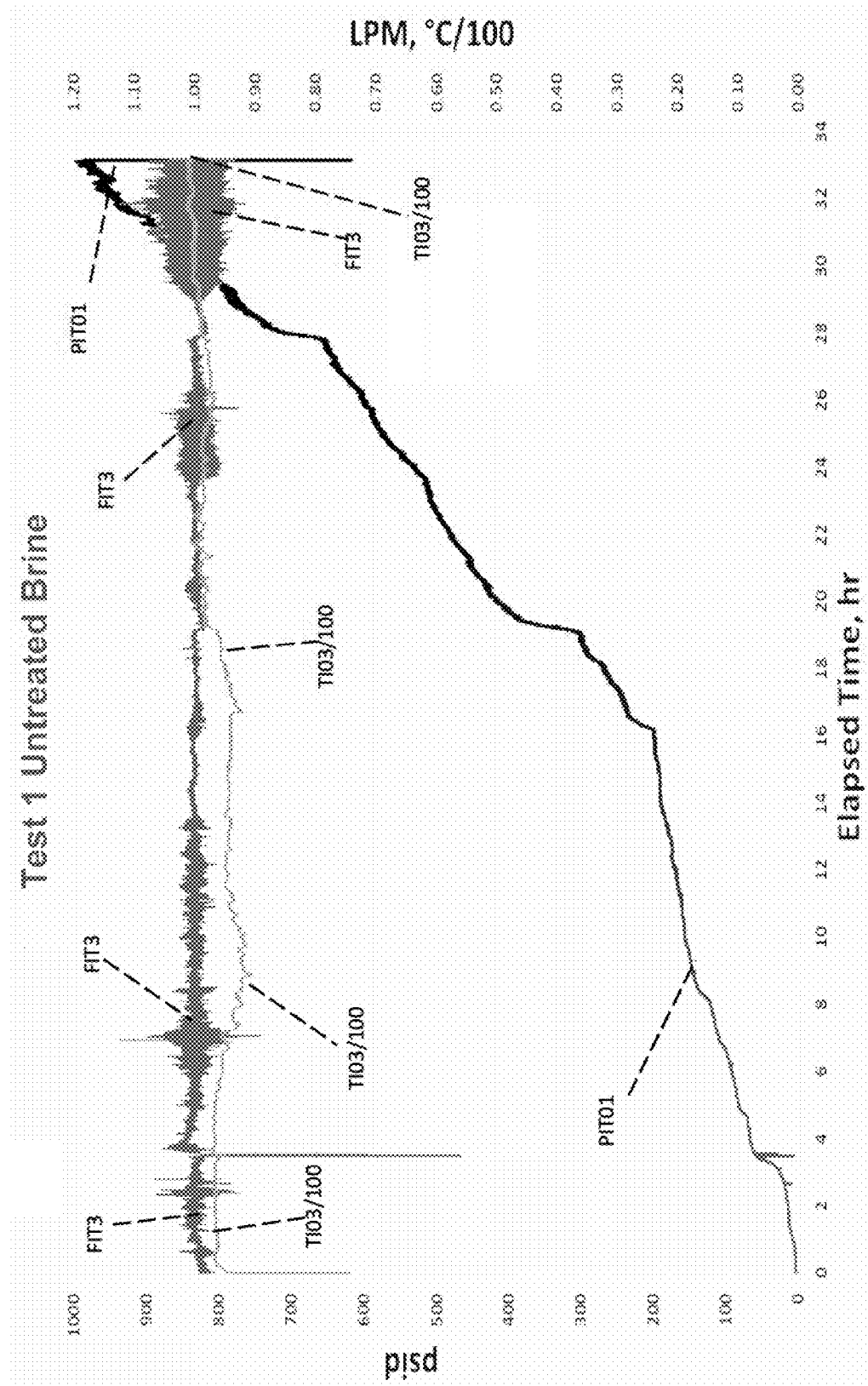
FIG. 18 is a graph showing the packed bed differential pressure versus time for an untreated brine.
Figure 19:
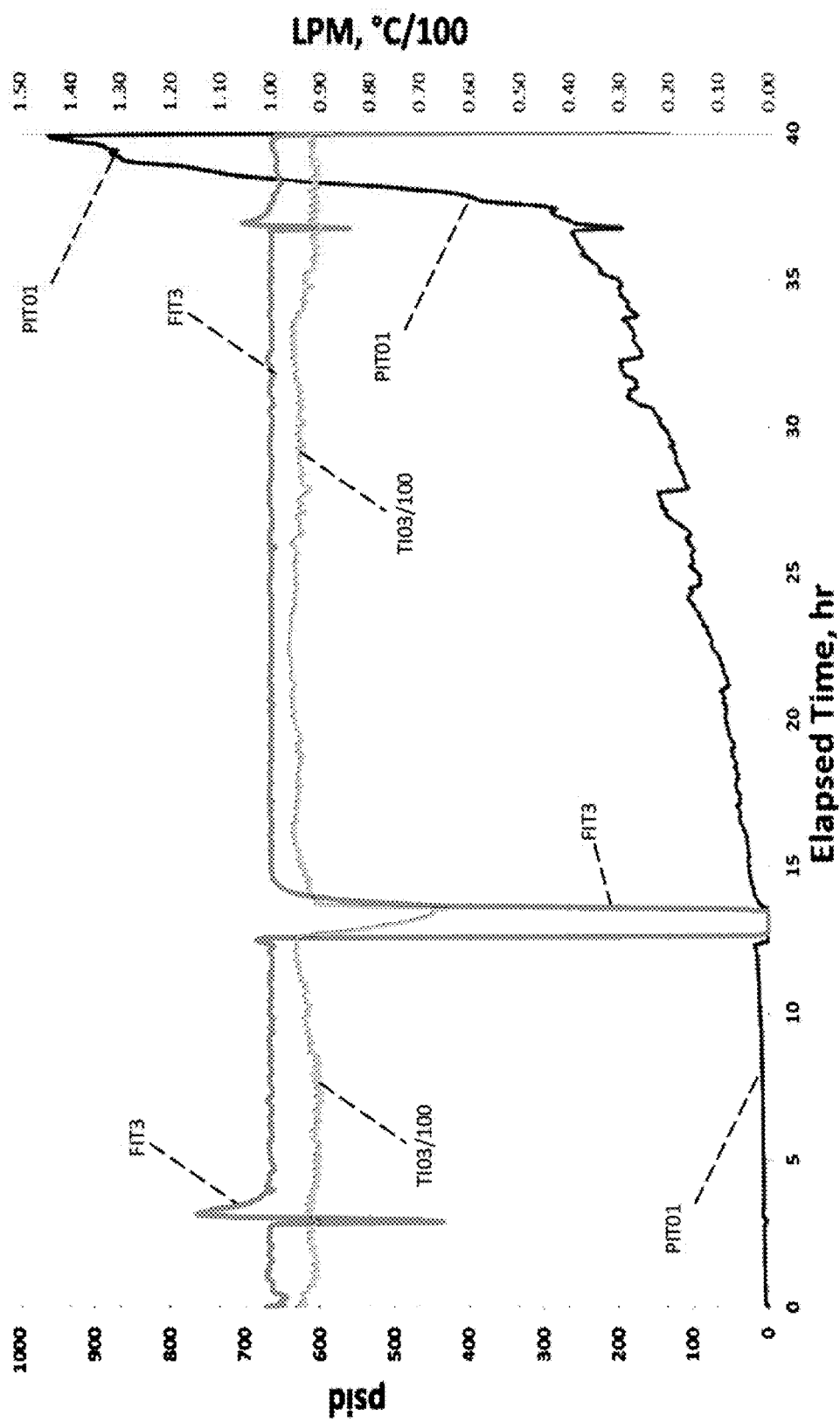
FIG. 19 is a graph showing the packed bed differential pressure versus time for an untreated brine.
Figure 20:
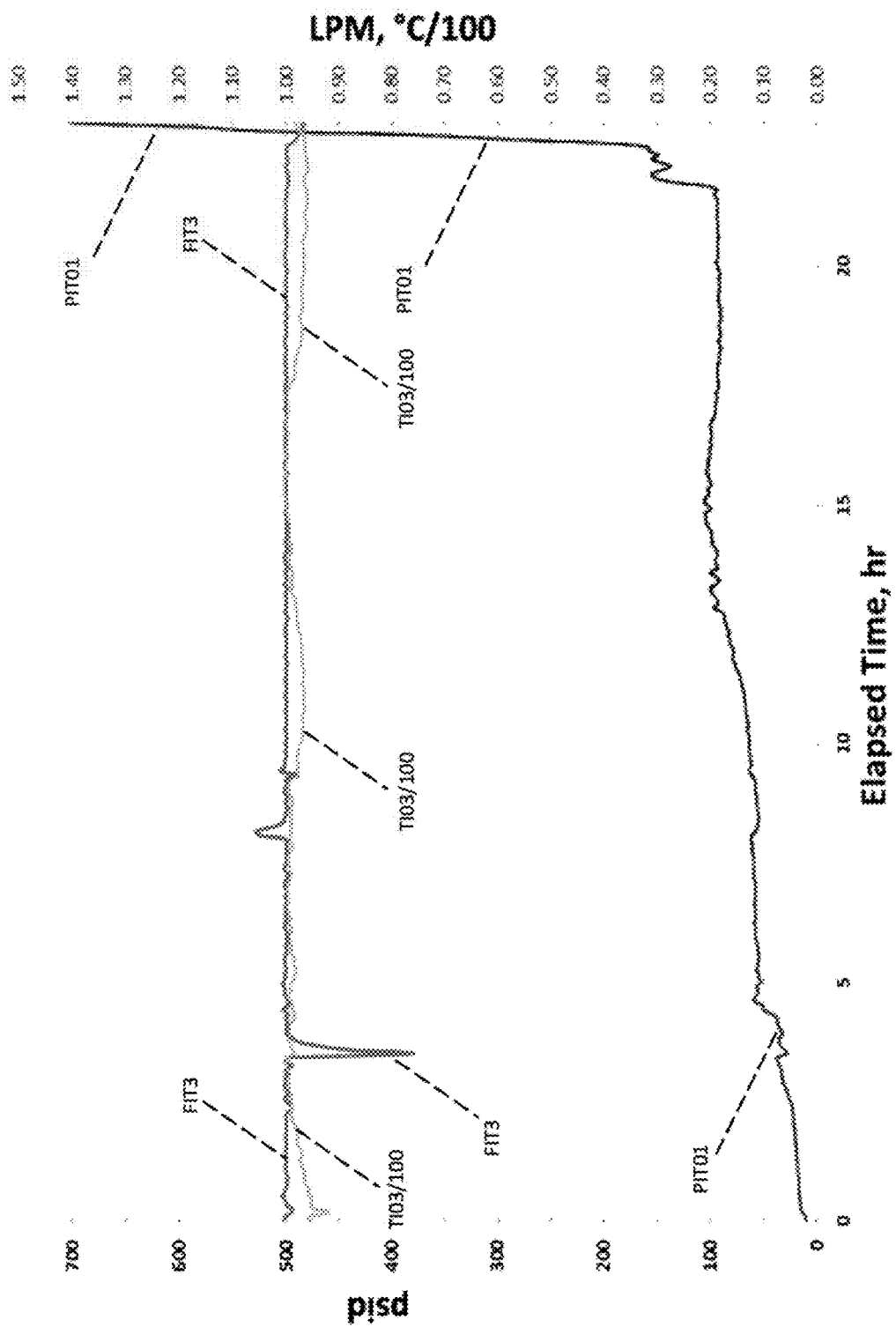
FIG. 20 is a graph showing the packed bed differential pressure versus time for an untreated brine.
Figure 21:
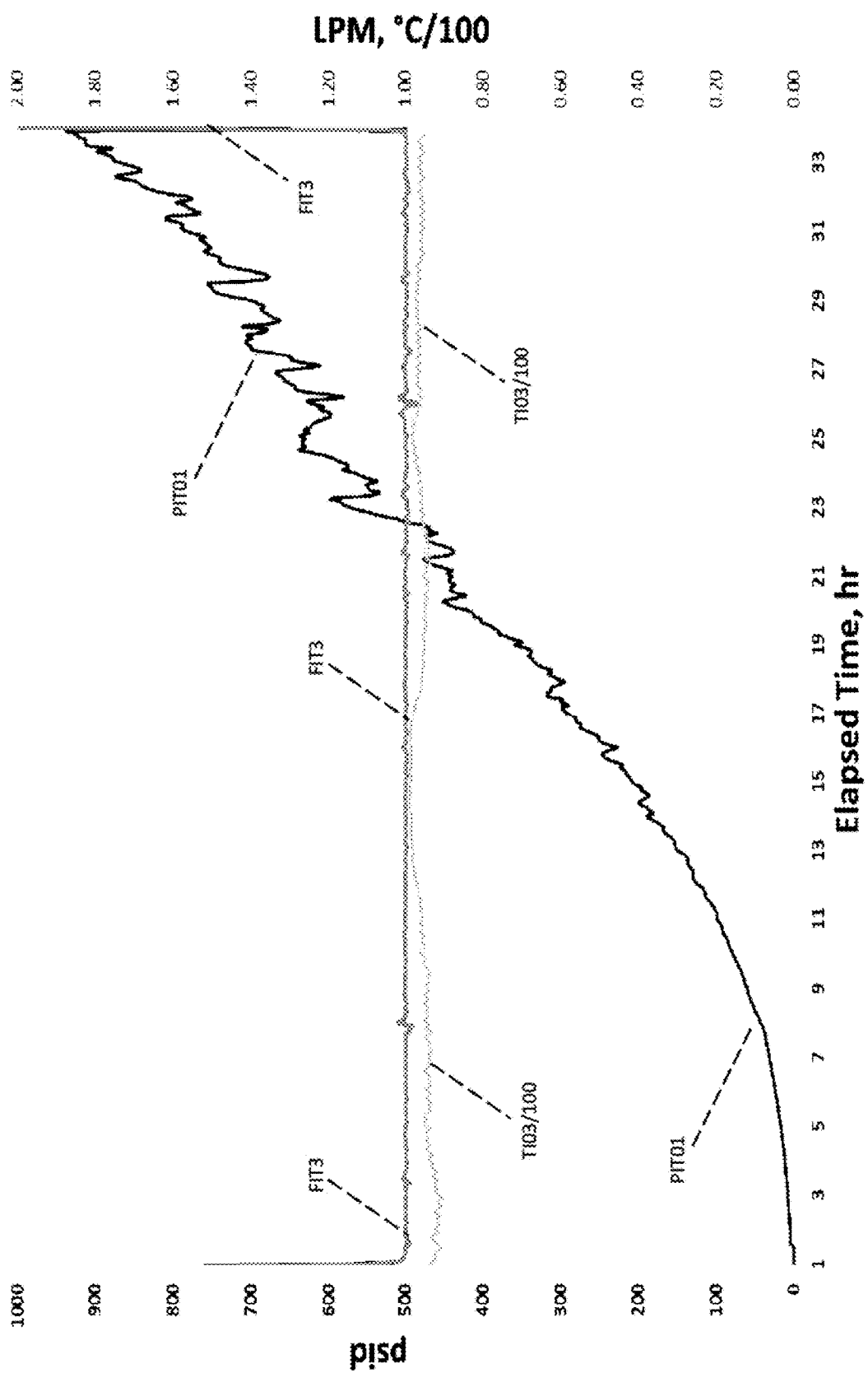
FIG. 21 is a graph showing the packed bed differential pressure versus time for a 50:50 blend brine.
Figure 22:
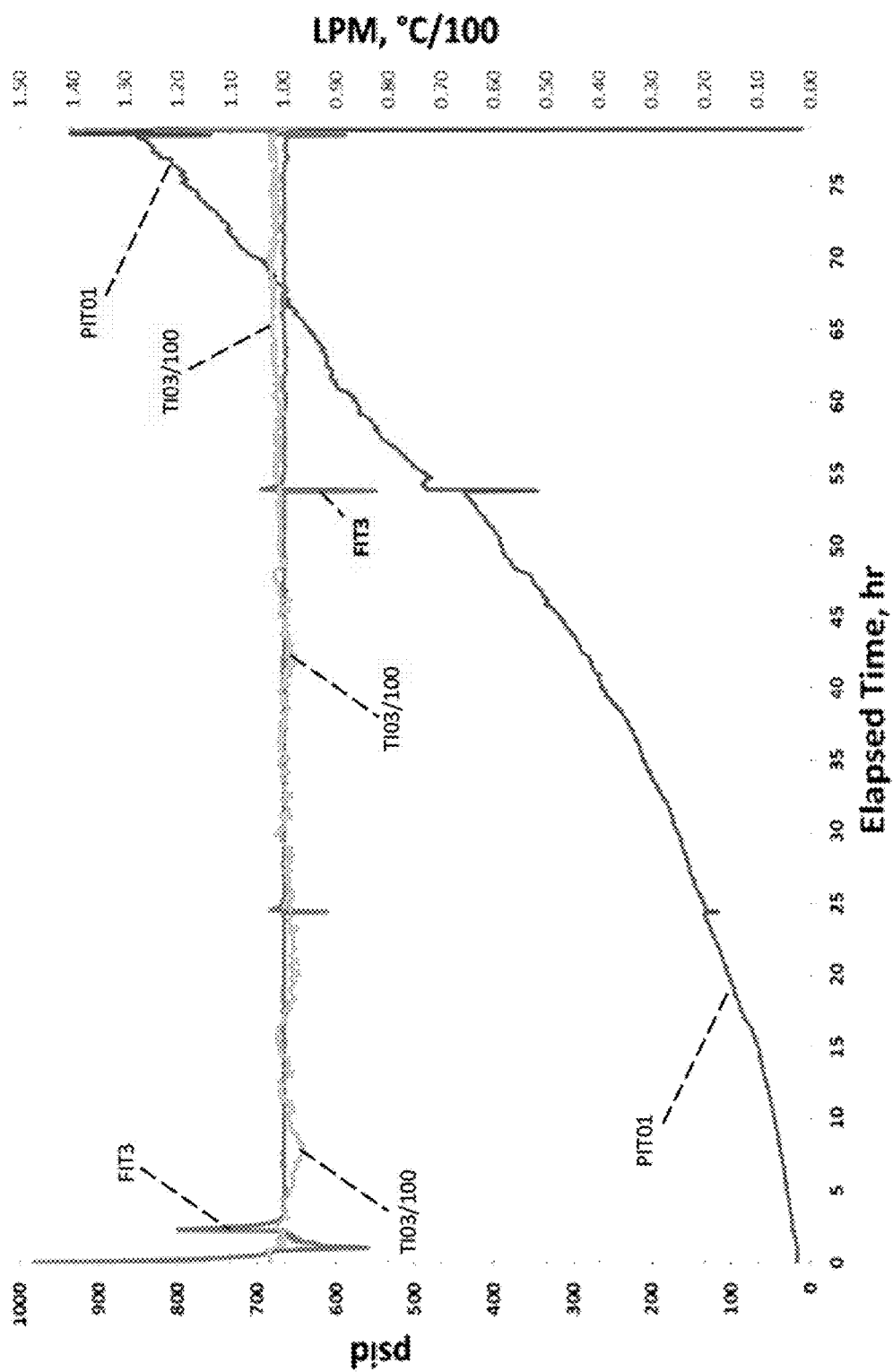
FIG. 22 is a graph showing the packed bed differential pressure versus time for a 50:50 blend brine.
Figure 23:
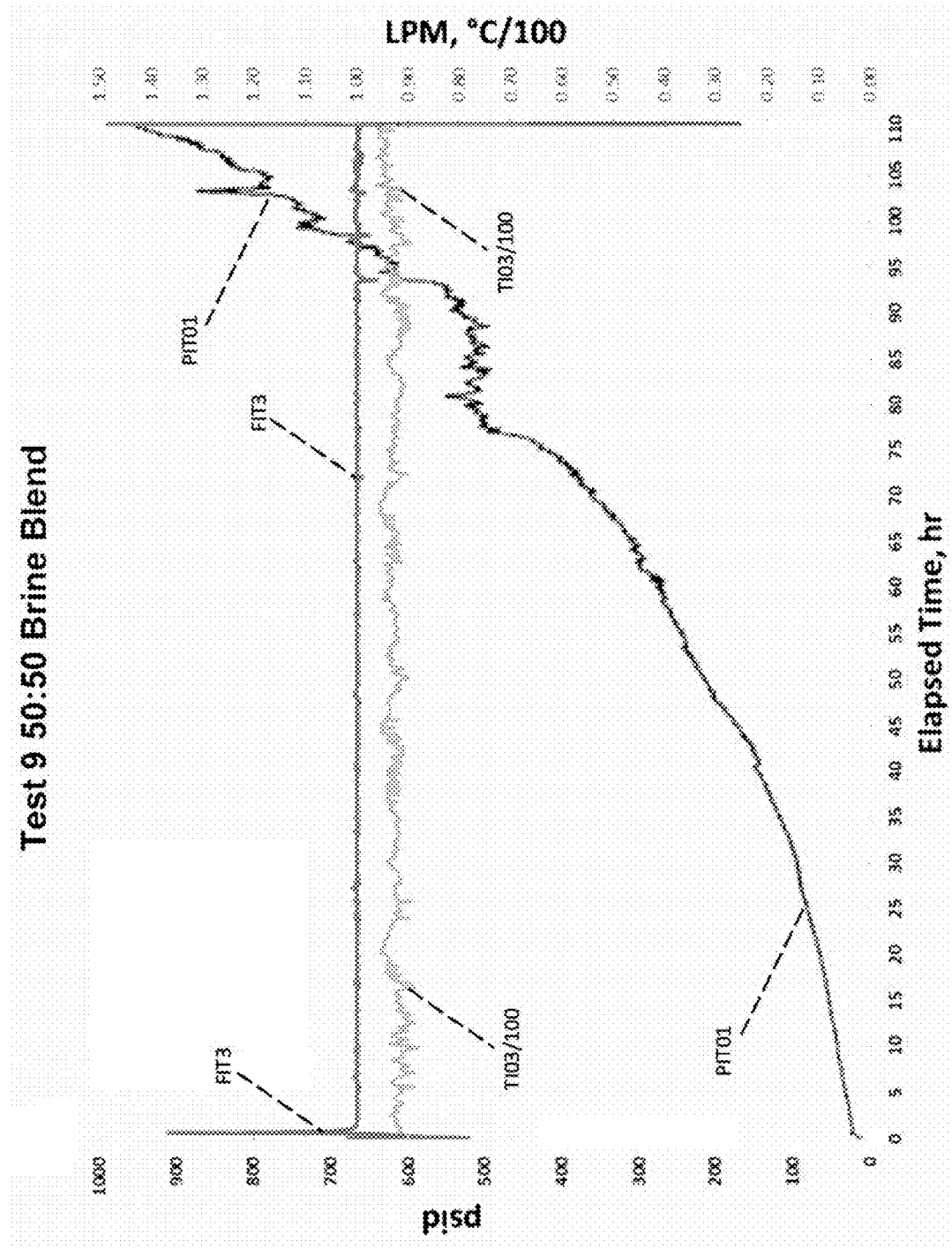
FIG. 23 is a graph showing the packed bed differential pressure versus time for a 50:50 blend brine.
Figure 24:
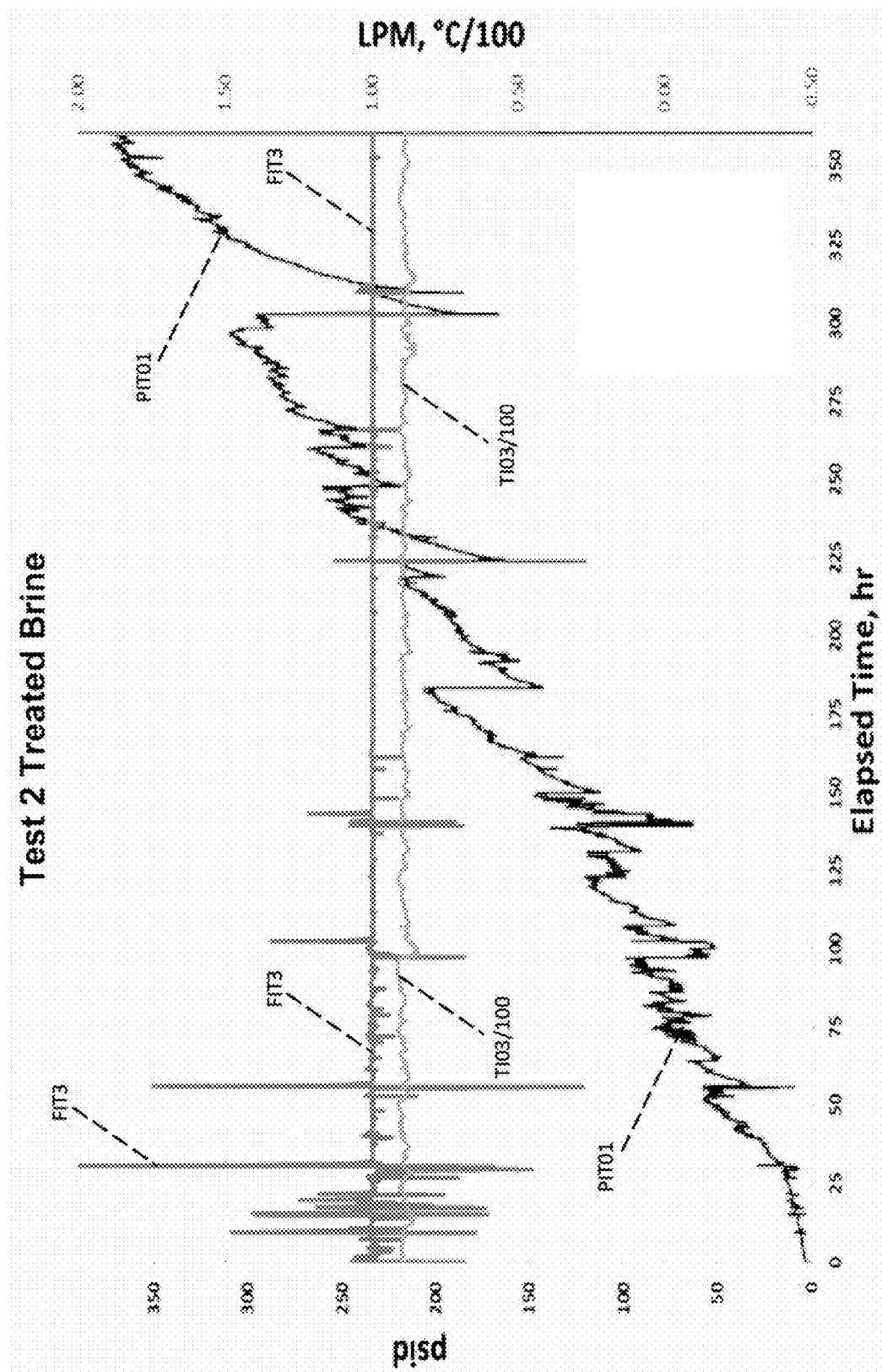
FIG. 24 is a graph showing the packed bed differential pressure versus time for a treated brine.
Figure 25:
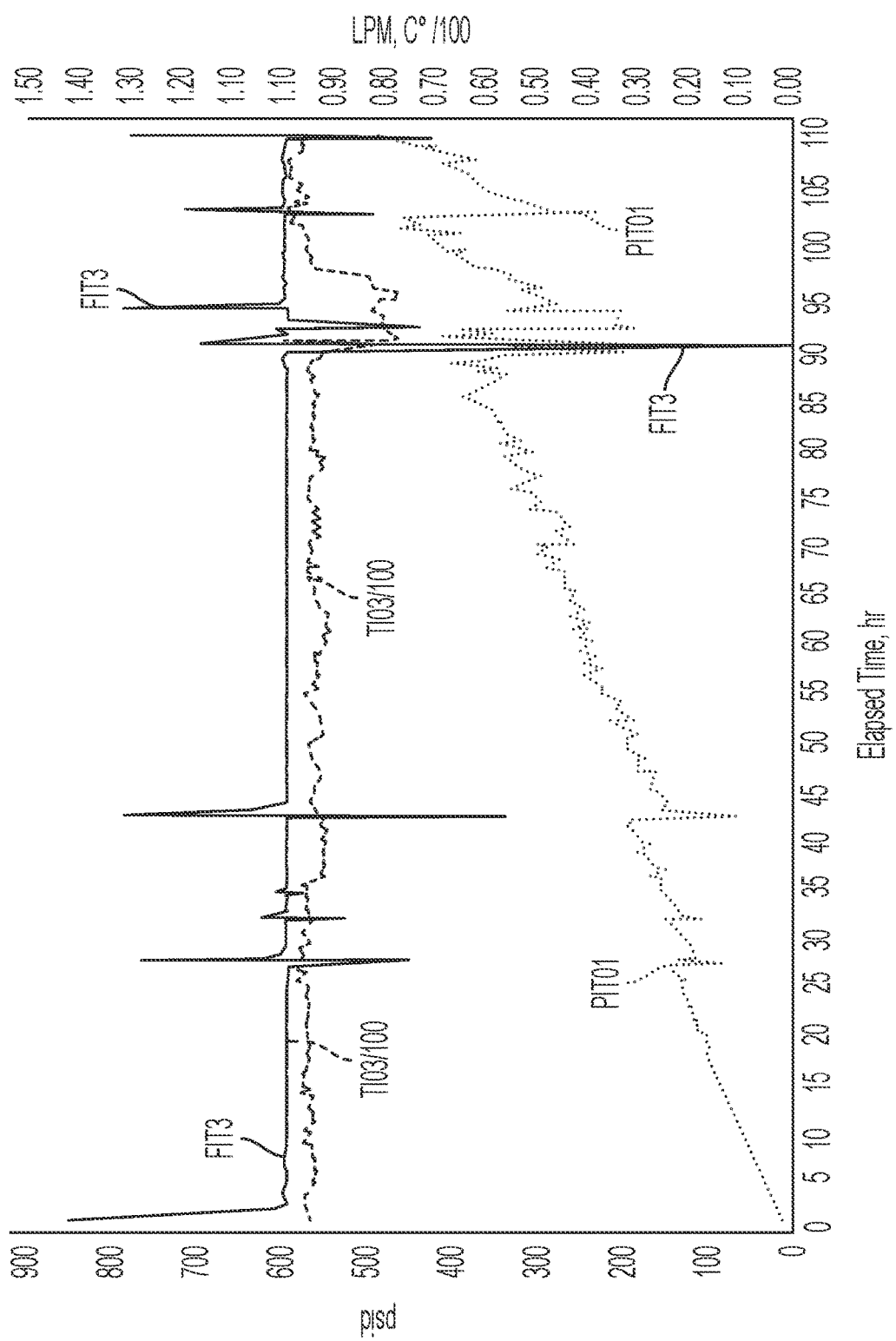
FIG. 25 is a graph showing the packed bed differential pressure versus time for a treated brine.
Figure 26:
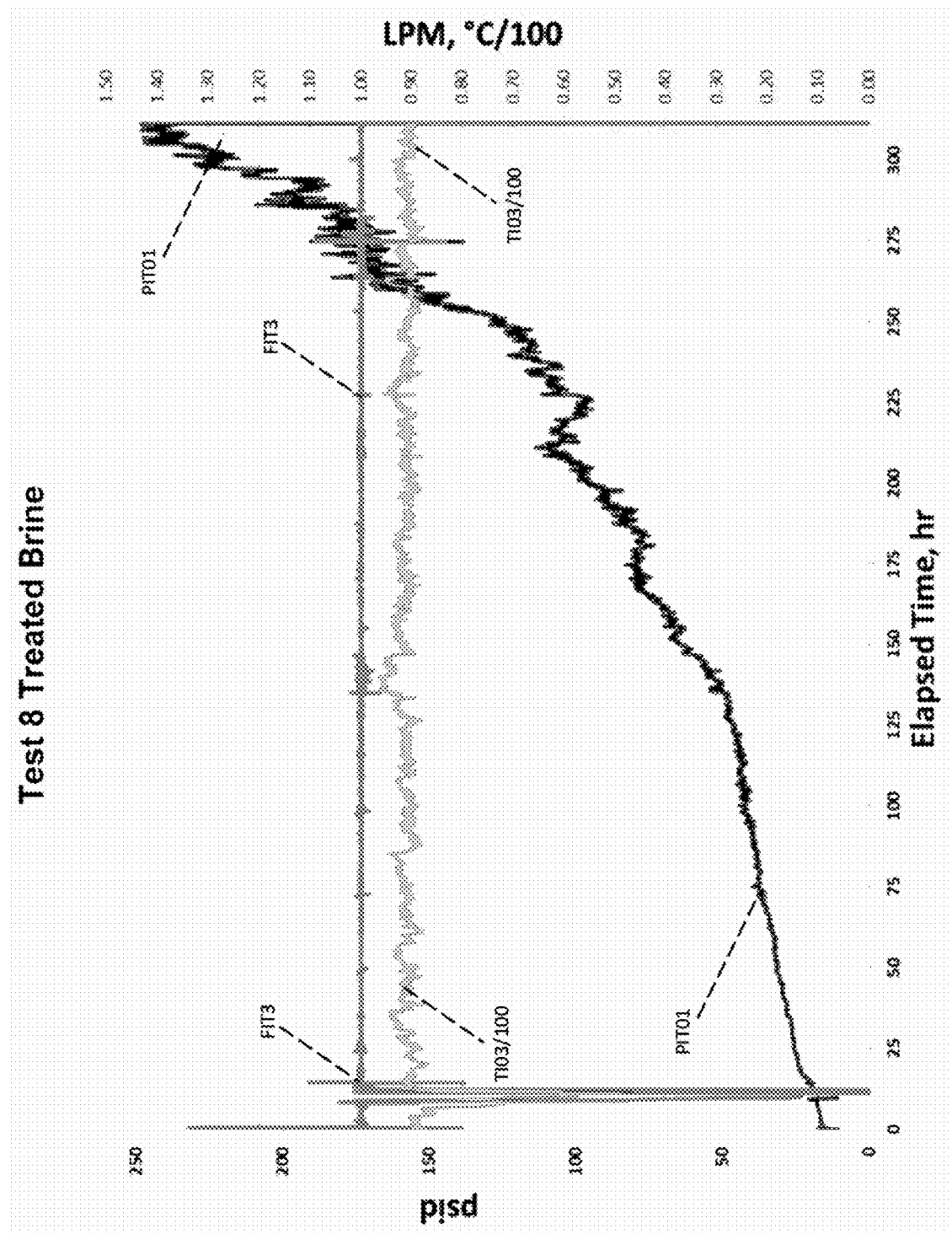
FIG. 26 is a graph showing the packed bed differential pressure versus time for a treated brine.

Comparing the differential pressure profiles from FIGS. 18, 19, and 20 against the differential pressure profiles from FIGS. 21, 22, and 23, the 50:50 brine blend run times were equal or better than the untreated brine, which shows that the blend is not likely to cause scaling problems as quickly as untreated brine. The longest run times were observed with the treated brine as shown in FIGS. 24, 25, and 26, which ran long enough that two of the runs were terminated at two weeks. The maximum potential run time for treated brine, Test 2, FIG. 24, is not known, but an extrapolation of the trend shows it may have been as long as 6 weeks. The long run time of the treated brine is likely due to the lack of iron and silica in the brine solution. Thus, injection of treated brine appears to give the best outcome for injectivity and long term well permeability.

As shown in Table 4, the differences between the treated and untreated brines were the almost total removal of Fe, Si, and As, the significant reduction in Li, Ba, $SO_4$, F, and Pb concentrations, and the increase in pH, oxygen concentration, and ORP in the treated brine relative to the untreated brine. Removal of Fe, Si, As, reduction in Pb concentration, increase in pH, oxygen, and ORP result from the silica management process. Removal/reduction of Li is due to the lithium extraction process. Reduction in Ba, $SO_4$, and F concentrations was due to $BaSO_4$ and $CaF_2$ precipitation during the silica management process. Since Fe and Si are major scaling components, the ultimate impact of the brine treatment process on brine chemistry will reduce the scaling potential of the depleted brine and improve injectivity.

TABLE 4

| Analyte | Treated brine relative to untreated brine |
|---|---|
| Temperature | −15-20° C. |
| pH | +0.8 units |
| ORP | +300 to 500 MV |
| Ca | −3% |
| Fe | −100% |
| Si | −97% |
| Li | −90% |

TABLE 4-continued

| Analyte | Treated brine relative to untreated brine |
|---|---|
| As | −100% |
| Pb | −30%-50% |
| Ba | −60% |
| $SO_4$ | −55% |

The chemistry of the brines were measured before and after residence time in the packed bed and blending in the HUV, to ensure that no major chemical reactions were taking place during the packed bed testing. A significant reaction would deplete the brine in one or more elements.

Figure 27:
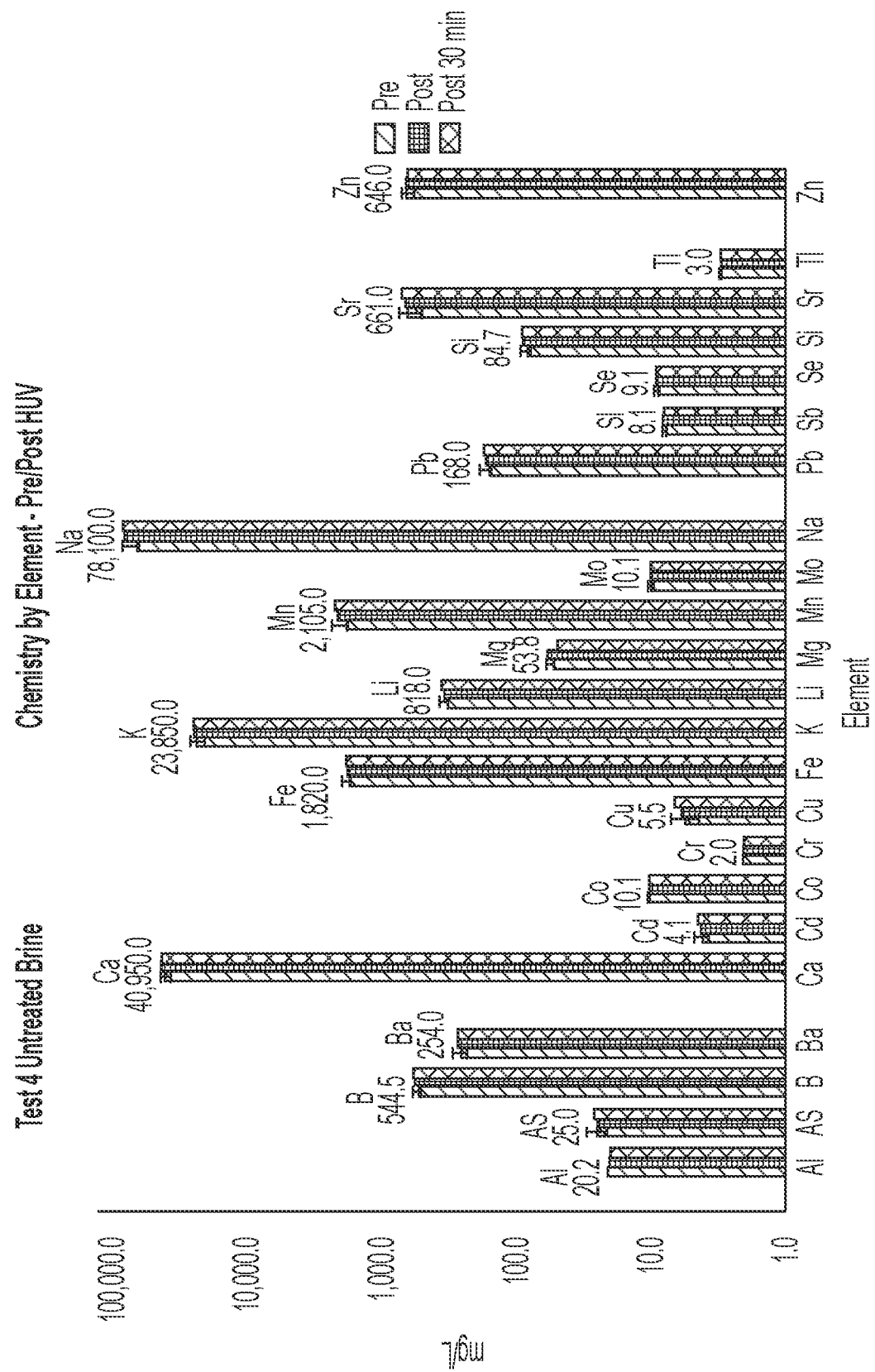
FIG. 27 shows the chemistry of an untreated brine before and after packed bed testing.

In FIGS. 25 through 29, the first column of each element shows the brine chemistry as it entered the HUV, the second column of each element shows the brine chemistry as it exited the HUV, and the third column shows the brine chemistry of a sample pulled 30 minutes from the post-HUV sample. The chemistry of Test 1 (untreated brine) was not measured, as it terminated sooner than expected, before chemical samples could be taken. However, Test 4 is a repeat of the same test and the results are shown in FIG. 27, and due to the consistency seen in the brines, it is believed that Test 1 would yield similar results.

Figure 28:
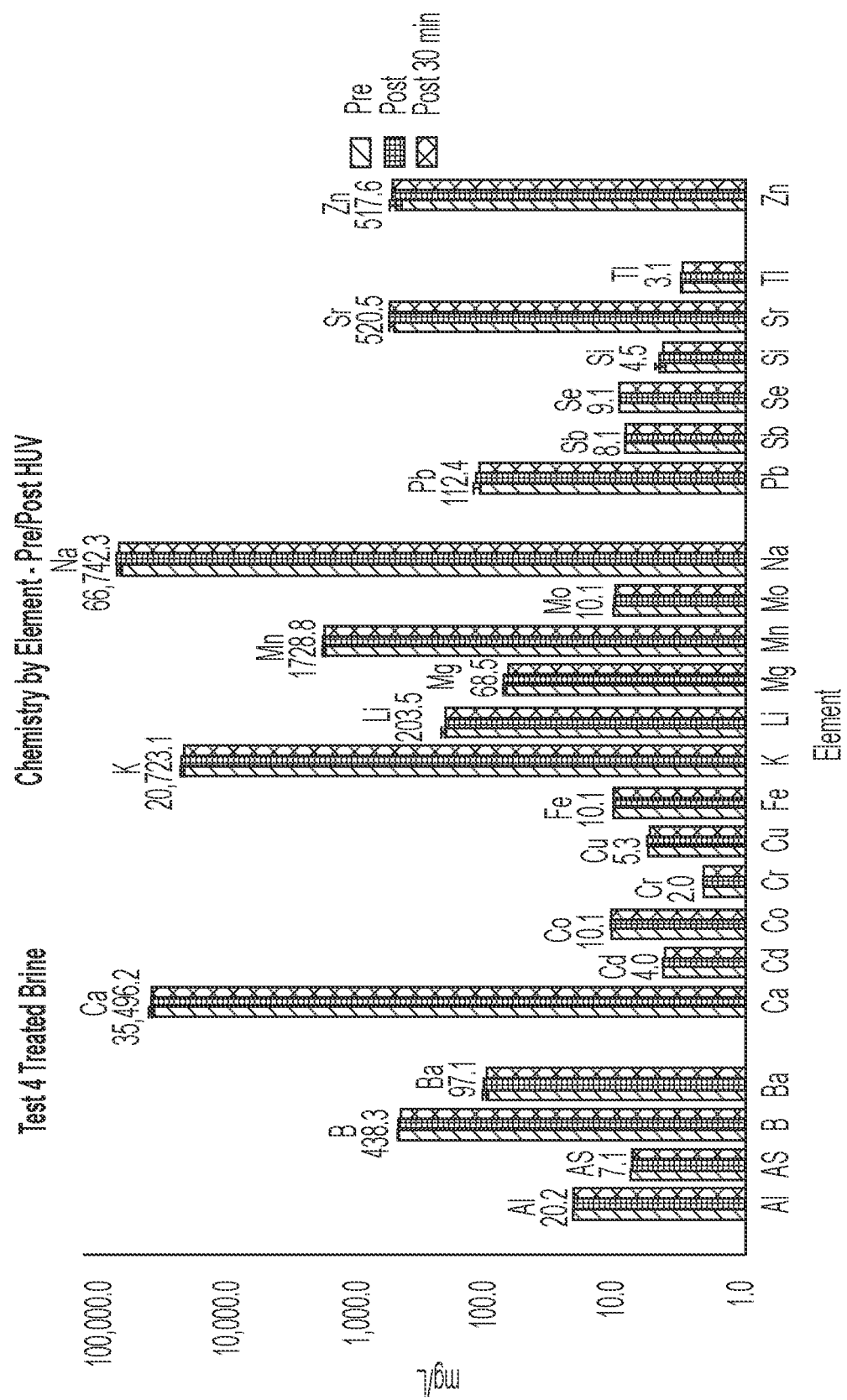
FIG. 28 shows the chemistry of a treated brine before and after packed bed testing.
Figure 29:
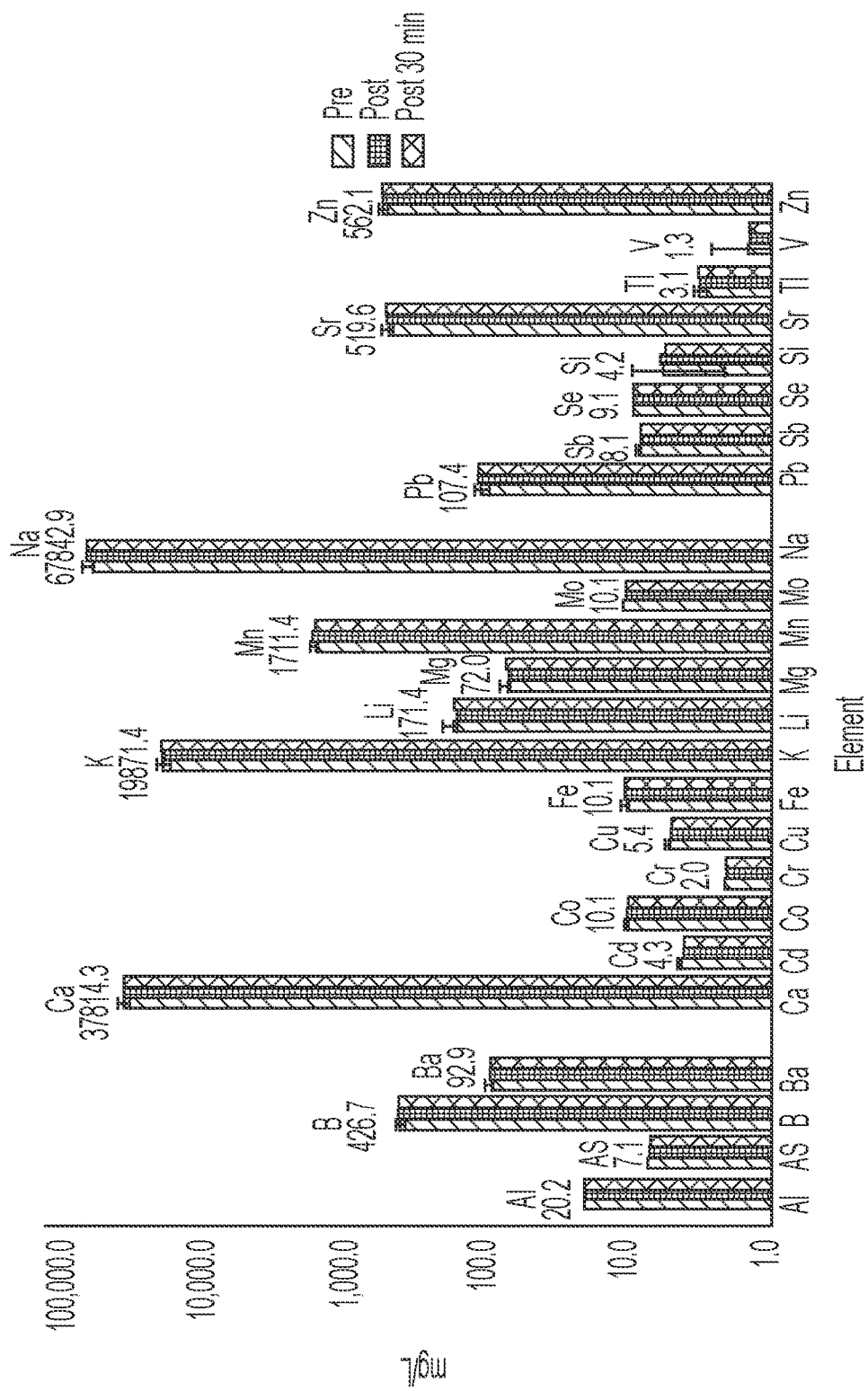
FIG. 29 shows the chemistry of a treated brine before and after packed bed testing.
Figure 30:
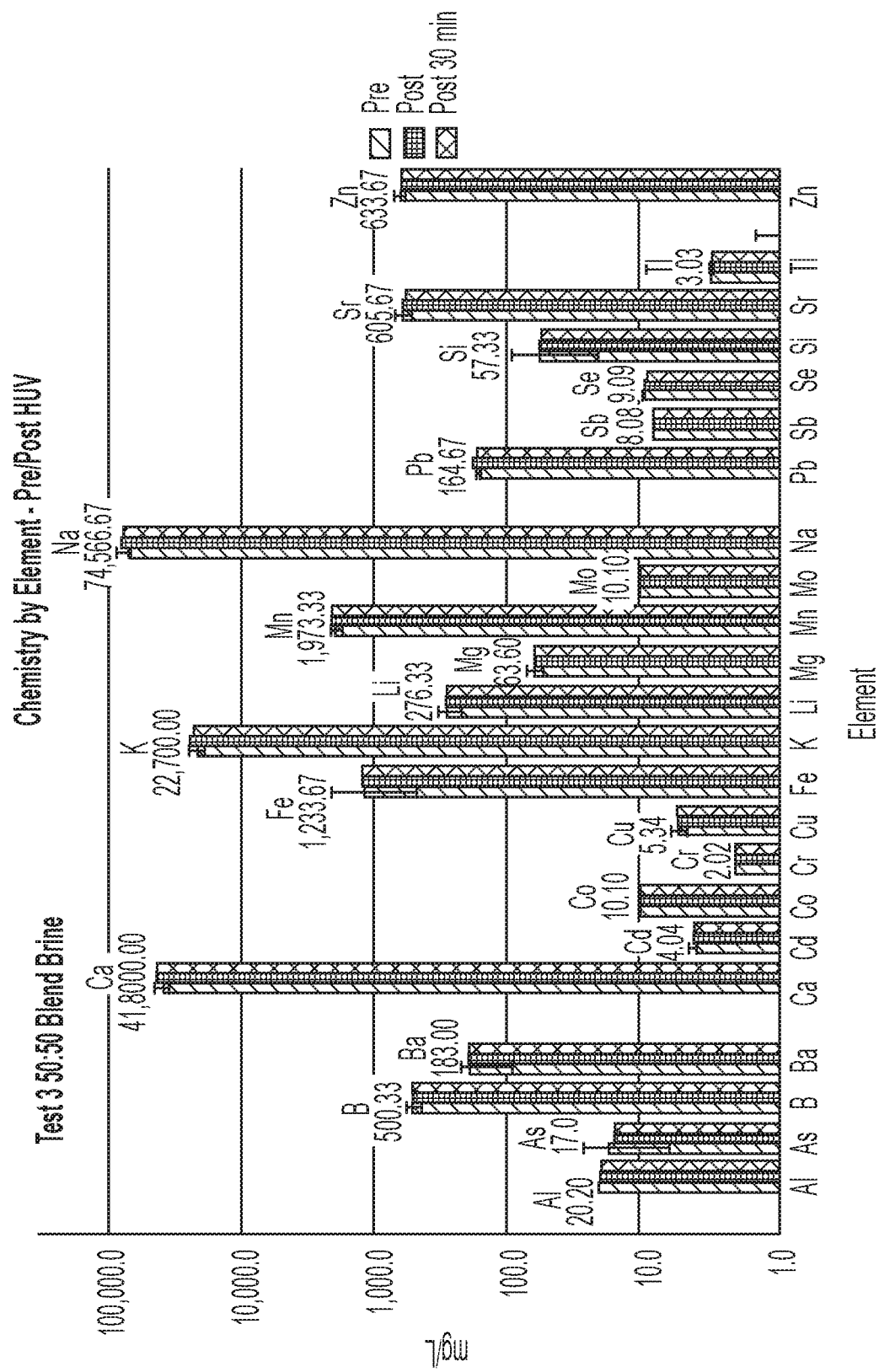
FIG. 30 shows the chemistry of a 50:50 blend brine before and after packed bed testing.
Figure 31:
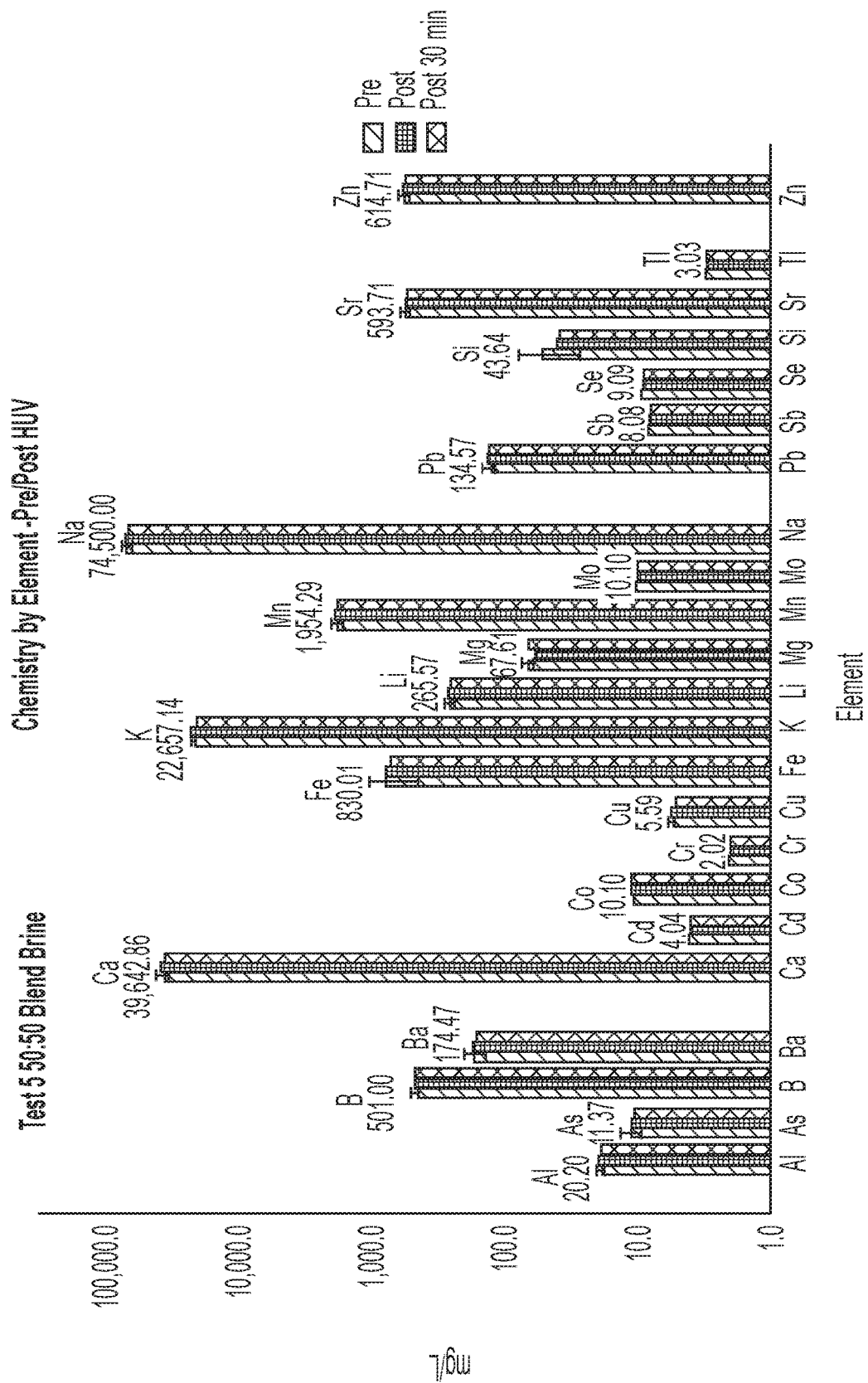
FIG. 31 shows the chemistry of a 50:50 blend brine before and after packed bed testing.

As shown in FIGS. 28 and 29 for treated brines and in FIGS. 30 and 31 for 50:50 blend brines, it was observed in almost every case that any change in the pre- and post-HUV levels was small, and within the normal sample variation. The implication of this result is that the chemistry of the brine is stable during testing, and that there are no major chemical reactions for precipitation reactions that effect brine chemistry in the packed bed. Even in the 50:50 blend brine (FIGS. 30 and 31), there were no significant differences before and after the HUV. The 50:50 blend brine does show more variability, likely due to a small amount of Fe oxidation that also precipitates Si. Typical pH of the tested brines are shown in Table 5.

TABLE 5

| | Untreated Brine | Treated Brine | 50:50 Blend |
|---|---|---|---|
| Average pH | 4.61 | 5.67 | 5.20 |
| Std. Dev. | 0.23 | 0.27 | 0.09 |
| Samples | 20 | 34 | 9 |

To evaluate the scale, cut sections of the packed beds from Tests 1 through 5 were submitted for petrologic (mineralogical) evaluation of solids precipitated or trapped during packed bed testing. Scanning electron microscopy and X-ray diffraction analyses were conducted to characterize the chemical deposits and suspended solids that were trapped in the rock matrix. A sample of the unexposed matrix material was also provided in order to compare the fine solids with the original rock material.

Detailed SEM analyses of the scale and fine particles from the five tests show a variety of textures and particle morphologies. Associated spot elemental analyses reveal the composition of each type of fine material. The dominant type of fine material consisted of dark green-colored, amorphous iron silicate with subtle variations based on texture and elemental composition. FIGS. 32 through 37 show low and high magnification SEM images of each brine type.

Figure 32:
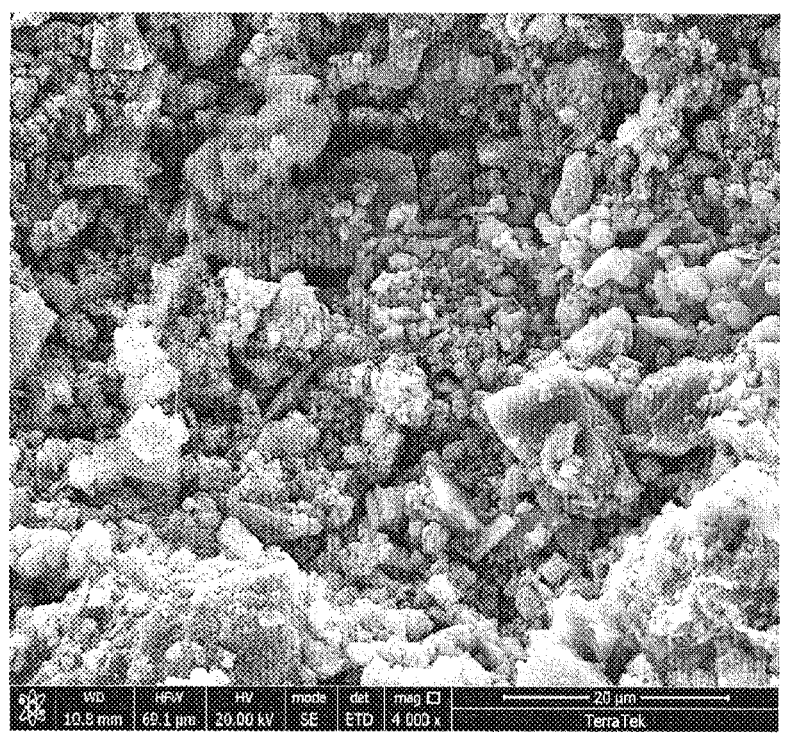
FIG. 32 shows a SEM image from a packed bed test of untreated brine.
Figure 33:
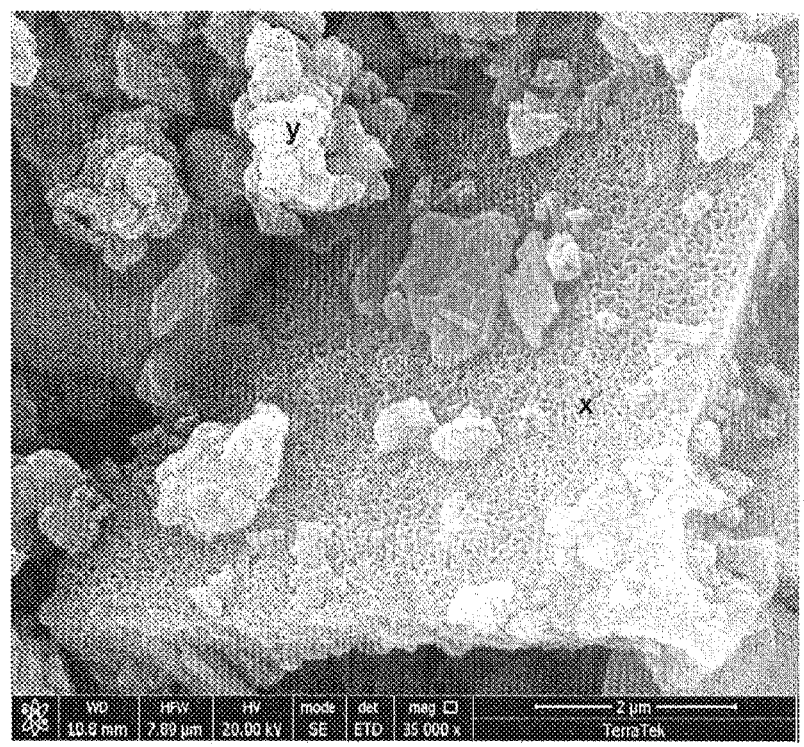
FIG. 33 shows a SEM image from a packed bed test of untreated brine.

FIGS. 32 and 33 show low and high magnification SEM images from the testing of untreated brines. The untreated brine used in Tests 1 and 4, showed smooth, botryoidal (globular textured) particles composed of relatively pure iron silicate. More crumbly, rough-textured, or fuzzy aggregates were composed of iron silicate with minor calcium and aluminum. In places, more flaky or webby-textured surfaces were composed of iron silicate with potassium, aluminum, and calcium. This material could possibly represent a smectite-like clay.

Figure 34:
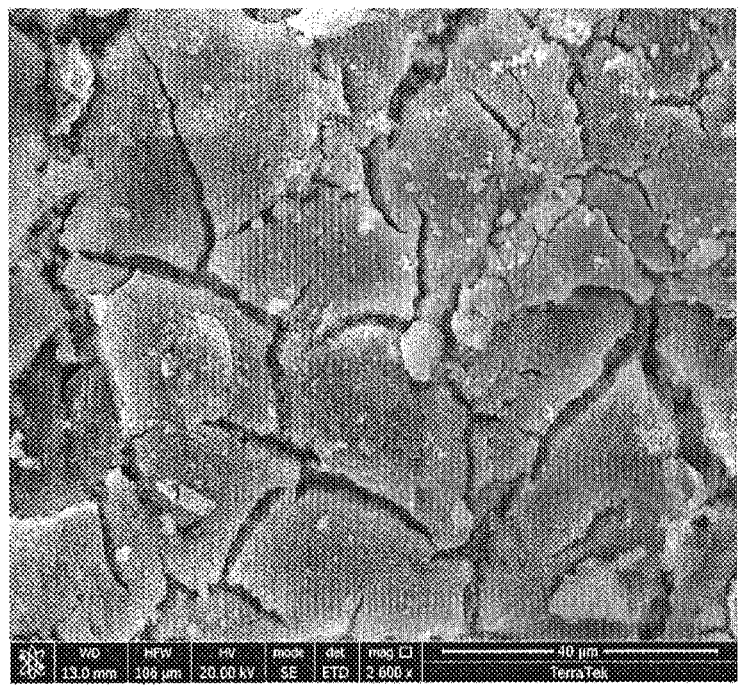
FIG. 34 shows a SEM image from a packed bed test of treated brine.
Figure 35:
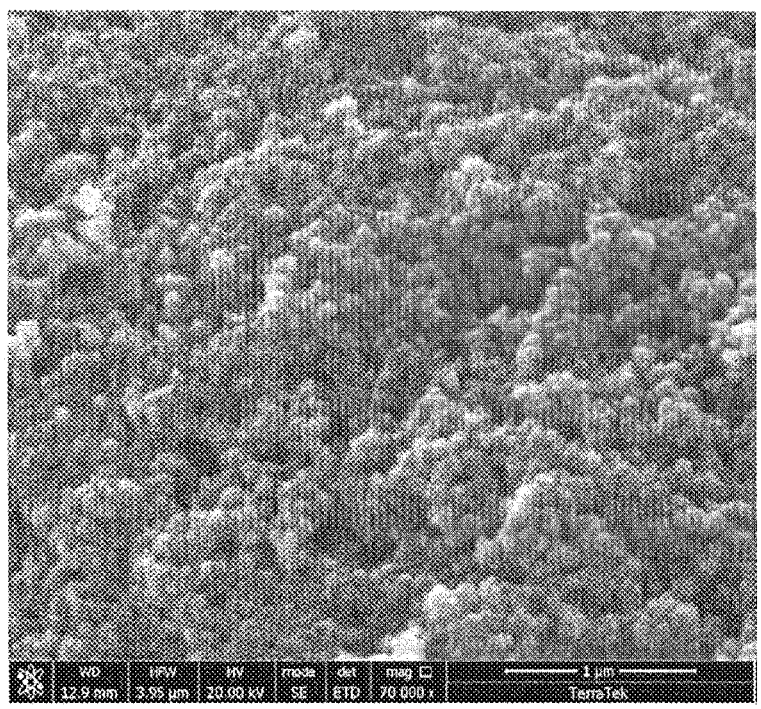
FIG. 35 shows a SEM image from a packed bed test of treated brine.

FIGS. 34 and 35 show low and high magnification SEM images from the testing of treated brines. The treated brine used in Test 2 formed a fine, cracked crust composed of dehydrated iron oxyhydroxide with manganese, chromium, and minor silica. In places, trace amounts of nickel and zinc were also present in the Fe—Mn oxyhydroxide. The Fe—Mn oxyhydroxide formed a thin brown coating on the drill cuttings.

Figure 36:
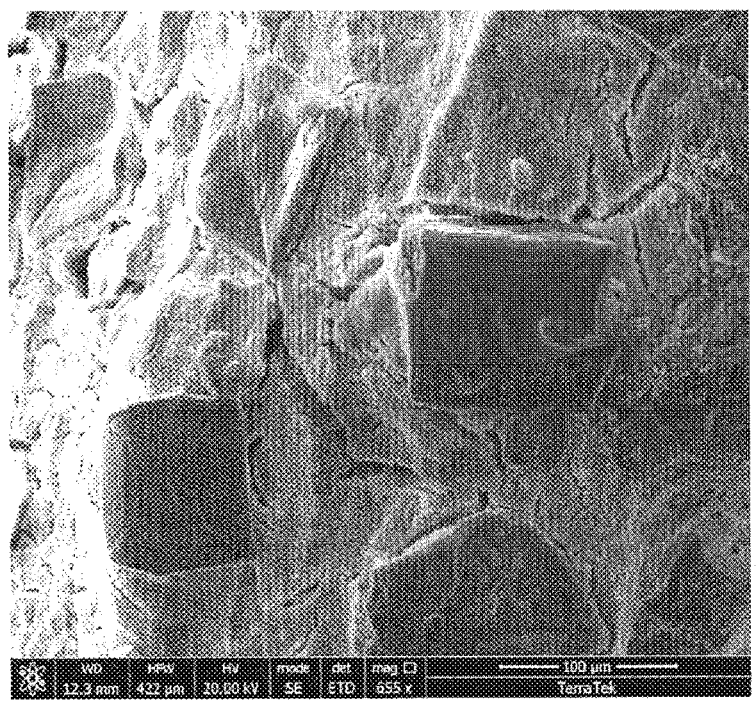
FIG. 36 shows a SEM image from a packed bed test of a 50:50 blend brine.
Figure 37:
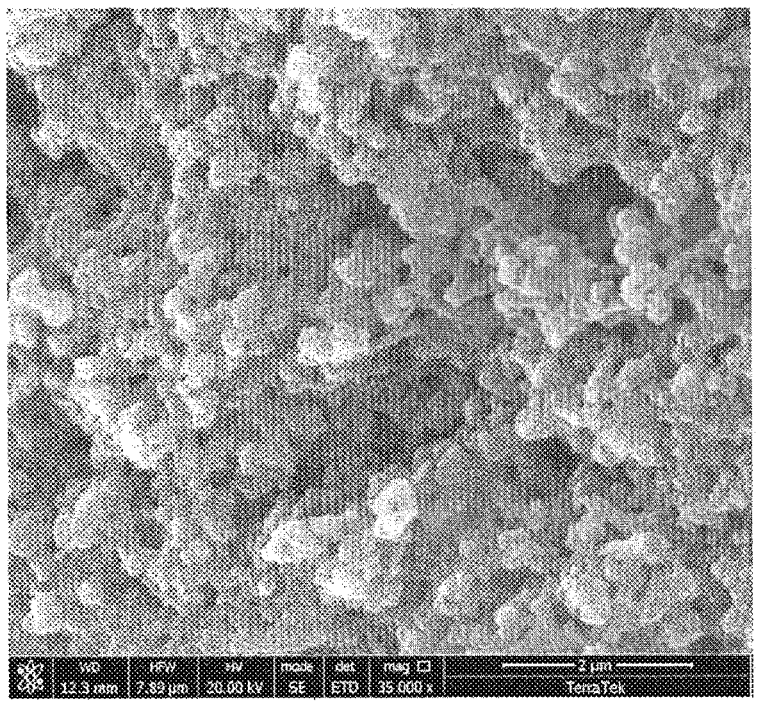
FIG. 37 shows a SEM image from a packed bed test of a 50:50 blend brine.

FIGS. 36 and 37 show low and high magnification SEM images from the testing of 50:50 blend brines. The 50:50 blend brine used in Tests 3 and 5 formed Fe and NaCl deposits in a fine solid form. These were submicron-sized crumbly deposits. The iron chloride had a consistent composition with minor calcium and potassium. Spot analyses also consistently showed minor silica with the iron chloride and it was difficult to determine whether this was one compound (such as eltyubyuite) or an iron-calcium-potassium chloride admixed with opaline silica. XRD analyses indicated minor amounts of opal-A in these two samples. Based on how the chloride crystals in the sample were intermixed with the other scale material, it was possible that the chlorides had precipitated out of solutions during mixing and reaction. This was likely due to the lower temperature of the treated brine when it mixes with the untreated brine. In a real injectivity situation, the temperatures of injectivity will be higher, and this will keep the chlorides in solution.

A material of interest from the packed bed tests was the small scale particles and chemical deposits attached to the rock chip matrix. If the total rock sample was used, the rock matrix would dilute the scale minerals in the sample, rendering them too dilute to be identifiable in the XRD scans. Therefore, the small-scale particles were washed from the matrix rock and concentrated to more accurately measure the mineralogy and composition of the scale.

A summary of the separated packed bed tube scale is shown in Table 6. Other than halite (NaCl) precipitated in the 50:50 blend in Tests 3 and 5, all of the major crystalline material in the XRD patterns was attributed to minerals from the rock fragments in the drill cuttings. Other than trace to minor amounts of crystalline iron oxides (magnetite, maghemite) and iron oxyhydroxides (goethite, akaganeite), most of the chemical deposits appeared to be amorphous or too poorly crystalline to diffract the X-rays.

TABLE 6

XRD Mineralogy Relative Wt %

| SAMPLE ID | Salton Sea Drill Cuttings | Test #1 | Test #2 | Test #3 | Test #4 | Test #5 |
|---|---|---|---|---|---|---|
| Quartz | 63 | 31 | 41 | 0 | 7 | 17 |
| Plagioclase | 15 | 14 | 11 | 1 | 0 | 8 |
| K-Feldspar | 5 | 5 | 8 | 2 | 1 | 3 |
| Calcite | 2 | 2 | 0 | 0 | 0 | 1 |
| Dolomite | 1 | 0 | 0 | 0 | 0 | 0 |
| Ankerite | 1 | 0 | 0 | 0 | 0 | 0 |
| Epidote | 5 | 11 | 7 | 30 | 2 | 6 |
| Barite | 0 | 0 | 1 | 0 | 0 | 0 |
| Pyrite | 0 | 0 | 0 | 0 | 0 | 0 |
| Magnetite | 0 | 1 | 6 | 1 | 4 | 2 |

TABLE 6-continued

XRD Mineralogy Relative Wt %

| SAMPLE ID | Salton Sea Drill Cuttings | Test #1 | Test #2 | Test #3 | Test #4 | Test #5 |
|---|---|---|---|---|---|---|
| Maghemite | 0 | 2 | 0 | 0 | 3 | 1 |
| Geothite | 0 | 0 | 0 | 0 | 3 | 0 |
| Akaganeite | 0 | 0 | 1 | 0 | 0 | 3 |
| Halite | 0 | 0 | 0 | 38 | 0 | 14 |
| Total (Non-Clay) | 91 | 66 | 74 | 71 | 20 | 55 |
| Illite + Mica | 0 | 0 | 4 | 9 | 12 | 11 |
| Mixed-Layer Illite-Smectite | 0 | 0 | 0 | 0 | 0 | 0 |
| Chlorite | 8 | 11 | 22 | 1 | 4 | 18 |
| Total (Clay) | 9 | 11 | 27 | 10 | 16 | 29 |
| Total (Crystalline Material) | 100 | 76 | 100 | 81 | 36 | 84 |
| Amorphous (Opal-A) | 0 | 24 | 0 | 19 | 64 | 16 |
| GRAND TOTAL (Crystalline and Opal-A) | 100 | 100 | 100 | 100 | 100 | 100 |

A summary of the clay fines from the packed tube scale is shown in Table 7. The dominant clay material was fine mica, which was likely a component of the drill cuttings matrix.

TABLE 7

Clay XRD Mineralogy (<4 micron size fraction, Relative Wt %)

| SAMPLE ID | Rock chips | Test #1 | Test #2 | Test #3 | Test #4 | Test #5 |
|---|---|---|---|---|---|---|
| % Expandability of I/S clay (smectite interlayers) | 25 | 0 | 35 | 10 | 0 | 0 |
| Mica | 26 | 67 | 31 | 35 | 71 | 44 |
| Mixed-Layer Illite-Smectite (I/S) | 13 | 0 | 23 | 39 | 0 | 0 |
| Kaolinite | 0 | 0 | 0 | 0 | 0 | 1 |
| Chlorite | 61 | 33 | 46 | 26 | 29 | 38 |
| TOTAL | 100 | 100 | 100 | 100 | 100 | 100 |

TSS is also an important parameter of the brine compatibility testing. The treated brine had lower TSS values than the untreated brine, and even the 50:50 blend brines had less than or equal TSS to the untreated brine.

Figure 38:
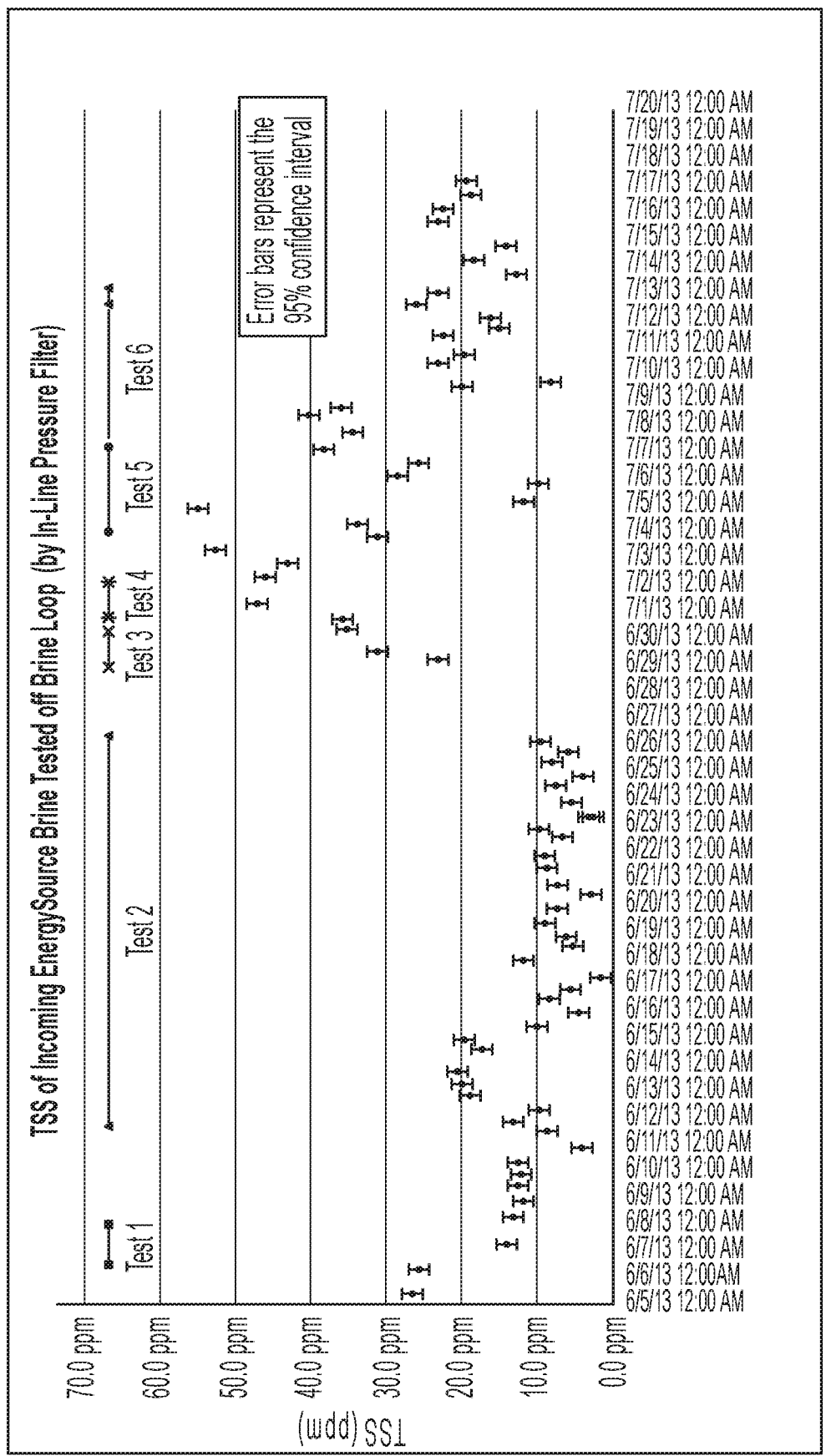
FIG. 38 shows TSS by in-line pressure filter of untreated, treated, and 50:50 blend brines.

The TSS of the untreated brine was measured using an accurate in-line method throughout the series for tests. Those values are shown in FIG. 38. The data showed that the TSS of the untreated brine average was about 20 ppm, but it was variable, and sometimes reached 50 ppm.

Figure 39:
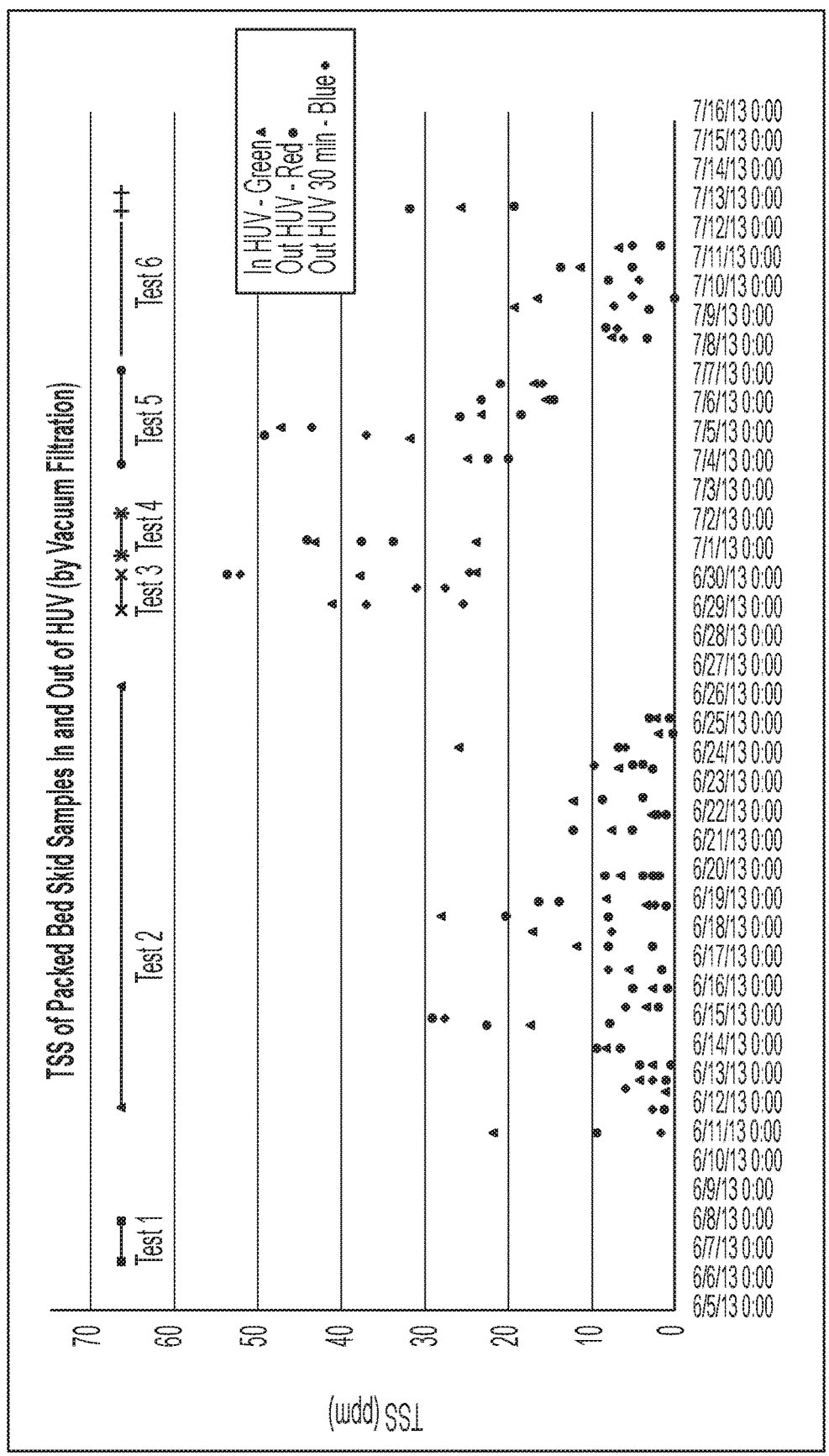
FIG. 39 shows TSS by vacuum filtration of untreated, treated, and 50:50 blend brines.

The TSS were also measured on the brines used for packed bed testing, before and after the HUV using a vacuum filtration method. The values are shown in FIG. 39. As expected, the treated brines possessed a low TSS due to the lack of scaling components and filtration during processing. The untreated brine and the 50:50 blend brine showed higher TSS, at a similar range of values.

Figure 40:
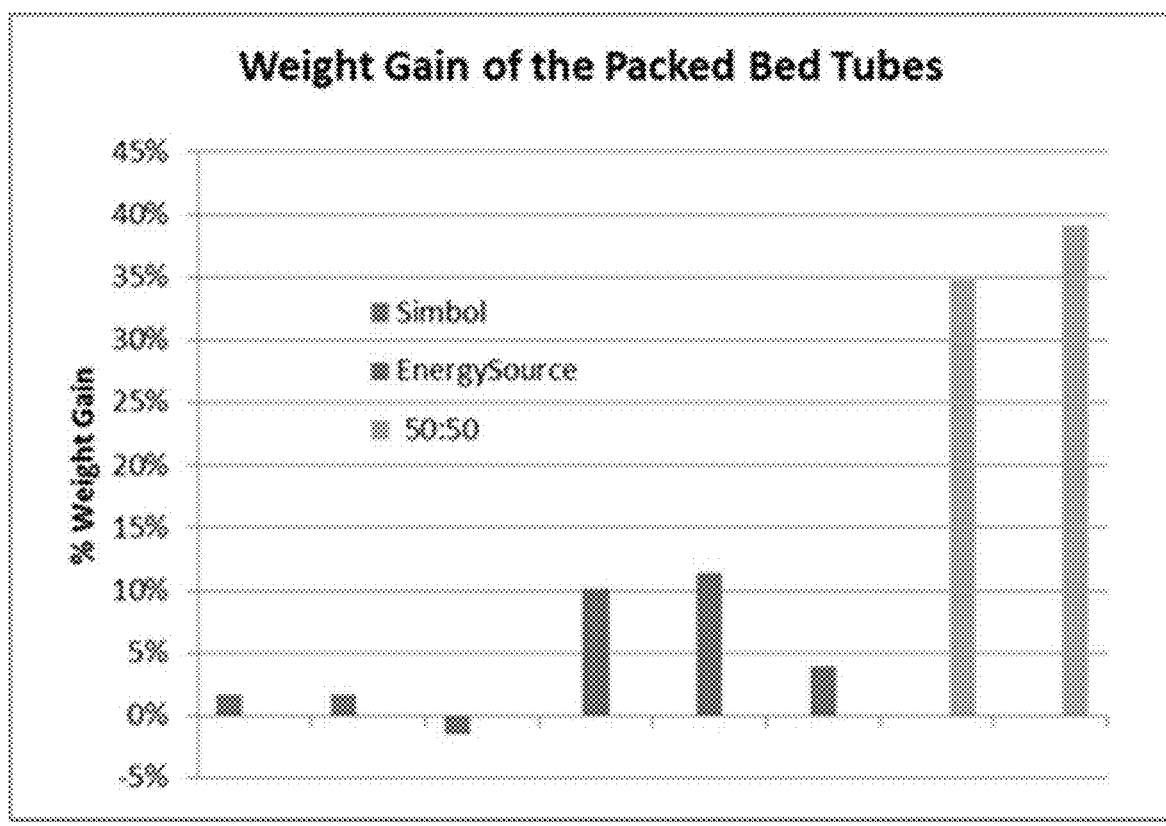
FIG. 40 shows the weight gain of packed bed tubes after the processing of untreated, treated, and 50:50 blend brines.
Figure 41:
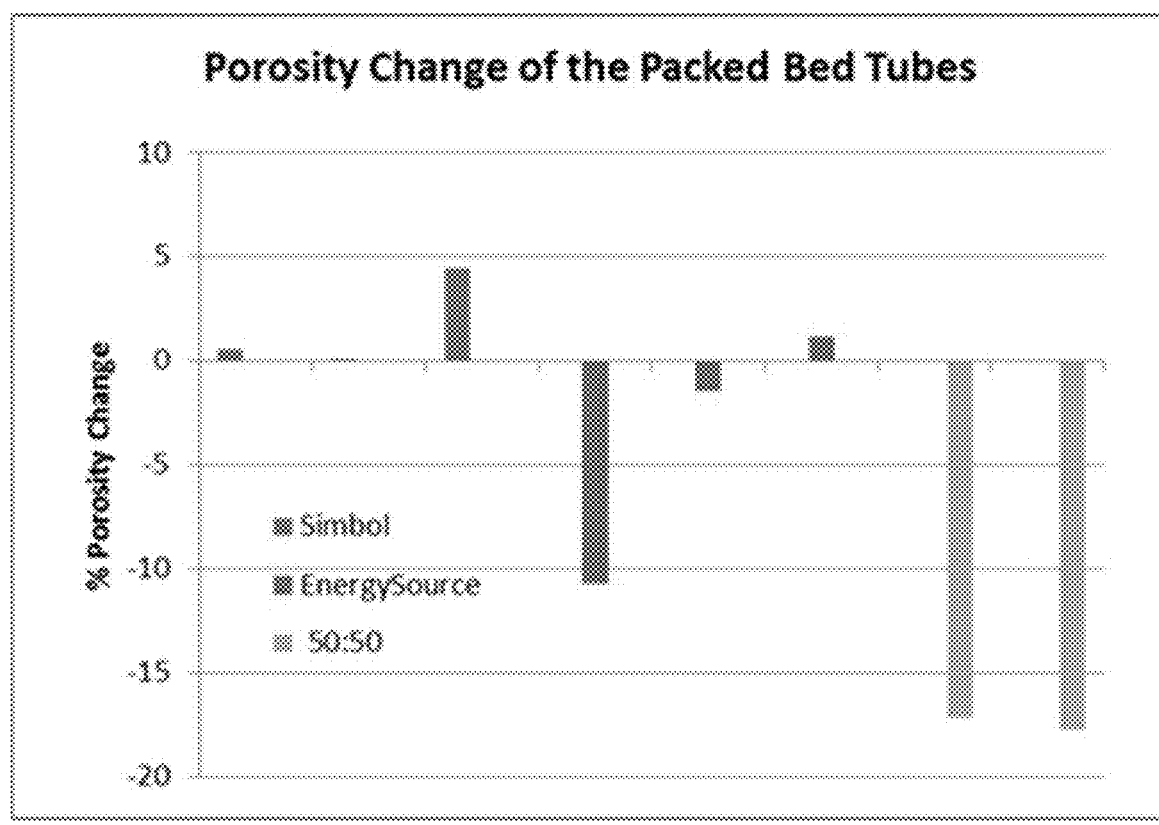
FIG. 41 shows the porosity change of packed bed tubes after the processing of untreated, treated, and 50:50 blend brines.

Shown in FIGS. 40 and 41 are the results of the treated brine (Tests 2, 6, and 8), untreated brine (Tests 1, 4, and 7), and 50:50 brine blends (Tests 3 and 5) analysis for percent weight gain and residual bulk porosity.

The 50:50 blend brines performed equal to or better than the untreated brine in packed bed simulated well testing.

This suggests that there are no major compatibility or reaction issues, and that reservoir permeability would not be any worse than the untreated brine.

In addition, treated brine performed far better on the packed bed permeability testing than any other brine or brine blend tested. This is likely due to the lack of scaling compounds in the treated brine, along with a lower TSS value. The results suggest that an injection fluid of 100% treated brine will have the best injectivity and permeability performance than any other brine tested.

One improvement that can be made to the 50:50 blend brine, that may make it perform even better, is to provide dilution water or maintain high temperature to prevent halite (NaCl) from coming out of solution before injection.

Example 7. Preparation of Treated Geothermal Brine Compositions with Reduced Concentrations of Iron and Silica In another example, four 20 L plastic pails of geothermal brine from the Salton Sea, California that were subjected to silica processing, were transferred to the reactor. The combined sample was agitated at 80° C. for 4 hours and then samples were collected for an elemental analysis. Table 8 shows concentrations of various elements in samples of geothermal brine samples.

TABLE 8

| Element analyzed | Concentration in Sample 1 mg/L | Concentration in Sample 2 mg/L |
| --- | --- | --- |
| Arsenic | <3 | <3 |
| Barium | 42 | 44 |
| Iron | 1900 | 1900 |
| Lithium | 310 | 309 |
| Lead | 130 | 130 |
| Silicon | 30 | 30 |

Figure 42:
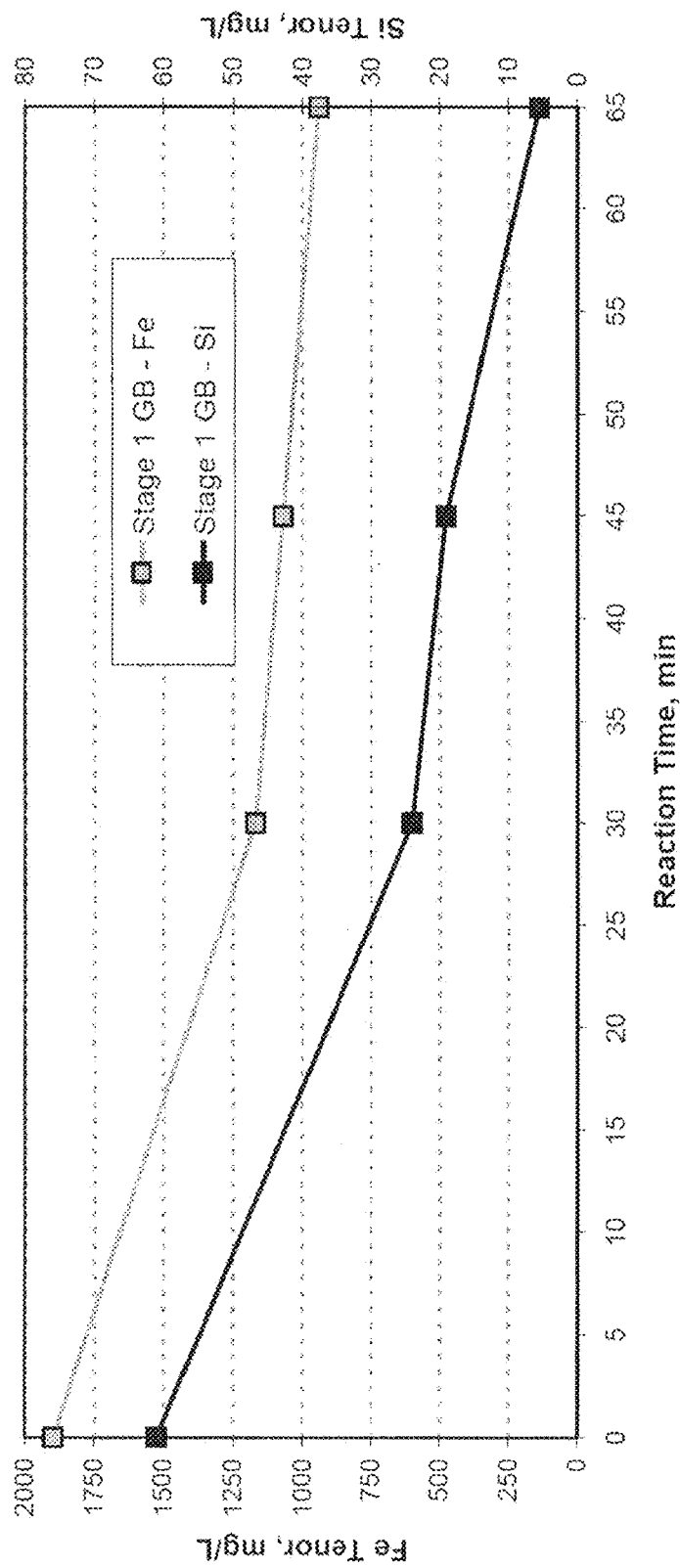
FIG. 42 shows the concentration of iron and silica in an exemplary treated brine composition as a function of time during the silica management process.

A laboratory scale stage 1 precipitation was conducted on a sample of the adjusted geothermal brine. The brine was sparged with air for 20 minutes, and then approximately 70% of the required lime was added to the reaction solution. The balance of the lime was added over the next 20 minute period. The reaction was conducted for a total time of 150 minutes. During the reaction period kinetic samples were collected at set reaction times. At the end of the reaction period the slurry was processed in the standard manner. The Oxidation Reduction Potential of the solution after 20 minutes of air sparging was 200 mV. The solution pH value was 3.0. The solution concentrations for iron and silica were plotted against elapsed reaction time in FIG. 42. Approximately 98% of the silica precipitated and the final silica concentration was reduced to 6 mg/L after 65 minutes. The iron was removed by about 65% of the Fe precipitated and the final Fe solution concentration was 940 mg/L.

Figure 43:
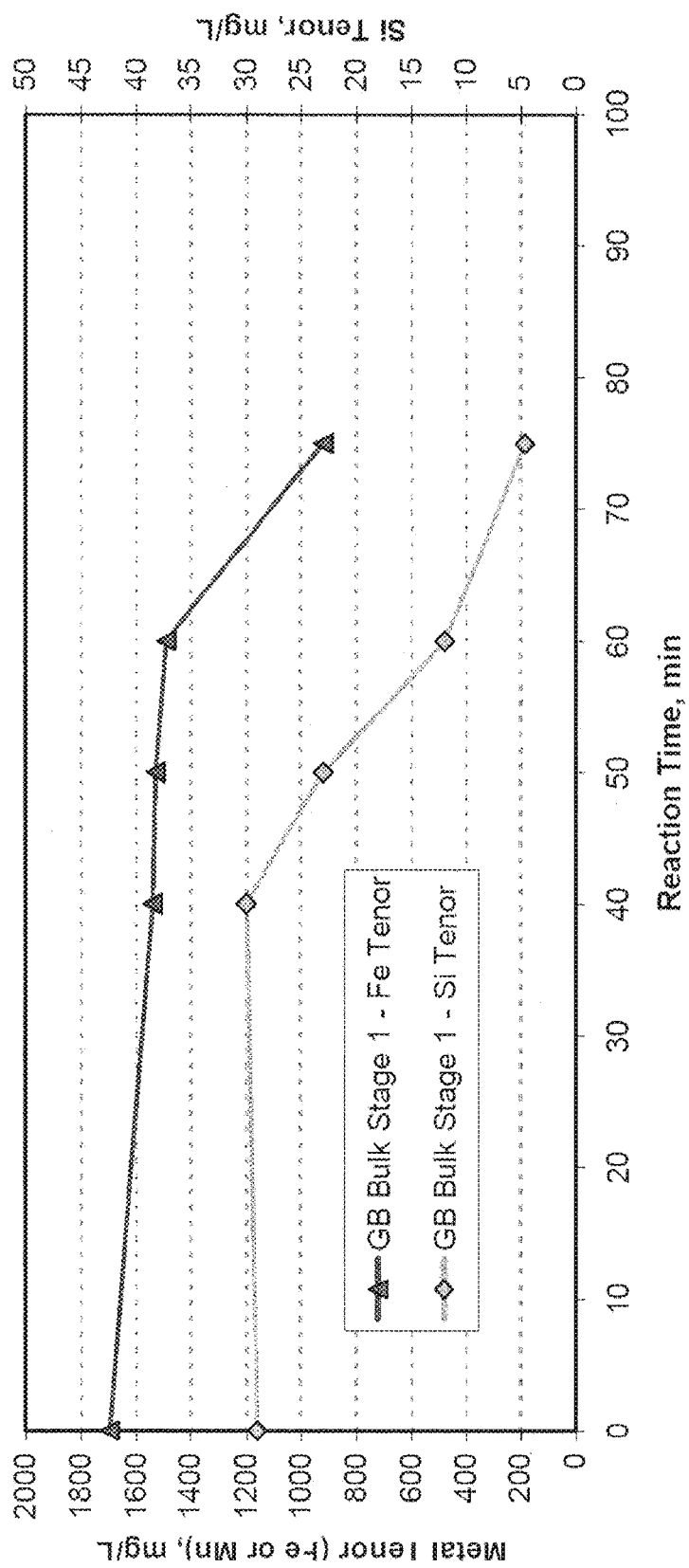
FIG. 43 shows the concentration of iron and silica in an exemplary treated brine composition as a function of time during the silica management process.

Example 8. Preparation of Larger Scale Treated Geothermal Brine Compositions with Reduced Concentrations of Iron and Silica In another example, about 69 liters of adjusted geothermal brine was subjected to processing on a larger scale. An insulated double walled polypropylene reactor (~80 L) was equipped with a polycarbonate lid that had multiple access ports for the various pieces of equipment and instrumentation. The overall reaction as observed at about 81° C., following initial sparging time of 40 minutes with an airflow of 2.25 L/min. About 84 g of dry lime was added. The Si and Fe solution concentrations are plotted against reaction time in FIG. 43. Some of the initial and final test conditions for the bulk test are summarized in Table 9.

TABLE 9

| Condition | Initial Reading | Final Reading |
| --- | --- | --- |
| pH | 4.43 | 5.33 |
| ORP, mV | −14 | −293 |

Figure 44:
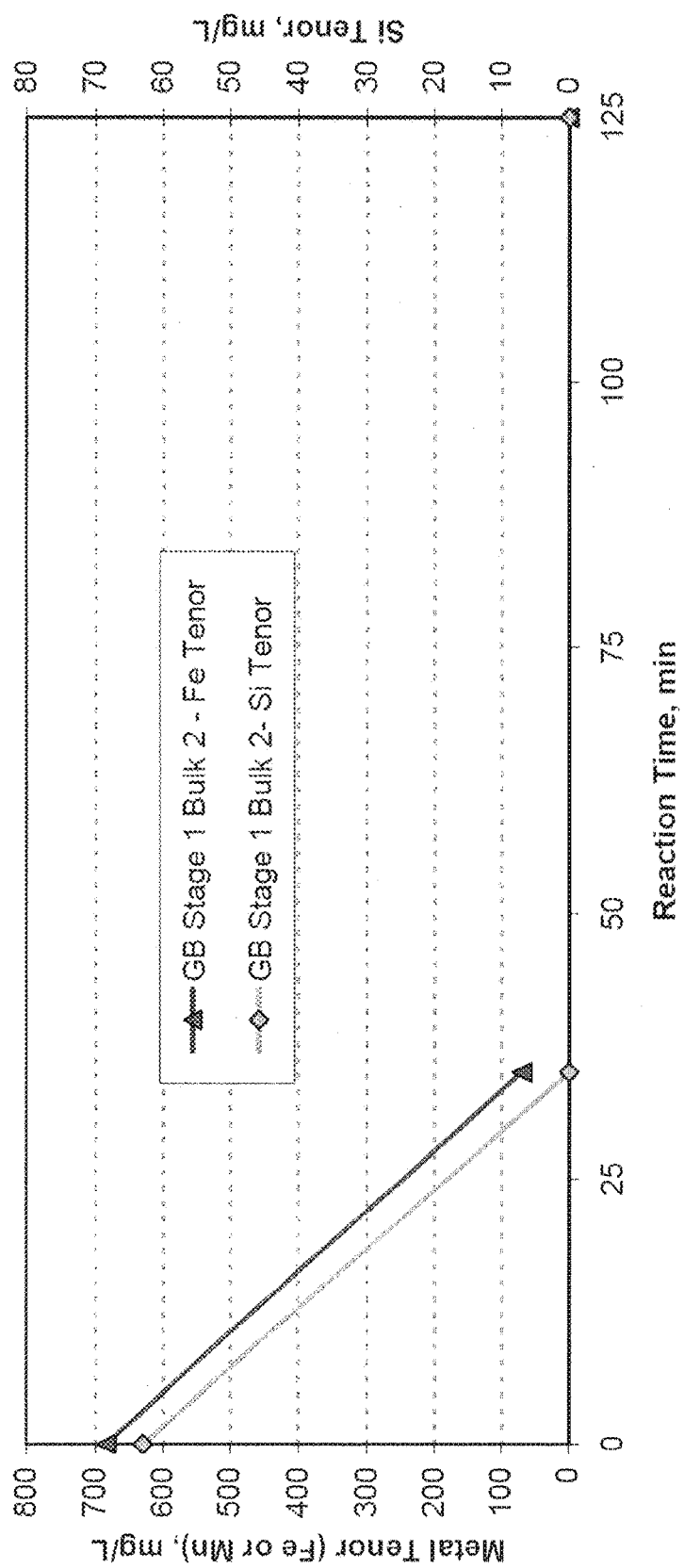
FIG. 44 shows the concentration of iron and silica in an exemplary treated brine composition as a function of time during the silica management process.

Analysis of the data from this experiment revealed that there was insufficient mixing of the solution that resulted in poor suspensions of the initial contained solids. As the reaction progressed, the majority of these solids dissolved and released iron and silica to solution. The silica concentration was reduced to below 10 mg/L and iron was removed to about 900 mg/L. Changes in the air sparging period or changes in the air flow to the system were made to increase the iron removal. The filtrate from the reactor was subjected to further processing at a temperature of about 95*C. Air was sparged into the system for about 20 minutes and then lime was added and the pH constantly monitored. Air sparging continued. The iron concentration at pH 6.0 was below 50 mg/L and therefore the reaction was stopped and the reaction slurry was processed. The Si and Fe solution concentrations were plotted against reaction time in FIG. 44. These experiments revealed that by changing the conditions of the treatment, one could achieve the desired levels of iron and silica removal from the geothermal brine.

Example 9. Preparation of Treated Geothermal Brine Compositions with Reduced Concentrations of Iron and Silica from Brine Treatment at a Physical Plant Producing treated brines with reduced silica and iron concentration minimizes the problems downstream during extraction of minerals like zinc and lithium from the treated brine. As discussed herein, the resulting brines with reduced silica and iron concentration is much less likely to damage the injection wells, because all major scale-producing elements have been removed.

The methods and systems described herein were deployed for silica management of geothermal brine at two different physical plants. One physical plant included three rectangular continuously stirred tank reactors for iron (II) oxidation and iron (III)-oxyhydroxide precipitation, and an inclined plate (lamella) clarifier for initial solid/liquid separation. Another physical plant included two cylindrical continuously stirred tank reactors and a cylindrical conventional rake-style clarifier. The second plant also implemented an improved air-sparging/agitation system for more efficient iron (II) oxidation. Because of the decrease in number of reactors, and the increased sparging efficiency, the total residence time in the reactor train could be reduced by a factor of 3. The switch to a conventional clarifier was made in part to minimize manual operations related to cleaning the clarifier lamella of sticky solids, and partly to provide data for a clarifier design that was suitable for scale up to commercial size.

Operations using the three reactor physical plant included feeding brine from a geothermal energy producer at a specified rate between 3-6 gpm. Operational set points (pH, sparge rate, agitation) for the three reactors were adjusted following the experimental observation from pilot studies.

Flocculant was added initially to the clarifier based on batch flocculation tests, and adjusted as necessary to gain control of TSS in overflow. The proportion of underflow directed to recycle, and the recycle return point(s) were set as desired for the specific pilot campaign. Underflow advance was directed to the filter feed tank (or thickener), and then to pressure filter. Filtrate and thickener overflow were generally recycled back to the first reactor. Filter cake was periodically removed from the pressure filter and directed to waste.

Operations using the two-reactor physical plant were essentially similar. Table 10 shows a comparison of the sample operating conditions at the two plants.

TABLE 10

| Plant | Residence time at nominal 5 gph, min | Feed/inlet/outlet | Agitation | Sparging | Clarifier | Recycle |
|---|---|---|---|---|---|---|
| 3-reactor plant | 120 | Inlet feed was pump controlled; advance flow via gravity. Horizontal input near tank bottom below agitator blade. Horizontal output near tank top. | Variable speed; single impeller | Sparging via perforated square U-tube at bottom of tank | Inclined plate with integral flash tank and floc chambers | Recycle underflow to R-1 and R-2 |
| 2-reactor plant | 40 or 20 depending on position of outflow | Inlet feed is pump controlled; advance flow via gravity. Vertical input at tank bottom; mixed with sparge air. Two side outlet ports; upper yielded 40 minute residence time; lower yielded 20 minute residence time at 5 gpm. | Variable speed; dual impeller; lower was 8" Rushton blade; upper was 8" pitched blade | Sparging via air injection into brine feeds at tank bottom | Cylindrical with rake and separate floc mixing tank | Recycle underflow to R-1 only |

Previous studies indicate that at ~110° C. the concentration of dissolved silica in Salton Sea geothermal brine coming out of a crystallizer clarifier is ~116 ppm. The feed brine composition varied depending on variations in the geothermal brine and in the operations of the geothermal energy producer. For example without limitations, the variations could arise from changes in dilution water added to the brine, or from operations related to their flashing and subsequent processing.

In an exemplary set-up, similar to that shown in FIG. 6, geothermal brine was subjected to a continuous process for the management of silica. Silica management system 1106 was carried out using two stirred vessels 1108 and 1110 provided in series. To first reactor 1108 a geothermal brine was supplied via line 1104 having an iron content of approximately 1500 ppm and a silica content of about 160 ppm. The brine is added at a rate of about 6 gpm. Approximately 30 cfm of air was supplied via line 1140 to each reactors 1108 and 1110, and was sparged through the geothermal brine. The operating temperature was approximately about 90-95° C. in Reactor 1 and 85-90° C. in Reactor 2.

After the addition of the air via line 1140' to first reactor 1108, the pH dropped and was around approximately about pH 4.8 to 5.4. Air was added to second reactor 1110 via line 1140" at a rate of about 30 cfm and a charge of approximately 10-25% by weight of an aqueous calcium oxide slurry at a rate of about 0.5 lb/min., which raised the pH in the second reactor to between about 5.0 and 5.6. The addition of the lime slurry initiated the precipitation of iron (II) hydroxide and iron silicate. The geothermal brine, which included precipitates of iron (II) hydroxide or iron oxyhydroxide and iron silicate, was then supplied from the second vessel 1110 to clarifier 1146 via line 1144. An aqueous flocculant solution of Magnafloc 351, in a concentration between about 0.005% and 1% by weight, such as about 0.025% by weight, was prepared by supplying solid flocculant 1124 via line 1126 to flocculant tank 1128, where the solid was contacted with water 1120 supplied via line 1122. The aqueous flocculant solution was supplied to clarifier vessel 1146 via line 1138 at a rate of about 0.01 gpm.

Two streams were produced from clarifier 1146. First clarifier product stream 1148 included the geothermal brine having a reduced concentration of silica and iron, and was supplied to a secondary process, such as lithium recovery. Second clarifier product stream 1150 included solid silica-iron waste, as well as some geothermal brine. The brine was sampled between reactors 1108 (Reactor 1) and after 1110 (Reactor 2) before as well as after the clarifier 1146 (clarifier overflow).

Table 11 shows the concentration of iron and silicon after silica management through the first reactor and after the second reactor in a physical plant. Based on analysis of the data collected, the iron concentration ranged from about 200 mg/L to 1000 mg/L, while the silicon concentration ranged from about 1 to 60 mg/L.

TABLE 11

| | Fe concentrations (mg/kg) | Si concentrations (mg/kg) |
|---|---|---|
| From Reactor 1 | | |
| Min | 168 | 1 |
| Max | 828 | 43 |
| Mode | 307 | 10 |
| Median | 335 | 13 |
| From Reactor 2 | | |
| Min | 180 | <1 |
| Max | 833 | 48 |
| Mode | 297 | 12 |
| Median | 261 | 14 |

Figure 45A:
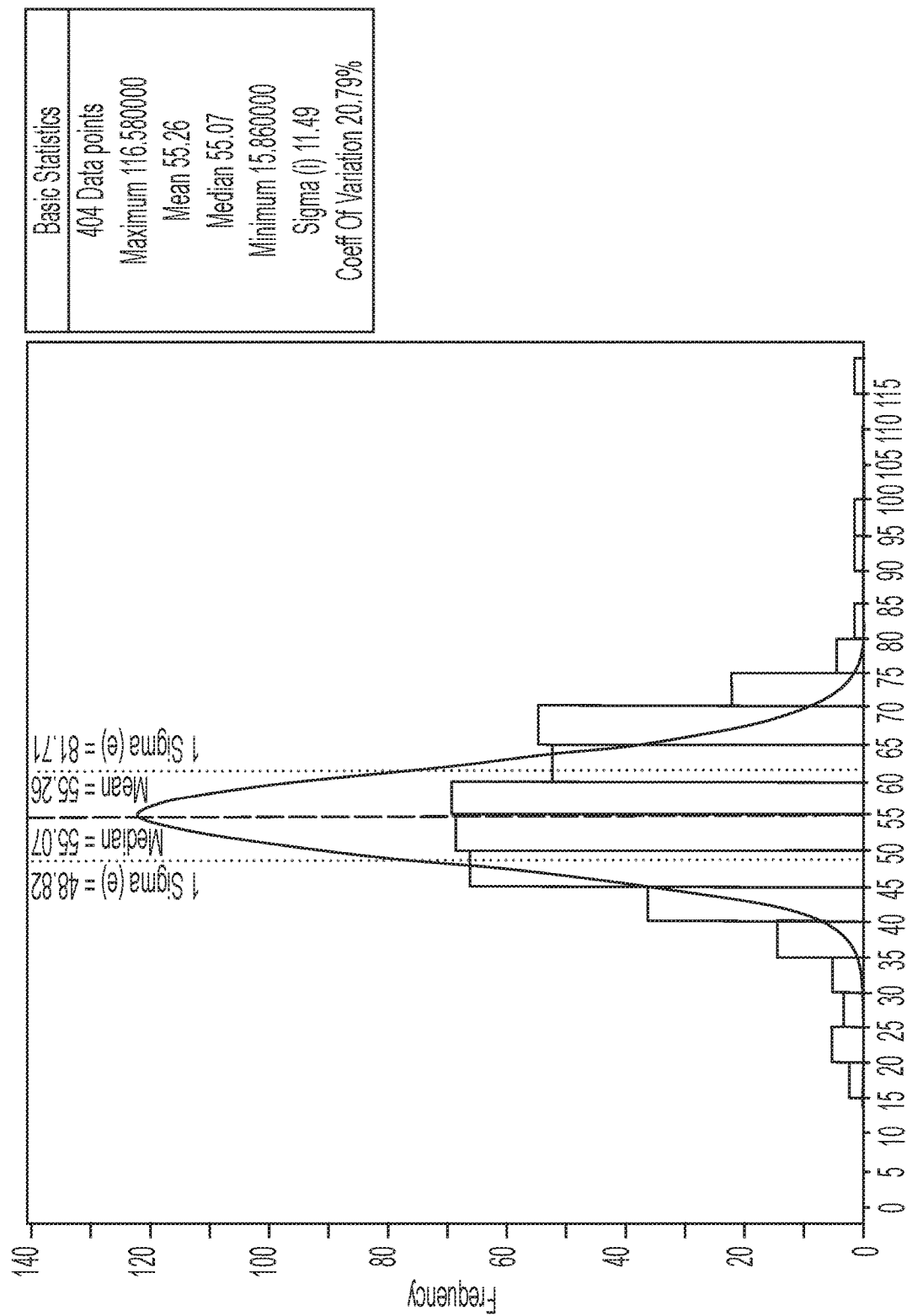
FIGS. 45A and 45B show histograms of silica concentrations in an exemplary treated brine composition during the silica management process.
Figure 45B:
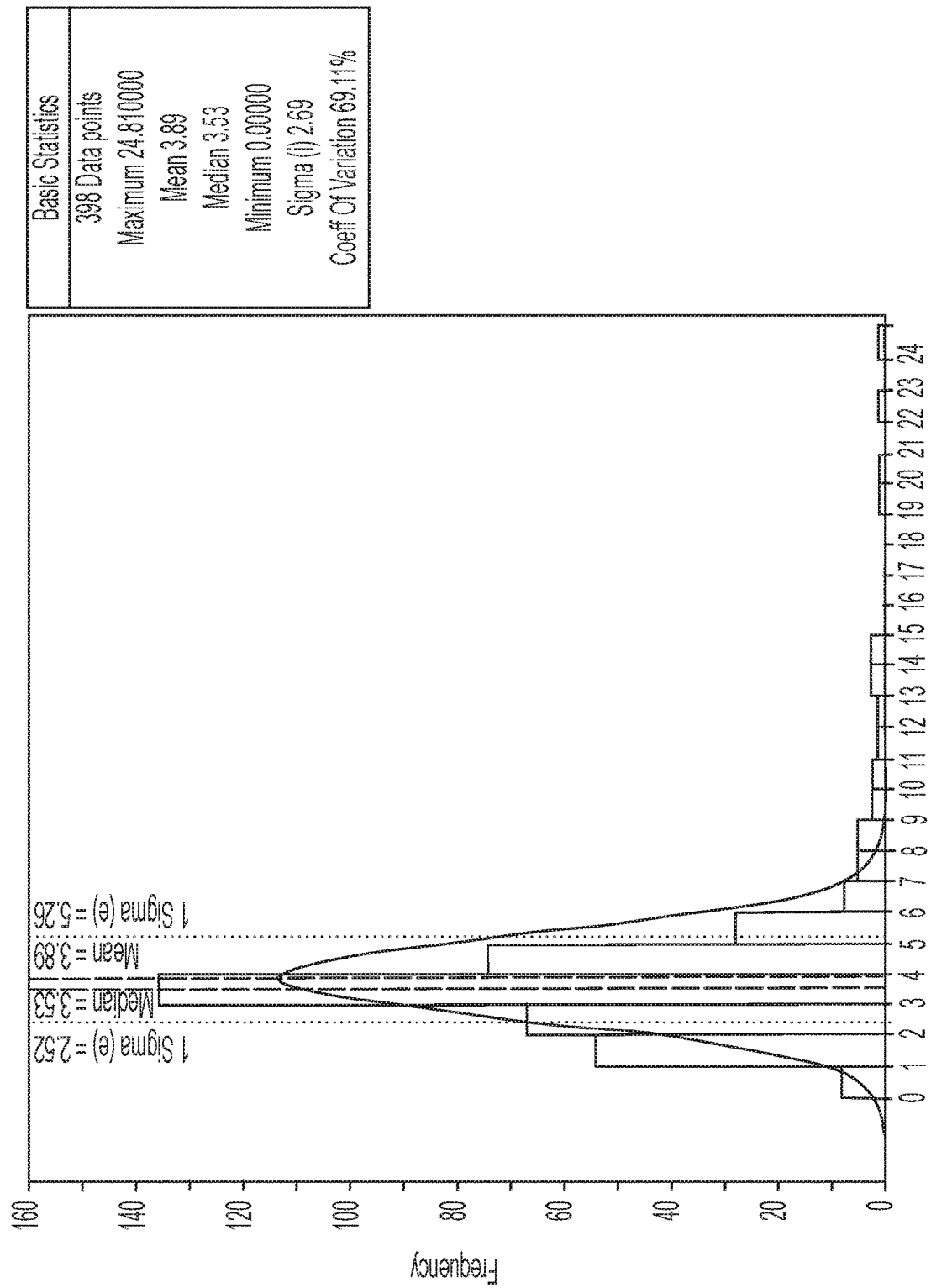

Samples were analyzed from the feed brine and from the clarifier overflow to determine the concentrations of silica and silicon. FIGS. 45A and 45B show the histograms of silicon (not $SiO_2$) concentrations in feed brine (FIG. 45A) and clarifier overflow (FIG. 45B). While the concentration of silicon in the feed brine ranged from 16-117 ppm, the mean and median silicon concentrations were both about 55 ppm. While the concentration of silicon in the treated brine from the clarifier ranged from 0-25 ppm, the mean and median silicon concentrations were both about 4 ppm. The $SiO_2$ concentration in the feed brine ranged from 32 to 250 ppm, with a mean and median of 118 ppm. The silica in the clarifier overflow ranged from 0.4 to 53 ppm, with a mean and median of 8.6 and 7.7 ppm, respectively. Hence, ~93% of the feed $SiO_2$ was removed by the silica management circuit.

Figure 46A:
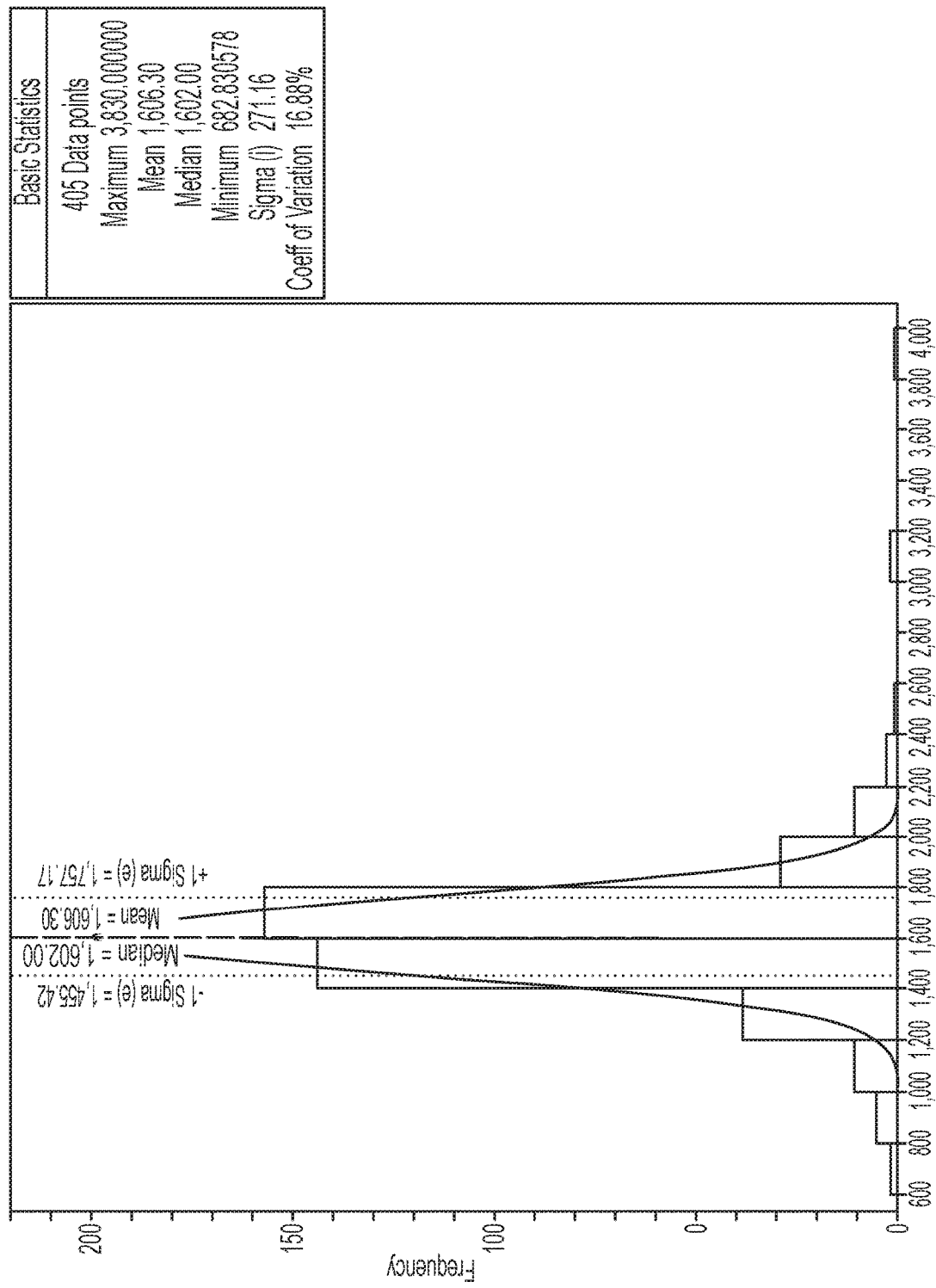
FIGS. 46A and 46B show histograms of iron concentrations in an exemplary treated brine composition during the silica management process.
Figure 46B:
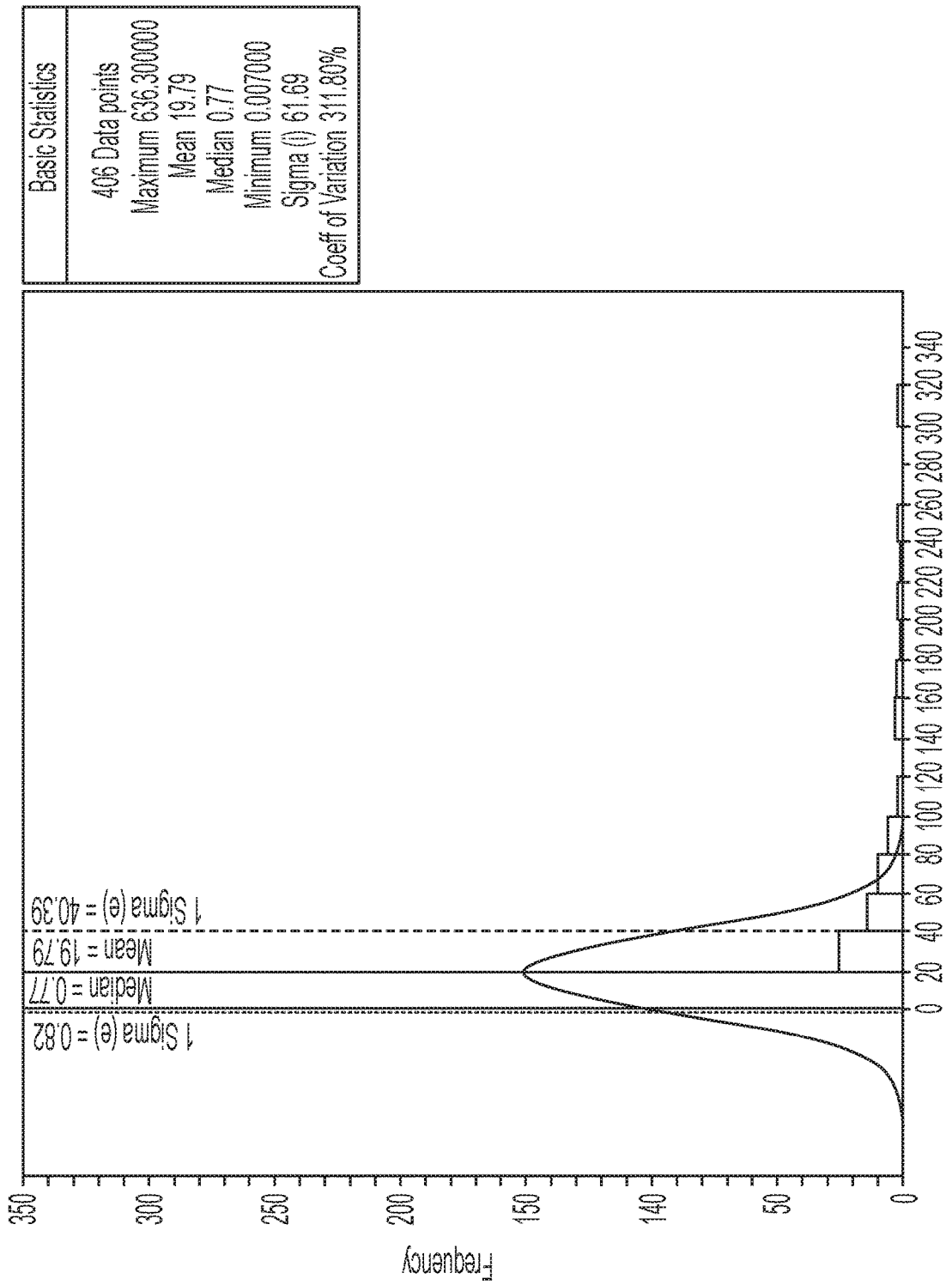

Samples were analyzed from the feed brine and from the clarifier overflow to determine the concentrations of iron. The histograms in FIGS. 46A and 46B illustrate the iron concentrations in feed brine (FIG. 46A) and clarifier overflow (FIG. 46B). While the concentration of iron in the feed brine ranged from 638-3830 ppm, the mean and median iron concentrations were both about 1600 ppm. While the concentration of iron in the treated brine from the clarifier ranged from 0-636 ppm, the mean and median iron concentrations were about 20 ppm and less than 1 ppm respectively.

Figure 47A:
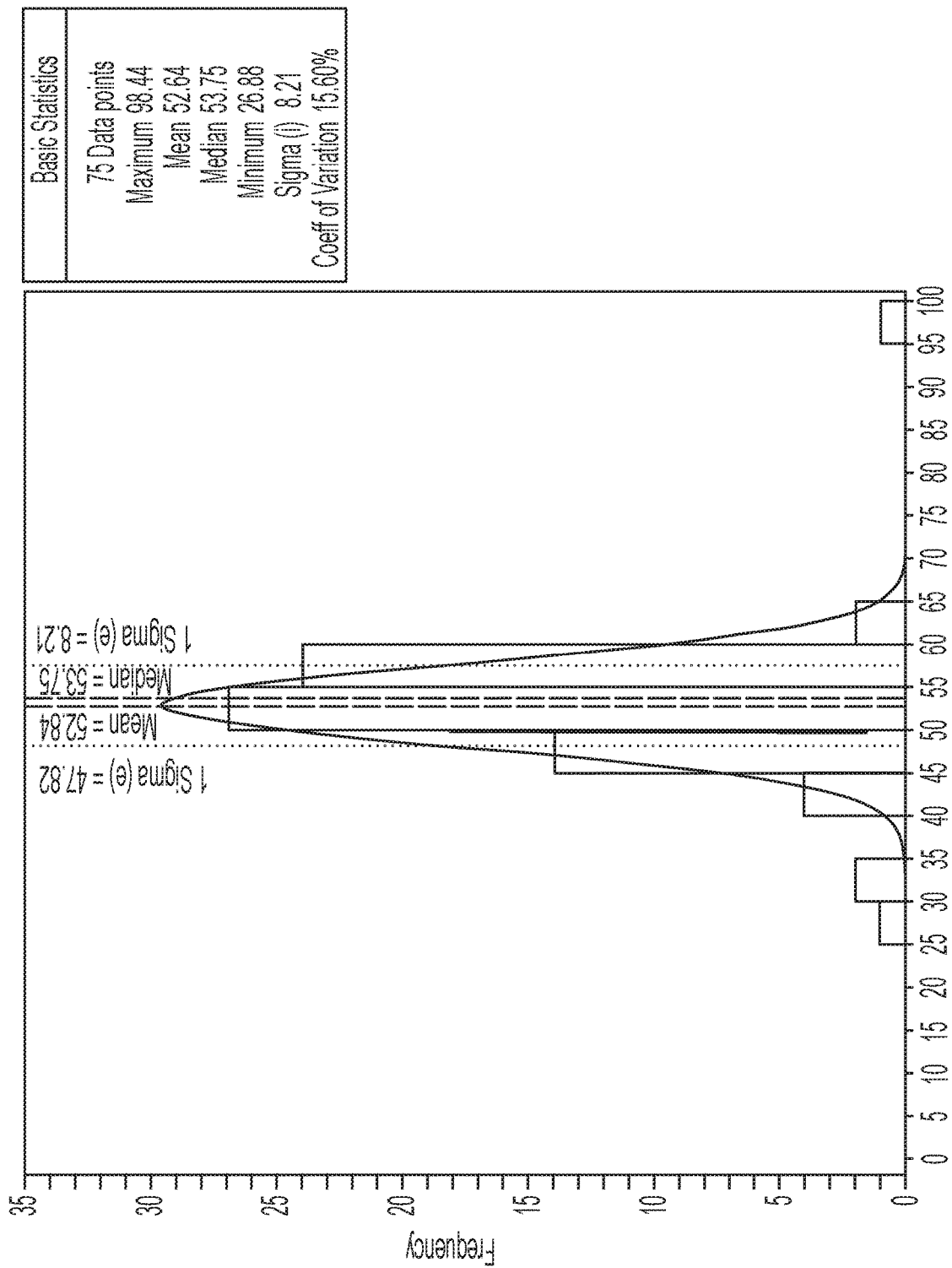
FIGS. 47A and 47B show histograms of silica concentrations in an exemplary treated brine composition during the silica management process.
Figure 47B:
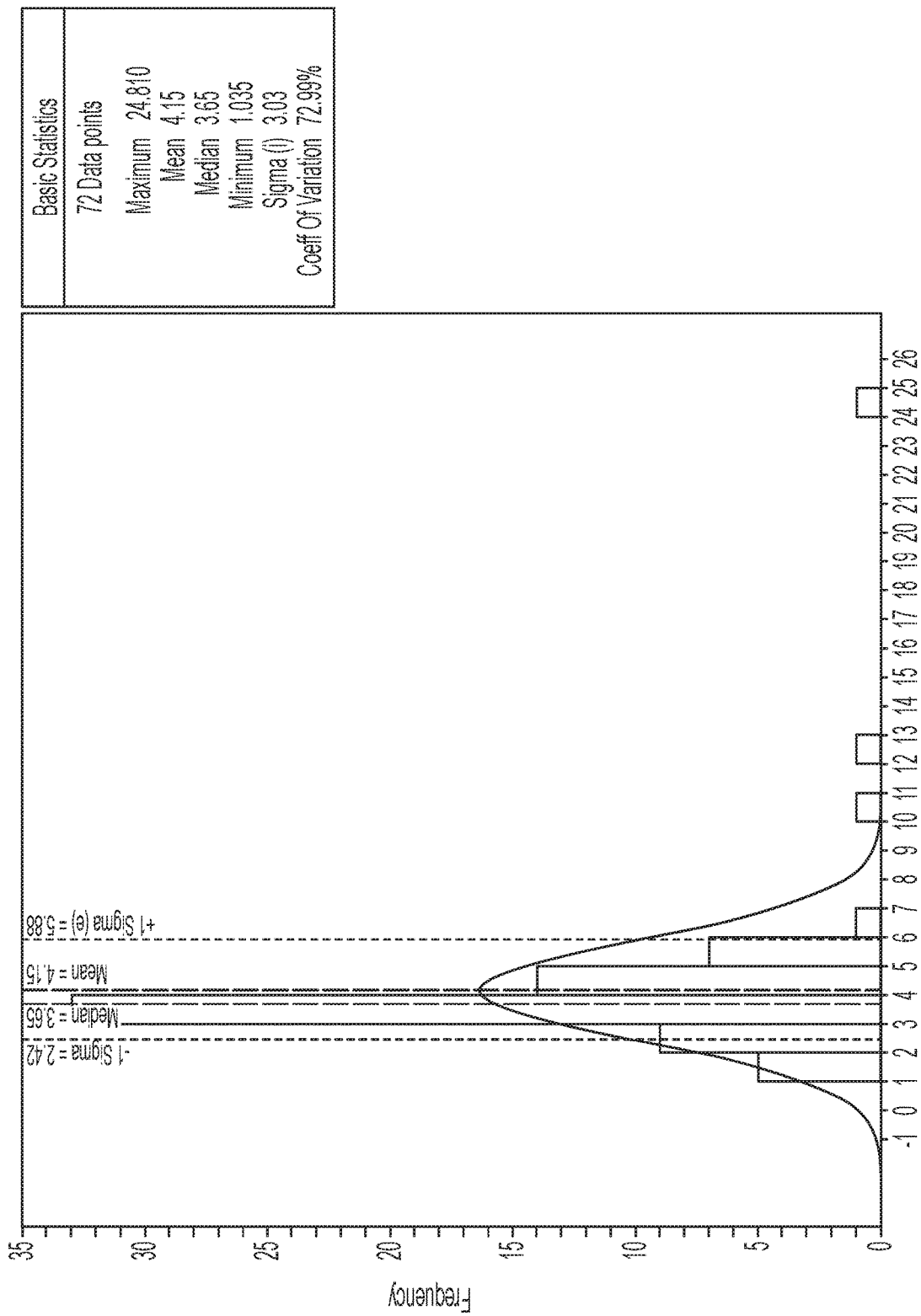
Figure 48B:
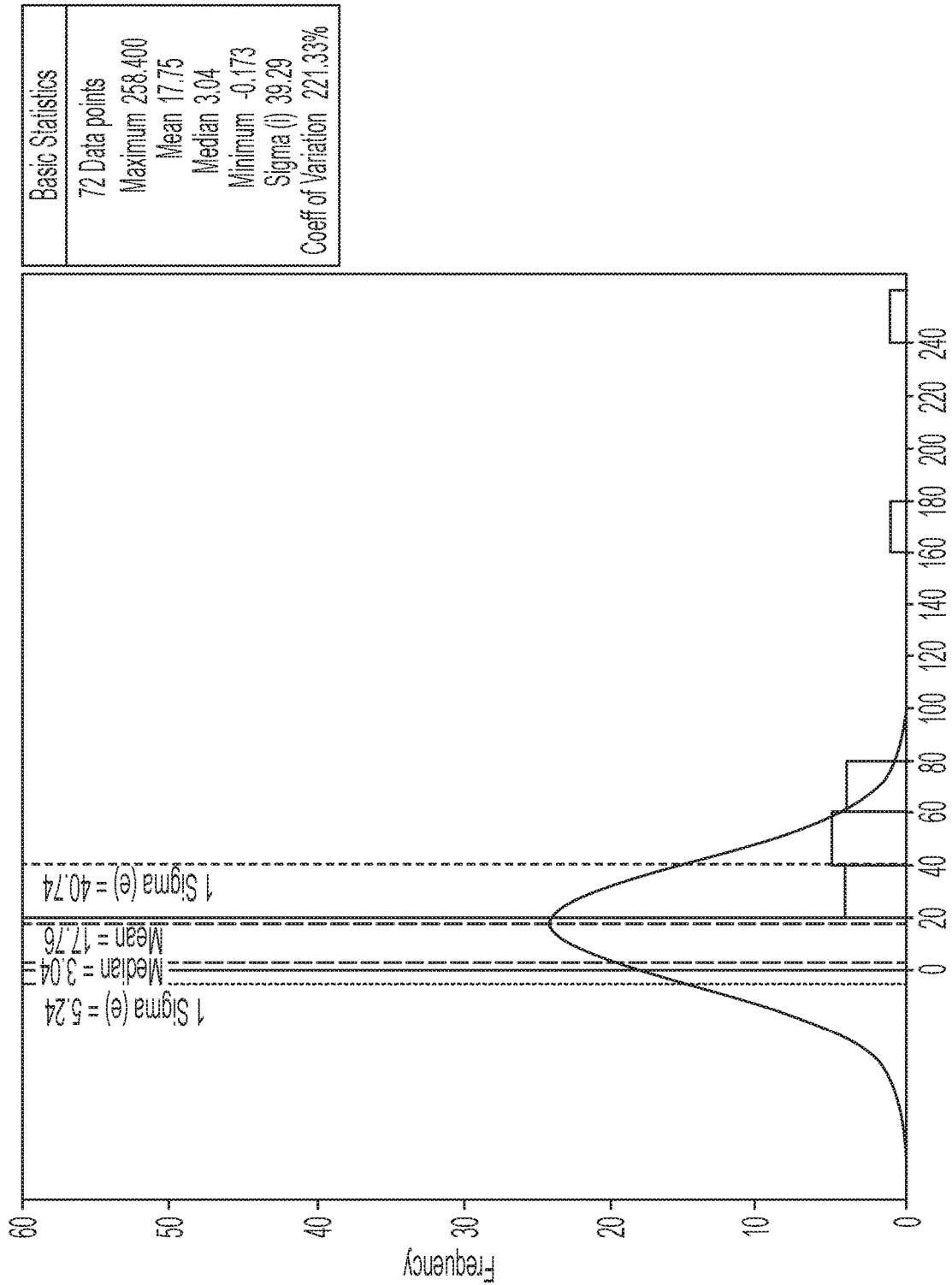

Samples were also analyzed from another exemplary demonstration of the process. FIGS. 47A and 47B show histograms of dissolved silicon (not silica) concentrations in feed brine (FIG. 47A) and clarifier overflow (FIG. 47B). While the concentration of silicon in the feed brine ranged from 27-98 ppm, the mean and median silicon concentrations were both about 53-54 ppm. While the concentration of silicon in the treated brine from the clarifier ranged from 1-25 ppm, the mean and median silicon concentrations were both about 4 ppm. The range in feed $SiO_2$ was 58 ppm to 131 ppm with mean and median of 113 ppm and 115 ppm, respectively. $SiO_2$ in the clarifier overflow ranged between 2 and 53 ppm, with a mean and median of 8.9 and 7.8 ppm, respectively. There was similar removal efficiency in the 95% range. Samples were analyzed from the feed brine and from the clarifier overflow to determine the concentrations of iron. The histograms in FIG. 48 illustrate the iron concentrations in feed brine (FIG. 48A) and clarifier overflow (FIG. 48B). While the concentration of iron in the feed brine ranged from 980-3830 ppm, the mean and median iron concentrations were both about 1670 ppm. While the concentration of iron in the treated brine from the clarifier ranged from 0-258 ppm, the mean and median iron concentrations were about 18 ppm and 3 ppm, respectively.

In another exemplary demonstration of the process, the treated brine with reduced silica and iron concentration was fed to a lithium removal process, and the presence of arsenic, barium, iron, lithium, lead, and silicon was analyzed at different stages of the operation, and the results are shown in Table 12. Concentrations of calcium in these treated compositions can vary from about 30,000 ppm to about 46,000 ppm, with a median concentration of about 36,000 ppm. Concentrations of sodium in these treated compositions can vary from about 40,000 ppm to about 80,000 ppm, with a median concentration of about 61,150 ppm.

TABLE 12

| Sampling | | Arsenic ppm | Barium ppm | Iron ppm | Lithium ppm | Lead ppm | Silicon ppm | Potassium ppm | Manganese ppm | Zinc ppm |
|---|---|---|---|---|---|---|---|---|---|---|
| Silica | Min | 8 | 0 | 990 | 144 | 49 | 27 | 10,990 | 889 | 288 |
| Management | Max | 30 | 244 | 2085 | 387 | 110 | 61 | 25,990 | 1558 | 540 |
| Inlet | Median | 13 | 98 | 1673 | 248 | 92 | 54 | 17,920 | 1349 | 472 |
| Silica | Min | 0 | 51 | 0 | 122 | 43 | 1 | 9,063 | 695 | 208 |
| Management | Max | 3 | 516 | 258 | 354 | 90 | 25 | 24,350 | 1556 | 552 |
| Outlet | Median | 0 | 154 | 3 | 251 | 78 | 4 | 18,480 | 1366 | 476 |
| Brine Outlet | Min | 0 | 52 | 0 | 16 | 41 | 0 | 16,860 | 953 | 434 |
| from Lithium | Max | <1 | 191 | 72 | 287 | 86 | 4 | 29,325 | 1803 | 614 |
| Extraction Column 1 | Median | <1 | 120 | 1 | 45 | 65 | 3 | 21,020 | 1483 | 515 |
| Brine Outlet | Min | 0 | 0 | 0 | 5 | 26 | 0 | 10,640 | 753 | 309 |
| from Lithium | Max | 1 | 348 | 331 | 341 | 92 | 12 | 33,850 | 211 | 678 |
| Extraction Column 2 | Median | <1 | 108 | 1 | 46 | 73 | 3 | 19,920 | 1427 | 499 |

Example 10

For testing purposes, a synthetic brine was employed for examples 10-12 having metal concentrations of approximately the following: 1600 mg/L Fe, 96 mg/L Si, 2500 mg/L Mn, 790 mg/L Zn, 290 mg/L Li, 41,000 mg/L Ca, 27,000 mg/L K, 85,500 mg/L Na, and 185 mg/L Sr.

Approximately 1.22 L of the synthetic brine was placed in a 2 L reactor and maintained at a temperature of between about 90-95° C. and sparged with air at a rate of about 2.25 L/min. The initial pH of the brine was about 4.89. To the reaction approximately 14 g of a 20% slurry of calcium hydroxide added. After addition of the slurry, a pH of about 2.85 was achieved, which gradually increased to approximately 3.56 after about 10 minutes. After 40 minutes, at which time the pH was about 2.9, approximately 5.33 g of a 20% slurry of calcium hydroxide was added, which raised the pH to about 4.07. The brine and the calcium hydroxide slurry were mixed for approximately 30 minutes, during which time the pH decreased to approximately 4.0, at which time approximately 21.22 g of the 20% slurry of calcium hydroxide was added. The addition of the calcium hydroxide slurry increased the pH to approximately 4.5. The mixture was stirred for about another 20 minutes, after which approximately 28.54 g of the calcium hydroxide slurry was again added, and the pH increased to approximately 5.18. The reaction was allowed to stir for about an additional 30 minutes, and the solid was collected and weighed. The solid includes approximately 99.6% of the iron present in the brine and approximately 99.9% of the silica. Additionally, approximately 49.2% of the manganese present in the brine was removed.

Example 11

Approximately 1.32 L of the synthetic brine was placed in a 2 L reactor and maintained at a temperature of between about 90-95° C. and sparged with air at a rate of about 2.25 L/min. The reaction was stirred for approximately 60 minutes and the pH of the solution was monitored. After about 60 minutes, a pH of about 2.05 was achieved. To the brine solution was added approximately 9.73 g of a 20% slurry of calcium hydroxide, which raised the pH to about 5.4. The brine and the calcium hydroxide slurry were mixed for approximately 30 minutes, during which time the pH decreased to approximately 3.4, at which time approximately 2.56 g of the 20% slurry of calcium hydroxide was added. The addition of the slurry increased the pH to approximately 4.9. The mixture was stirred for about another 20 minutes, after which approximately 1.21 g of the calcium hydroxide slurry was again added, and the pH increased to approximately 5.3. The reaction was allowed to stir for about an additional 70 minutes, and the solid was collected and weighed. The solid includes approximately 98% of the iron present in the brine and approximately 99% of the silica. Additionally, approximately 2% of the manganese present in the brine was removed.

Example 12

Approximately 1.32 L of the synthetic brine was placed in a 2 L reactor and maintained at a temperature of between about 90-95° C. and sparged with air at a rate of about 2.25 L/min. The reaction was stirred for approximately 60 minutes and the pH of the solution was monitored. After about 22 minutes, a pH of about 2.52 was achieved. To the brine solution was added approximately 9.7 g of a 20% slurry of calcium hydroxide, which raised the pH to about 5.56. The brine and the calcium hydroxide slurry were mixed for approximately 13 minutes, during which time the pH decreased to approximately 4.27, at which time approximately 1.9 g of the 20% slurry of calcium hydroxide was added. The addition of the calcium hydroxide slurry increased the pH to approximately 5.2. The mixture was stirred for about another 5 minutes, during which time the pH decreased to approximately 4.49. Approximately 2.25 g of the calcium hydroxide slurry was again added, and the pH increased to approximately 5.17. The reaction was allowed to stir for about an additional 110 minutes, during which time the pH was maintained at between about 5.13 and 5.17, and the solid was collected and weighed. The solid includes approximately 95.6% of the iron present in the brine and approximately 88.5% of the silica. Additionally, approximately 2% of the manganese present in the brine was removed.

Example 13

A synthetic brine having a composition that includes about 330 mg/L Li, 2400 mg/L Mn, 740 mg/L Zn, 40,000 mg/L Ca, 26,000 mg/L K, 91,000 mg/L Na, 180 mg/L Sr, and 0.8 mg/L Fe was placed in a 2 L reactor and maintained at a temperature of between about 90-95° C. and sparged with air at a rate of about 2.25 L/min. The initial pH was approximately 5.5. After sparging the reactor with air, a calcium hydroxide slurry was added sufficient to bring the pH to approximately 6.6. Additional calcium hydroxide slurry was added over about the next 180 minutes at various intervals. During the addition of the calcium hydroxide slurry, the pH increased from an initial value of about 6.6 to 8. A precipitate was collected which included zinc and manganese. The process recovered about 95.2% of the manganese present in the brine, about 94.6% of the zinc present in the brine, about 0.8% of the calcium present in the brine, and about 75% of the iron present in the brine. Due to the high recovery of iron by this process, the need for iron removal is confirmed.

Example 14

A synthetic brine having a composition that includes about 326 mg/L Li, 2640 mg/L Mn, 886 mg/L Zn, 41,000 mg/L Ca, 28.000 mg/L K, 84,000 mg/L Na, 180 mg/L Sr. and 0.3 mg/L Fe was placed in a 2 L reactor and maintained at a temperature of between about 90 to 95° C. and sparged with air at a rate of about 2.25 L/min. After sparging the reactor with air, a calcium hydroxide slurry was added in a single dosage sufficient that the pH of the brine solution was measured immediately after addition of the calcium hydroxide slurry and was about 7.6. During the stirring and sparging of the reaction, the pH increased from an initial value of about 7.6 to 7.9 after approximately 15 minutes, and then decreased gradually to about 7.5. A precipitate was collected which included zinc and manganese. The process recovered about 100% of the manganese present in the brine, about 99.9% of the zinc present in the brine, and about 8% of the lithium present in the brine.

Example 15

Approximately 10 g of a synthetic geothermal brine having an approximate pH of 5.2 and a composition that mimics the composition of Salton Sea (generally, the simulated brine has a composition of about 260 ppm lithium, 63.000 ppm sodium, 20,100 ppm potassium, 33,000 ppm calcium, 130 ppm strontium, 700 ppm zinc, 1700 ppm iron, 450 ppm boron, 54 ppm sulfate, 3 ppm fluoride, 450 ppm ammonium ion, 180 ppm barium, 160 ppm silicon dioxide, and 181,000 ppm chloride) was titrated with a solution that contains about 28-30% by volume ammonia to a maximum pH of about 8.5. The solids began precipitating when the pH of solution was about 6.5. A portion of the brine was decanted and analyzed at various pH levels to identify and estimate the precipitated metal salts (see, Table 13 and FIG. 49). Table 13 shows that in the presence of ammonia, manganese precipitates from the brine solution with highest selectivity, and the amount of zinc that is co-precipitated with the manganese varied from between about 0 to 10%, depending upon the pH of the solution. Furthermore, the solids that precipitated at a pH of about 8 were washed, dried (at 100° C.) and digested to analyze the components of the precipitate and purity of the manganese solids. The digested sample revealed the presence of only two metals, specifically Mn (366.4 mg/g) and Zn (8.06 mg/g). The concentration of the remainder metal elements, if present, was below detection limits.

Figure 49:
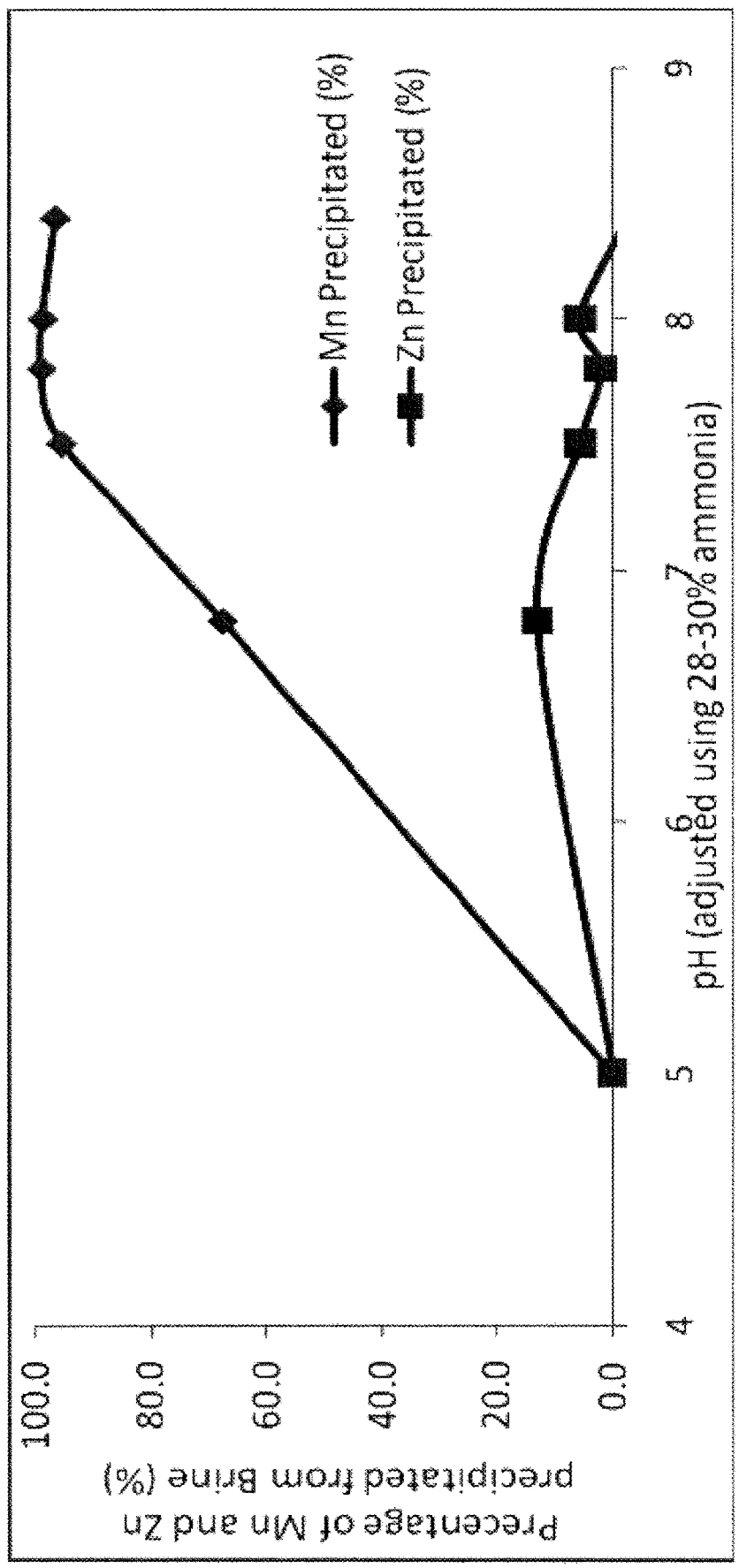
FIG. 49 is a graph showing precipitation of manganese as a function of pH.

The results of the analysis at various pH values is provided in both FIG. 49 and Table 13, which shows the composition of the synthetic brine before contacting with ammonia, and the composition of the decanted brine that has been separated from the precipitated solids at various different pH levels. As shown in the table, at a pH of about 6.8, approximately 67% of manganese and 13% of zinc that was initially present in the brine solution precipitated around pH 6.8, however, as the pH is increased to about 7.8, the percentage of manganese that was precipitated increased up to a maximum of almost 99%, while the amount of zinc that is precipitated decreases to about 2%.

TABLE 13

Brine composition after precipitation using 28-30% ammonia solution

|  | Ba, mg/L | Ca, mg/L | K, mg/L | Li, mg/L | Mg, mg/L | Mn, mg/L | Na, mg/L | Sr, mg/L | Zn, mg/L | B, mg/L |
|---|---|---|---|---|---|---|---|---|---|---|
| Control | 194.4 | 41120 | 23060 | 283.7 | 11.96 | 2311 | 73650 | 418.1 | 777.3 | 511.1 |
| pH 6.8 | 234.2 | 48610 | 27420 | 341.8 | 20.51 | 746.9 | 86860 | 497.4 | 676.5 | 566.5 |
| pH 7.5 | 212.4 | 44050 | 24540 | 305.1 | 18.39 | 108.1 | 75880 | 432.9 | 734.4 | 537.8 |
| pH 7.8 | 194.7 | 40790 | 22670 | 279.9 | 15.88 | 28.56 | 71040 | 403.7 | 762.1 | 509.4 |
| pH 8 | 192.1 | 40280 | 22370 | 275.8 | 13.81 | 32.94 | 69490 | 395.3 | 734.1 | 498.4 |
| pH 8.4 | 217.2 | 43560 | 25130 | 317 | 5.551 | 84.03 | 78470 | 446.5 | 797.3 | 539.5 |

As shown in FIG. 49, these results indicate that at higher pH values, i.e., at a pH of about 8.5, zinc forms a soluble coordination complex, with no measurable precipitate formed, while manganese forms a metal hydroxide/oxide precipitate. In certain embodiments, it is believed that the precipitated solids may include $MnO_2$ or $Mn_3O_4$ and ZnO. The manganese oxides purity from the digestion studies indicated the purity was about 98%. Further optimization of pH and experimental conditions could increase the manganese oxide purity to significantly higher levels.

Example 16

To improve the purity of subsequently precipitated manganese, lead was first removed by precipitation with sodium sulfide, and then manganese was precipitated using varying amounts of $Ca(OH)_2$. Actual geothermal brines that have been subjected to zinc removal were used in the Example 16. In the first trial, for the manganese precipitation, approximately 3 g of $Ca(OH)_2$ was added per liter of brine, along with approximately 1 mL of 28% $NH_3$ per liter of brine. In Trials 2 and 3, additional $Ca(OH)_2$ was added. In Trial 4, the brine was subjected to prior treatment with sodium sulfide for the removal of lead, and then treated with $Ca(OH)_2$ (but not utilize ammonia) for the manganese precipitation. Trial 5 utilized only $Ca(OH)_2$ for the precipitation of manganese, and did not use ammonia.

As shown in Table 14, the manganese oxide product in Trial 4 has a significantly reduced lead concentration. Lead concentration was reduced in the manganese precipitate to less than 200 ppm, while the feed geothermal brine contained about 30,000 ppm of lead.

TABLE 14

Analysis of Manganese Oxides Precipitates.

|  | Process | $Ca(OH)_2$ g/L | 28% $NH_3$ mL/L | Air | % B | % Ca | % Mg | % Mn | % Pb | % Zn |
|---|---|---|---|---|---|---|---|---|---|---|
| 1 | Mn ppt ($NH_3$ + $Ca(OH)_2$) | 3 | 1 | No | 0.07 | 0.3 | 0 | 71 | 0.2 | 0.03 |
| 2 | Mn ppt ($NH_3$ + $Ca(OH)_2$) | 4 | 1 | No | 0.08 | 0.3 | 0.7 | 69 | 0.6 | 0.1 |
| 3 | Mn ppt ($NH_3$ + $Ca(OH)_2$) | 6 | 1 | No | 0.06 | 4.1 | 3 | 59 | 0.07 | 0.07 |
| 4 | Mn ppt ($Ca(OH)_2$ after Pb sep. with $Na_2S$) | ~6 | 0 | Yes | 0.06 | 2.1 | 2.5 | 58 | 0.02 | 0 |
| 5 | Mn ppt ($Ca(OH)_2$) | ~6 | 0 | Yes | 1 | 1.6 | 0.1 | 65 | 3.39 | 0.31 |

Example 17

A geothermal brine composition was obtained following silica management having reduced concentrations of silica and iron, and having about 2530 mg/kg of manganese and about 782 mg/kg of zinc. In Test 1, this brine was subjected to precipitation using sodium hydroxide at about pH 8.5-9.0, resulting in a treated brine composition containing less than about 8 mg/kg of manganese and about 3 mg/kg of zinc. In Test 2, the brine was subjected to precipitation using ammonia at about pH 8.4, resulting in a treated brine composition containing about 82 mg/kg of manganese and about 616 mg/kg of zinc. In Test 3, the brine was subjected to precipitation using ammonia at about pH 8.5, resulting in a treated brine composition containing about 118 mg/kg of manganese and about 591 mg/kg of zinc. In Test 4, the brine was subjected to precipitation using ammonia at about pH 7.6, resulting in a treated brine composition containing about 1340 mg/kg of manganese and about 319 mg/kg of zinc. In Test 5, the brine was subjected to precipitation using calcium hydroxide at about pH 8.4, resulting in a treated brine composition containing less than about 16 mg/kg of manganese and about 33 mg/kg of zinc.

TABLE 15

| Sample ID | B mg/kg | Ba mg/kg | Ca mg/kg | K mg/kg | Li mg/kg | Mg mg/kg | Mn mg/kg | Na mg/kg | Sr mg/kg | Zn mg/kg |
|---|---|---|---|---|---|---|---|---|---|---|
| Sodium hydroxide | 390 | 164 | 29483 | 16933 | 204 | <2 | 8 | 50083 | 316 | 3 |
| Ammonia (pH 8.4) | 436 | 180 | 32625 | 19300 | 226 | 6 | 82 | 53767 | 356 | 616 |
| Ammonia (pH 8.5) | 407 | 178 | 31500 | 19500 | 239 | 14 | 118 | 54658 | 352 | 591 |
| Ammonia. 3 (pH 7.6) | 419 | 179 | 31842 | 19192 | 235 | 13 | 1340 | 55417 | 357 | 319 |
| Calcium hydroxide | 438 | 175 | 35142 | 19517 | 230 | <2 | 16 | 53517 | 353 | 33 |

Example 18

A geothermal brine composition was obtained following silica management, and zinc, and manganese recovery. The brine was treated with sodium hydroxide to prepare a treated brine with reduced concentrations of silica, iron, zinc, and manganese. Table 16 represents the compositions of brine samples following such treatment at different time intervals.

Example 19

Figure 50:
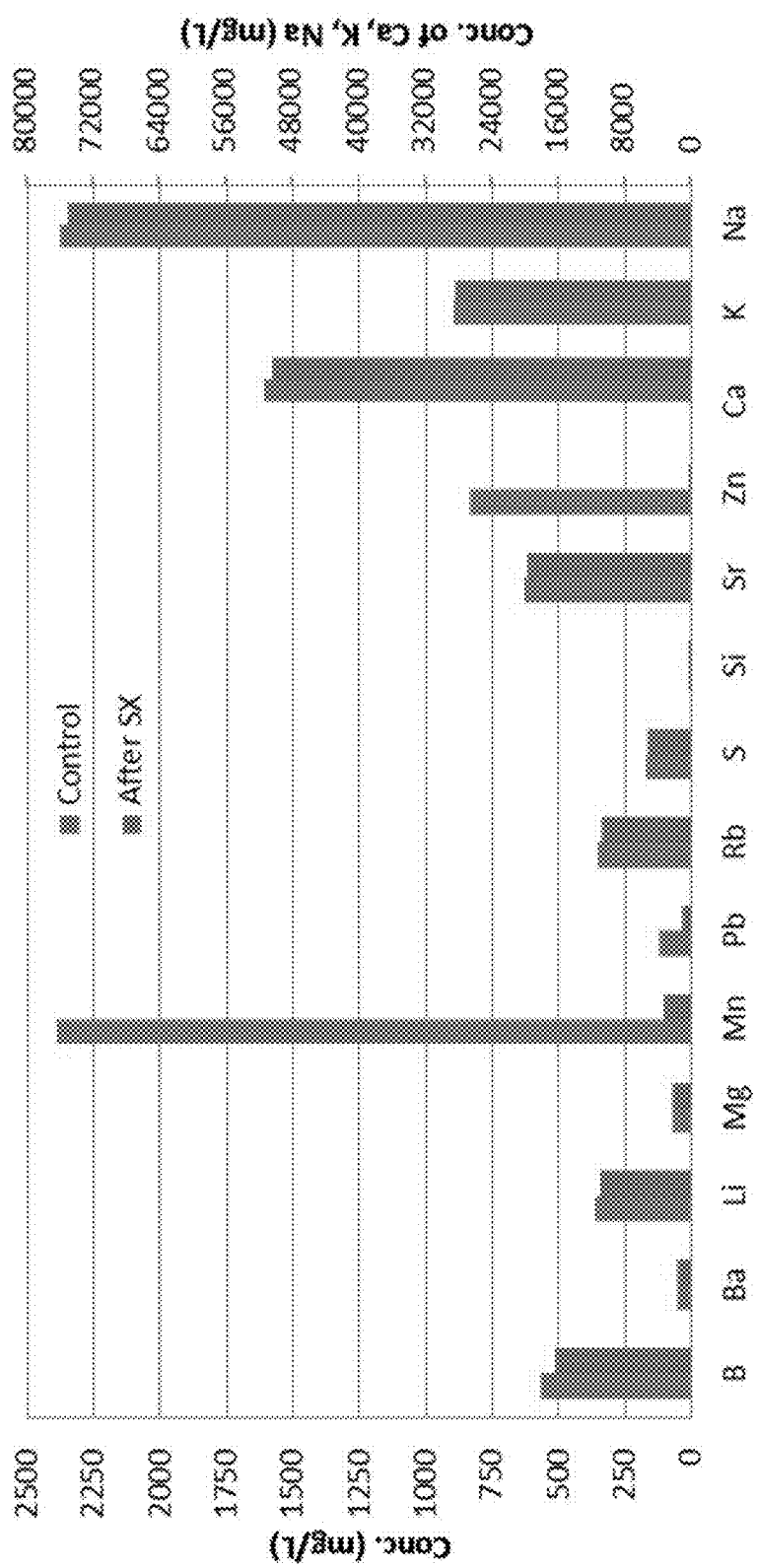
FIG. 50 is a graphical representation of a treated brine composition, according to an exemplary embodiment of the invention.
Figure 51:
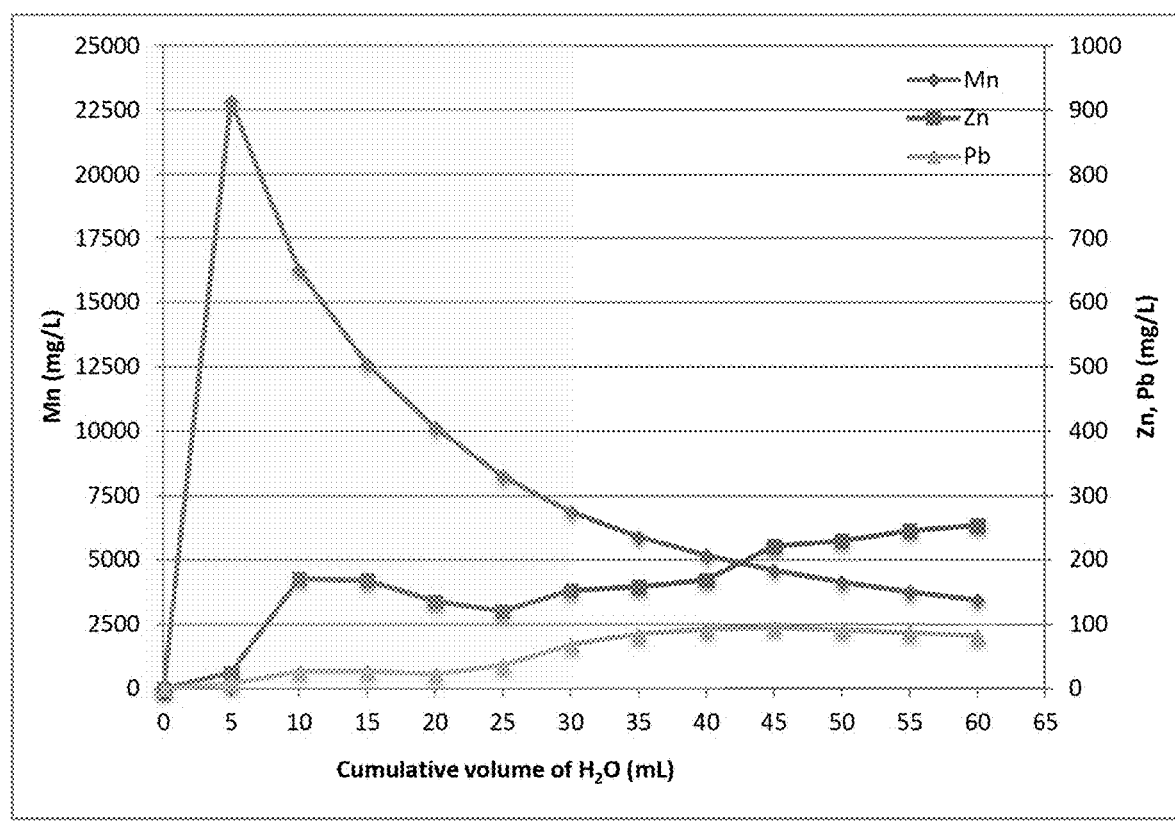
FIG. 51 is a graphical representation of the recovery of manganese form an ionic liquid fraction.

A sample brine following silica management was obtained, containing about 2375 mg/kg of manganese and about 770 mg/kg of zinc. This brine was treated with a phosphonium based ionic liquid, Cyphos IL 101 (trihexyl (tetradecyl) phosphonium chloride. About 960 g of geothermal brine contacted with 80 g of phosphonium ionic liquid, Cyphos IL 101 at 95° C. and vigorously agitated for 2 minutes. Following the agitation, a sample of brine was analyzed using inductively coupled plasma mass spectrometry (ICP) for determining metal ion composition. The manganese and zinc were removed resulting in a treated brine composition with reduced concentration of silica, iron, zinc and manganese. FIG. 50 shows the concentrations of the various elements in the brine before and after treatment with the ionic fluid. Following the separation of the treated brine composition, the ionic liquid fraction containing manganese, zinc, and lead was treated with hot water. Manganese was selectively recovered as shown in FIG. 51. Further treatment of the ionic liquid with water resulted in recovery of zinc. Treating the ionic liquid fraction with acids such as 0.5 or 1 M hydrochloric acid or sulfuric acid also led to selective recovery of manganese.

Example 20

Figure 52:
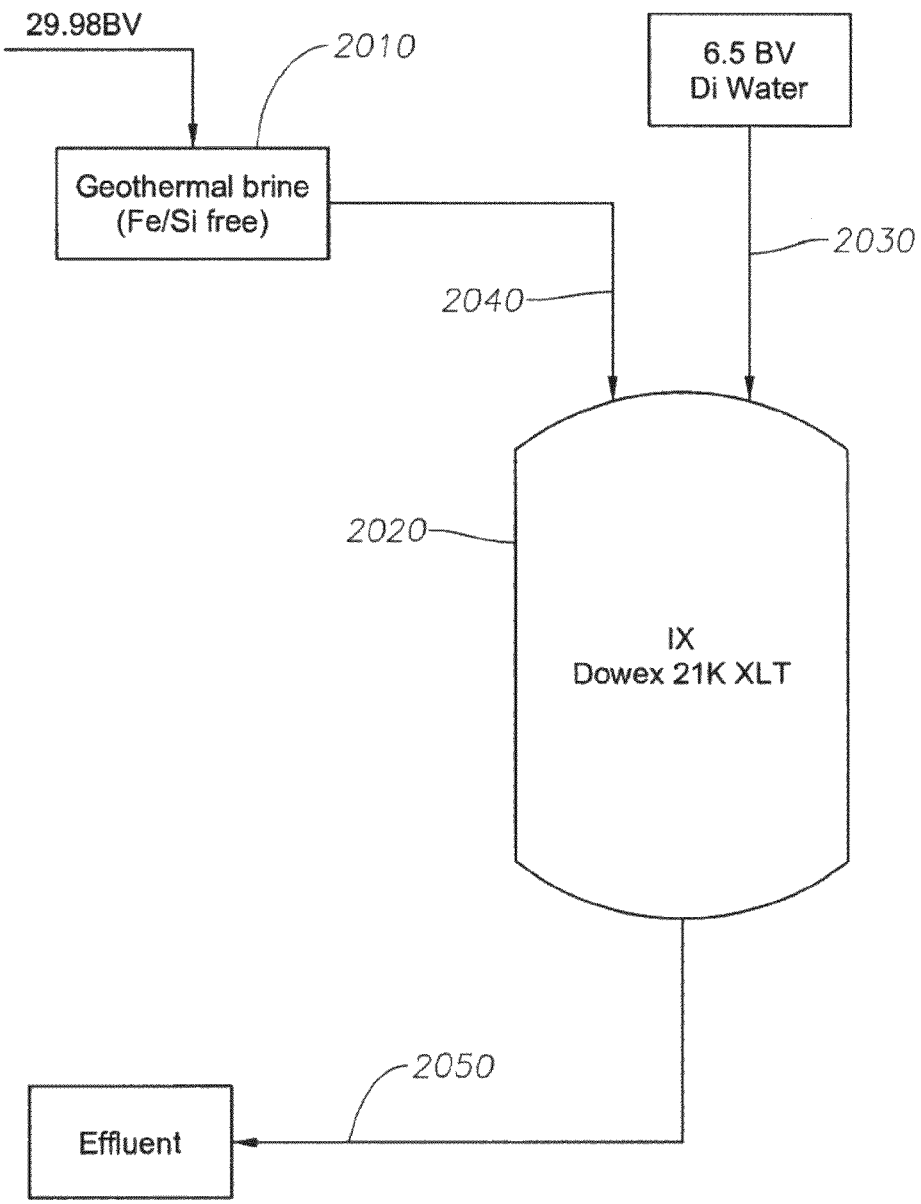
FIG. 52 is a representation of a process according to another aspect of the present invention.

As shown in FIG. 52, a geothermal brine composition 2010 was obtained following silica management and iron removal. The brine was passed through a Dowex 21K XLT column 2020 along with deionized water 2030. The effluent

TABLE 16

|  | Fe (mg/kg) | K (mg/kg) | Li (mg/kg) | Mg (mg/kg) | Mn (mg/kg) | Pb (mg/kg) | Si (mg/kg) | Zn (mg/kg) |
|---|---|---|---|---|---|---|---|---|
| MQL 100× | | 1 | 10 | 10 | 5 | 0.5 | 2 | 2 | 1 |
| Control | 0 | 1 | 23,000 | 146 | 79 | 1,642 | 98 | 5 | 4.3 |
| Treated 10 SEC | 10 | <MQL | 19,583 | 126 | 62 | 358 | 82 | <MQL | 3.0 |
| Treated 50 SEC | 50 | <MQL | 22,667 | 138 | 64 | 368 | 84 | <MQL | 3.8 |
| Treated 110 SEC | 110 | <MQL | 20,750 | 124 | 62 | 329 | 80 | <MQL | 3.1 |
| Treated 175 SEC | 170 | <MQL | 18,833 | 122 | 60 | 331 | 76 | <MQL | 2.9 |
| Treated 300 SEC | 300 | <MQL | 20,333 | 127 | 61 | 337 | 80 | <MQL | 3.2 |
| Treated 905 SEC | 905 | <MQL | 27,167 | 177 | 87 | 503 | 112 | <MQL | 4.5 |
| Treated 1806 SEC | 1,806 | <MQL | 24,833 | 158 | 72 | 481 | 103 | <MQL | 4.0 | from this loading process yielded a treated brine with reduced concentrations of silica, iron, and zinc. Table 17 shows the concentrations of two samples of brines at the inlet 2040 and the effluent 2050.

TABLE 17

| Sample ID | B mg/kg | Ba mg/kg | Ca mg/kg | K mg/kg | Li mg/kg | Mg mg/kg | Mn mg/kg | Na mg/kg | Pb mg/kg | Zn mg/kg |
|---|---|---|---|---|---|---|---|---|---|---|
| Inlet sample 1 | 451 | 99 | 40092 | 21033 | 84 | 79 | 1700 | 68025 | 83 | 558 |
| Effluent Sample 1 | 430 | 96 | 37575 | 19733 | 79 | 74 | 1574 | 63250 | 80 | 0 |
| Inlet sample 2 | 405 | 92 | 35267 | 18183 | 92 | 71 | 1472 | 61950 | 79 | 523 |
| Effluent Sample 2 | 446 | 103 | 39642 | 20725 | 99 | 80 | 1643 | 67425 | 85 | 7 |

Example 21

A sample brine following silica management was obtained, containing about 2375 mg/kg of manganese and about 770 mg/kg of zinc. This brine was first subjected to zinc extraction and followed by treatment with a phosphonium based ionic liquid, Cyphos IL 101 (trihexyl(tetradecyl) phosphonium chloride. A sample of brine was analyzed using inductively coupled plasma mass spectrometry (ICP) for determining metal ion composition. The manganese and zinc were removed resulting in a treated brine composition with reduced concentration of silica, iron, zinc, and manganese. Data for three such extraction studies conducted in accordance with this protocol are shown in Tables 17, 18, and 19.

TABLE 18

| Solvent Extraction Study 1 | | | | | | |
|---|---|---|---|---|---|---|
| Results in mg/kg | Fe | Li | Mn | Pb | Si | Zn |
| post-Zn brine | <1 | 276 | 1803 | 98 | 3 | 3 |
| after Solvent Extraction | <1 | 252 | 140 | 21 | 3 | 1 |

TABLE 19

| Solvent Extraction Study 2 | | | | | | |
|---|---|---|---|---|---|---|
| Results in mg/kg | Fe | Li | Mn | Pb | Si | Zn |
| post-Zn brine | <1 | 276 | 1803 | 98 | 3 | 3 |
| after Solvent Extraction | <1 | 261 | 216 | 29 | 3 | 2 |

TABLE 20

| Solvent Extraction Study 3 | | | | | | |
|---|---|---|---|---|---|---|
| Results in mg/kg | Fe | Li | Mn | Pb | Si | Zn |
| post-Zn brine | <1 | 276 | 1803 | 98 | 3 | 3 |
| after Solvent Extraction | <1 | 243 | 140 | 26 | 3 | 1 |

As is understood in the art, not all equipment or apparatuses are shown in the figures. For example, one of skill in the art would recognize that various holding tanks and/or pumps may be employed in the present method.

The singular forms "a," "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

As used herein, recitation of the term about and approximately with respect to a range of values should be interpreted to include both the upper and lower end of the recited range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The invention claimed is:

1. A method of producing an aqueous treated brine composition derived from a brine source, the method comprising:
    processing a brine in a silica removal process to reduce the concentration of silica and iron in the brine;
    processing the brine in a lithium recovery process to extract lithium, wherein the lithium recovery process comprises:
    providing the brine to a column;
    contacting the brine with an extraction material in the column to adsorb lithium from the brine;
    eluting the adsorbed lithium from the column with a solvent to produce the treated brine composition;
    wherein the treated brine composition comprises dissolved manganese, dissolved silica, and dissolved iron, wherein the dissolved manganese has a concentration greater than zero and no more than 200 mg/kg, the dissolved silica has a concentration greater than zero and no more than 80 mg/kg, and the dissolved iron has a concentration greater than zero and no more than 300 mg/kg.

2. The method of claim 1, wherein the concentration of the dissolved manganese is no more than 200 mg/kg, the concentration of the dissolved silica is no more than 30 mg/kg, and the concentration of the dissolved iron is no more than 300 mg/kg.

3. The method of claim 1, wherein the concentration of the dissolved manganese is less than 100 mg/kg, the concentration of the dissolved silica is less than 30 mg/kg, and the concentration of the dissolved iron is less than 300 mg/kg.

4. The method of claim 1, wherein the concentration of the dissolved manganese is less than 50 mg/kg, the concentration of the dissolved silica is less than 30 mg/kg, and the concentration of the dissolved iron is less than 300 mg/kg.

5. The method of claim 1, wherein the concentration of the dissolved manganese is less than 20 mg/kg, the concentration of the dissolved silica is less than 20 mg/kg, and the concentration of the dissolved iron is less than 100 mg/kg.

6. The method of claim 1, wherein the concentration of the dissolved manganese is less than 20 mg/kg, the concentration of the dissolved silica is less than 20 mg/kg, and the concentration of the dissolved iron is less than 50 mg/kg.

7. The method of claim 1, wherein the concentration of the dissolved manganese is less than 10 mg/kg, the concentration of the dissolved silica is less than 10 mg/kg, and the concentration of the dissolved iron is less than 100 mg/kg.

8. The method of claim 1, wherein the concentration of the dissolved manganese is less than 10 mg/kg, the concentration of the dissolved silica is less than 10 mg/kg, and the concentration of the dissolved iron is less than 10 mg/kg.

9. The method of claim 1, wherein the concentration of the dissolved manganese is less than 5 mg/kg, the concentration of the dissolved silica is less than 5 mg/kg, and the concentration of the dissolved iron is less than 5 mg/kg.

10. The method of claim 1, wherein the brine source is a geothermal brine, oilfield brine, smackover brine, hydrothermal brine, or Salton Sea brine.

11. The method of claim 1, wherein the treated brine composition further comprises sodium in a concentration of at least 50,000 mg/kg and potassium in a concentration of at least 9,000 mg/kg.

12. The method of claim 1, wherein the dissolved manganese has a concentration greater than zero and no more than 100 mg/kg, the dissolved silica has a concentration greater than zero and no more than 30 mg/kg, and the dissolved iron has a concentration greater than zero and no more than 300 mg/kg, and wherein the treated brine composition is a treated Salton Sea brine.

13. The method of claim 12, wherein the concentration of the dissolved manganese is less than 20 mg/kg, the concentration of the dissolved silica is less than 20 mg/kg, and the concentration of the dissolved iron is less than 200 mg/kg.

14. A method of claim 1 further comprising using the aqueous treated brine composition, the method comprising at least one of:
   (i) extracting minerals from the aqueous treated brine composition, or
   (ii) injecting the aqueous treated brine composition into a reservoir.

15. The method of claim 14, wherein the process for mineral extraction comprises extracting at least one of lithium, zinc, lead, potassium, rubidium, cesium, or a phosphate from the aqueous treated brine composition.

16. The method of claim 14, wherein the brine source is a geothermal brine, oilfield brine, smackover brine, hydrothermal brine, or Salton Sea brine.

17. The method of claim 1, wherein the treated brine composition recoverable amounts of one or more metals selected from the group consisting of lithium, manganese, lead, rubidium, and cesium or mixtures thereof.

* * * * *